United States Patent [19]

Ishida et al.

[11] Patent Number: 6,090,892
[45] Date of Patent: Jul. 18, 2000

[54] REDISPERSIBLE POLYMER AND PRODUCTION PROCESS THEREOF

[75] Inventors: Tadashi Ishida; Yoshio Kikuta, both of Kanagawa-ken; Futoshi Hoshino, Tokyo; Katsunari Matsumoto, Kanagawa-ken, all of Japan

[73] Assignee: Mitsui Toatsu Chemicals, Inc., Japan

[21] Appl. No.: 08/679,445

[22] Filed: Jul. 12, 1996

[30] Foreign Application Priority Data

| Jul. 17, 1995 | [JP] | Japan | 7-180396 |
| Jul. 17, 1995 | [JP] | Japan | 7-180397 |
| Jul. 17, 1995 | [JP] | Japan | 7-180398 |
| Dec. 14, 1995 | [JP] | Japan | 7-325743 |
| Dec. 26, 1995 | [JP] | Japan | 7-339041 |
| Dec. 26, 1995 | [JP] | Japan | 7-339042 |
| Feb. 15, 1996 | [JP] | Japan | 8-027653 |
| Feb. 15, 1996 | [JP] | Japan | 8-027654 |
| Feb. 15, 1996 | [JP] | Japan | 8-027655 |
| Feb. 22, 1996 | [JP] | Japan | 8-035067 |
| Feb. 22, 1996 | [JP] | Japan | 8-035068 |
| Feb. 22, 1996 | [JP] | Japan | 8-035069 |

[51] Int. Cl.⁷ .................................................. C08L 33/14
[52] U.S. Cl. ............................ 525/212; 525/218; 525/223
[58] Field of Search ........................ 525/218, 212, 525/221, 222, 223

[56] References Cited

U.S. PATENT DOCUMENTS

| 3,453,345 | 7/1969 | Mabrey | 525/218 |
| 4,101,606 | 7/1978 | Cenci | 525/218 |
| 4,602,059 | 7/1986 | van Rooden | 524/521 |

FOREIGN PATENT DOCUMENTS

| 0338486 | 10/1989 | European Pat. Off. . |
| 0522791 | 1/1993 | European Pat. Off. . |
| 0587333 | 3/1994 | European Pat. Off. . |
| 11265 | 5/1969 | Japan . |
| 59-193903 | 11/1984 | Japan . |
| 2-173003 | 7/1990 | Japan . |
| 3-54973 | 8/1991 | Japan . |
| 3-210336 | 9/1991 | Japan . |
| 4-185607 | 7/1992 | Japan . |
| 4-59324 | 9/1992 | Japan . |
| 5-501575 | 3/1993 | Japan . |
| 5-194681 | 8/1993 | Japan . |
| WO96/20963 | 7/1996 | WIPO . |

OTHER PUBLICATIONS

Patent Abstracts of Japan, vol. 009, No. 059, (C–270), Mar. 15, 1985 & JP 59 193903A (Toyo Soda Kogyo KK), Nov. 2, 1984 *abstract*.

*Primary Examiner*—Christopher Henderson
*Attorney, Agent, or Firm*—Burns, Doane, Swecker & Mathis, L.L.P.

[57] ABSTRACT

Disclosed herein are a (co)polymer comprising, as an essential component, a (co)polymer containing a recurring unit in a predetermined proportion, and its production process. The recurring unit contains a specific amido group and/or a particular hydroxyl group as a pendant group. This (co)polymer is generally obtained in the form of powder and features extremely easy redispersion, and is useful especially as a cement additive for improving physical properties of cement.

3 Claims, No Drawings

REDISPERSIBLE POLYMER AND PRODUCTION PROCESS THEREOF

BACKGROUND OF THE INVENTION a) Field of the Invention

This invention relates to (co)polymer particles having a function to be substantially redispersible in water of pH 5 or higher and also to a process for the production of the (co)polymer particles.

b) Description of the Related Art

An aqueous emulsion available by emulsion polymerization generally contains as much as 30 to 90 wt. % of water as a dispersion medium. This means that upon its piping or shipping, a great deal of water has to be transported, thereby causing a problem from the standpoint of both energy and cost.

On the other hand, a redispersible polymer is, in contrast to general aqueous emulsions, in the form of a solid or paste which is either completely or substantially free of water, and permits easy piping, shipping and storage. As another characteristic feature, a redispersible polymer can be reconstituted into an emulsified form similar to an ordinary aqueous emulsion by dissolving it in water when needed.

A redispersible polymer or a powder thereof can be premixed with another powder such as cement, gypsum or a pigment in accordance with a desired formula and can hence be provided as a one-pack product.

One-pack products with a redispersible polymer or a powder thereof premixed therein are widely used in the field of cement modifiers.

Such one-pack products with a redispersible polymer or a powder thereof premixed therein are in the form of compact light-weight powders during their piping, shipping and storage but upon use, mixing of such powders with water at construction sites makes it possible to prepare desired concretes in a single-step operation for immediate use.

Upon mixing a polymer, irksome procedures such as measuring operations can be significantly omitted so that the efficiency of work becomes extremely good. This is substantially meritorious.

Gallon cans or drum cans are needed in the case of a conventional aqueous emulsion. They are however no longer needed in the case of a redispersible polymer of a powder thereof. This is advantageous in that packaging cost can be reduced at the time of shipping and packaging materials, such as gallon cans and drum cans, to be disposed can be substantially reduced in quantity.

When provided as a premixed one-pack product, the quality control of concrete at the time of construction is made easier and the reliability of the construction is improved further, because its components have been precisely measured beforehand in accordance with a desired formula.

Compared with conventional aqueous emulsions, the redispersible polymer or its powder according to the present invention is therefore advantageous at least for the following reasons:

(1) It is possible to reduce the cost and energy required for piping, shipping or storage.

(2) The packaging cost can be reduced as large liquid containers are no longer needed.

(3) Industrial waste can be reduced since large liquid container are no longer needed.

(4) When provided in the form of a premixed one-pack product, measuring operation at a construction site is practically obviated so that substantial labor savings can be achieved.

(5) When provided in the form of a premixed one-pack product, mixing of the powder with water makes it possible to prepare desired concrete in a single step, thereby attaining substantial labor savings.

(6) When provided in the form of a premixed one-pack product, the quality control of concrete can be facilitated at the time of construction because each component has been precisely measured in accordance with a desired formula.

Nevertheless, redispersible polymers produced by conventional techniques are accompanied by at least the following disadvantages because they use conventional spray drying:

(1) Their redispersibility is not sufficient, because particles thermally cohere with one another under heat in conventional spray drying.

(2) Conventional spray drying requires a large facility and consumes a great deal of energy, and therefore is disadvantageous in cost.

A. Conventional Techniques for Polymer Particles

Conventional techniques for polymer particles will be described below. Polymer particles produced by such conventional techniques show either no redispersibility or dispersibility which is not fully satisfactory. Further, the below-described conventional techniques for the provision of polymer particles which show redispersibility all employ conventional spray drying and due to one or more drawbacks inherent to the conventional spray drying, they are unable to provide sufficient redispersibility.

Japanese Patent Laid-Open No. 193903/1984

Japanese Patent Laid-Open No. 193903/1984 in the name of TOSOH CORPORATION discloses a technique for readily obtaining an aggregate-free powder composition by polymerizing one or more unsaturated monomers in the presence of a special water-soluble copolymer which acts as a stabilizer or powdering agent across a particular pH value.

Described specifically, this technique is a production process in which, after a stable emulsion is polymerized in the presence of a water-soluble copolymer of methacrylamide and an unsaturated carboxylic acid, the resultant polymer is separated at pH 4 or lower, followed by dehydration and drying.

However, insofar as its disclosure is concerned, the process is understood to have the following inventive features.

In the invention disclosed in Japanese Patent Laid-Open No. 193903/1984, the water-soluble copolymer has the following two functions:

(1) a function as a stabilizer for stably performing the emulsion polymerization; and (2) a function as a powdering agent for obtaining an aggregate-free powder.

This technique makes it possible to obtain an aggregate-free powder by conducting emulsion polymerization in the presence of a water-soluble copolymer having a function as a stabilizer.

Namely, a radically-polymerizable, unsaturated-bond-containing monomer (e.g., styrene) (A) is first polymerized at pH 5 or higher in an aqueous medium in the presence of a water-soluble copolymer (B) of methacrylamide and an unsaturated carboxylic acid (preferably, methacrylic acid or itaconic acid), thereby obtaining an emulsion which is stable under the action of the component (B) as a stabilizer. The pH is then adjusted to 4 or lower to separate the resultant polymer from the emulsion under the action of the component (B) as a powdering agent. The thus-separated polymer is dehydrated and dried, whereby a powder composition is obtained.

Concerning the weight ratio of the radically-polymerizable, unsaturated-bond-containing monomer (A) to the water-soluble copolymer (B), it is preferred to use (B) in an amount of from 1 to 10 parts by weight per 100 parts by weight of (A). It is described that an amount of (B) smaller than 1 part by weight cannot exhibit sufficient powdering effect for the emulsion while an amount of (B) greater than 10 parts by weight leads to an increase in production cost and is hence not needed. As a matter of fact, (B) was used in an amount of 2 parts by weight per 100 parts by weight of (A) in Examples 7 to 9.

It is also disclosed that, when methacrylic acid or itaconic acid is used as an unsaturated carboxylic acid monomer upon production of a water-soluble copolymer, the resulting water-soluble copolymer has a function as a powdering agent at a composition ratio of methacrylic acid or itaconic acid to methacrylamide in a range of from 9/1 to 1/9. Further, as a method for lowering the pH, it is disclosed to add hydrochloric acid or the like under stirring.

The theme dealt with by the technique of this publication is limited to powdering of a polymer, so that redispersion of the polymer so powdered is not contemplated at all. The powdered polymers disclosed in this publication therefore has no inherent redispersibility.

Japanese Patent Publication No. 54973/1991

Japanese Patent Publication No. 54973/1991 in the name of Wacker-Chemie GMBH discloses a technique for producing dispersible powder having excellent flowability and good redispersibility by subjecting one or more ethylenically unsaturated compounds to emulsion polymerization in the presence of a specific protective colloid and a free-radical initiator and then drying the resultant polymer.

Described specifically, in an aqueous medium containing 5 wt. % or more of a protective colloid—which is selected from a water-soluble starch having an amylose content of 30 wt. % or less, a water-swellable starch, a dispersible starch, a cyanoalkylated, hydroxyalkylated or carboxylated starch or a water-soluble protein—and a free-radical initiator (e.g., isopropyl hydroperoxide), one or more copolymerizable, ethylenically unsaturated compounds are subjected to emulsion (co)polymerization, whereby an aqueous dispersion having a water content of from 10 to 75 wt. % is obtained.

This aqueous dispersion is next subjected to spray drying optionally after adding a detackifier (e.g., PVA) and/or an atomizing aid (e.g., dextrin) in an amount of 0 to 40 wt. % as needed.

Japanese Patent Laid-Open No. 210336/1991

Japanese Patent Laid-Open No. 210336/1991 in the name of Nippon Paint Co., Ltd. discloses a technique for obtaining crosslinked resin particles from a resin Japanese Patent Publication No. 59324/1992

Japanese Patent Publication No. 59324/1992 in the name of BASF AG discloses a process for producing a polymer powder permitting storage at room temperature and having stick-free property and water redispersibility by spray drying an aqueous dispersion which contains a vinylpyrrolidone-vinyl acetate copolymer or a water-soluble alkali (or alkaline earth) metal salt of a naphthalenesulfonic acid-formaldehyde condensation product.

Described specifically, an aqueous dispersion of a polymer is spray-dried after adding, as a water-soluble polymer substance, a copolymer (A) obtained from 20–70 wt. % of vinylpyrrolidone and 30–80 wt. % of vinyl acetate and/or a water-soluble alkali metal salt or alkaline earth metal salt (B) of a naphthalene-sulfonic acid-formaldehyde condensation product in an amount of from 2 to 40 wt. % based on the polymer in the dispersion.

The redispersible polymer powder obtained in the above-described manner is suited as an additive especially for a hydraulic binder, for example, gypsum, cement, mortar and magnesia cement.

Japanese Patent Laid-Open No. 194681/1993

Japanese Patent Laid-Open No. 194681/1993 in the having a glass transition point of 0° C. or lower by a particular post-emulsification method, which comprises subjecting the resin to the post-emulsification method after addition of specific plural substances to the resin, thereby obtaining crosslinked resin particles free from interparticulate cohesion and excellent in redispersibility and storage stability.

Described specifically, the technique is a process for obtaining crosslinked resin particles by post emulsification, which comprises the following steps: dispersing a resin component in water from a resin having a glass transition point (Tg) of 0° C. or lower, for example, an elastomer such as acrylic rubber, polybutadiene, polyisoprene, chloroprene, poly (ε-caprolactone) or poly(tetramethylene glycol), forming an interior of each dispersed particle into a three-dimensional structure and then removing the aqueous medium. The process features that the resin component is subjected to the post emulsification after the resin component is added with a monomer (e.g., styrene) capable of affording a resin having a Tg 20° C. higher in the polymerized form than the resin component and or a resin (e.g., PS) having a Tg 20° C. higher than the resin component and also with a polyfunctional vinyl compound (e.g., neopentyl glycol methacrylate). name of Rohm & Haas Co. discloses a technique, which relates to a process for producing a novel redispersible core-shell polymer powder effective as a mortar modifier.

Namely, disclosed is a redispersible polymer powder obtained by spray-drying a core-shell polymer which has been produced by polymerizing cores in the presence of alkali-soluble shells and which is formed of cores and shells chemically grafted together owing to the use of a polyfunctional compound.

Described more specifically, disclosed is a redispersible polymer powder produced from a core-shell polymer which has shells made of an alkali-soluble emulsion polymer and cores made of a water-insoluble emulsion polymer, the polymer of each of said shells and the polymer of its corresponding core having been chemically graft-bonded together by the use of a polyfunctional compound. This core-shell polymer is produced by a two-step successive emulsion polymerization process, that is, by polymerizing cores of an alkali-insoluble emulsion polymer in the presence of an emulsion polymer which has been solubilized with an alkali. Use of the core-shell polymer powder of this invention as a cement modifier has been confirmed to improve physical properties of the powder and hence to provide cement mortar having improved properties.

Japanese Language Laid-Open Publication (PCT) No. 501575/1993

Japanese Language Laid-Open Publication (PCT) No. 501575/1993 in the name of Henkel KG Auf Aktien) discloses a process for the production of a stable polymer dispersion by employing as a stabilizer an amphoteric polymer which has excellent shear stability and water-proofness and is useful inter alia as a finish for textile products. The amphoteric polymer is obtained by adjusting the pH of an aqueous solution of a stabilizer composed of a starting amphoteric polymer to an isoelectric point with an acid or the like to cause the starting amphoteric polymer to precipitate from the aqueous solution, adjusting the pH of the aqueous solution to redissolve the precipitate, adding a catalyst and the like and then conducting emulsion polymerization.

Described specifically, the pH of an aqueous solution of a stabilizer composed of a starting amphoteric polymer is adjusted to an isoelectric point with a non-volatile acid or base to cause the starting amphoteric polymer to precipitate. Using a volatile base or acid, the pH of the solution is adjusted to a value desirable for emulsion polymerization, so that the precipitate is redissolved. Thereafter, an unsaturated monomer of the vinyl structure is neutralized with a non-volatile neutralizing agent and is added together with a catalyst and one or more optional aids, followed by emulsion polymerization so that the target dispersion is obtained.

B. Conventional Techniques on Protective Colloid Polymerization

Protective colloid polymerization is a polymerization process which is known to the public and is used publicly.

The concepts of the terms "protective colloid polymerization" and "protective colloid" as well as the concept and principle of protective colloid polymerization are disclosed in introductory textbooks, for example, Tsunetaka Matsumoto: "Kogyo Zairyo (Industrial Material), Emarushion Gairon (Introduction to Emulsion)", 24(3), 10–15.

In particular, visual and readily-understandable explanations are found in "FIG. 2 Shinsuisei Monoma no Nyuka Jyugo (Emulsion Polymerization of Hydrophilic Monomers" (page 12) and its description [under "Shinsuisei Monoma no Nyuka Jyugo (Emulsion Polymerization of Hydrophilic Monomers" on page 12] and further in "FIG. 3 Mizu Emarushion no Anteika (Stabilization of Aqueous Emulsion)" (page 13) and its description [under "Mizu Emarushion no Anteika (Stabilization of Aqueous Emulsion)" on pages 12–13].

Unless otherwise specifically indicated, all publications and parts thereof cited herein are incorporated herein by reference so that matters directly and conceivable by a person having ordinary knowledge in the present field of art based on the matters disclosed herein with reference to such cited parts shall be construed as being disclosed herein.

Illustrative of specific examples of known techniques on protective colloid polymerization are those disclosed in Japanese Patent Laid-Open Nos. 173003/1990 and 185607/1992, which will be described hereinafter.

Japanese Patent Laid-Open No. 185607/1992

Japanese Patent Laid-Open No. 185607/1992 in the name of Hoechst Gosei K. K. discloses an invention on a redispersible acrylic resin emulsion powder of the protective colloid type and its production process. Namely, an acrylic monomer is subjected to emulsion (co)polymerization in the presence of a specific amount of a chain transfer agent while using a water-soluble protective colloid. The resulting emulsion is spray-dried, whereby the above-described powder excellent in redispersibility, film properties and the like is obtained. Described specifically, using a water-soluble protective colloid (e.g., polyvinyl alcohol), an acrylic monomer (e.g., methyl methacrylate) is subjected to emulsion polymerization in the presence of a chain transfer agent (e.g., trichloroethylene) in an amount of from 0.1 to 50 wt. % on the basic of the acrylic monomer, optionally together with 30 wt. % or less of a copolymerizable monomer (e.g., styrene). The resulting acrylic resin emulsion is then spray-dried, so that a redispersible acrylic resin emulsion of the protective colloid type is obtained. The resin emulsion powder so obtained is suitably usable as an adhesive, a paint binder, a cement additive and the like.

Japanese Patent Laid-Open No. 173003/1990

Japanese Patent Laid-Open No. 173003/1990 in the name of Mitsui-Toatsu Chemicals Inc. discloses a technique for efficiently obtaining porous polymer particles without inclusion of impurities such as a dispersant, a diluent and the like by dispersing an oil phase, which contains a polymerizable monomer and a diluent, in an aqueous medium containing a dispersant and then polymerizing the resultant dispersion under specific conditions.

Described specifically, in an aqueous medium (b) containing 0.1–10 wt. % of a dispersant (a) which is a partially-saponified PVA having a saponification degree of 50–95%, an oil phase (e) containing a polymerizable monomer (c), which is a monomer insoluble or sparingly soluble in the component (b) and contains a vinyl group, and a diluent (d) which is soluble in the component (c) but insoluble or sparingly soluble in the component (b) and has no polymerizability is dispersed in the form of spheres of 1–50 μm in diameter at a volume ratio of the component (b) to the component (c) in an range of from 10:1 to 1:1. While polymerizing the component (c), the dispersed particles are caused, in their spherical forms, to flocculate into sizes of from 0.1 to 3 mm in diameter so that a polymer particle flocculate is obtained. This flocculate is then washed to remove the component (a). Subsequent to extraction of the component (d), the flocculate is redispersed to sizes of from 1 to 5 μm.

C. Technical Background Concerning Redispersibility and Film-Forming Properties

Redispersibility and Film-Forming Properties

Redispersible polymers or their powders include those incapable of forming films at room temperature when reconstituted to redispersions. To be usable for a wide range of applications, a redispersible polymer or a powder thereof whose reconstituted redispersion dries at room temperature into a film is however preferred. When an aqueous emulsion such as that capable of forming a film at room temperature is dried, a serious problem arises, that is, the polymer is so soft that dispersed particles of the polymer undergo aggregation and cohesion and the redispersibility is lost.

Anti-Binding Agent

To avoid mutual aggregation and cohesion of powder particles, it is known to add as an anti-binding agent a fine inorganic powder or a fine organic powder having no binding ability.

Such a method however involves a problem in that, when a film is formed by drying a redispersion, undesirous effects are given to various properties such as transparency. This has imposed a considerable limitation on the utility and application field.

Among applications of a redispersible polymer or its powder, a cement additive is expected to develop less problems even when fine inorganic power is mixed. Even in the case of such a cement additive, an increase in flow value is observed due to large hygroscopicity of the fine inorganic powder, thereby making it necessary to increase the water/cement ratio.

Further problems have also been observed, including production of cement products having high hygroscopicity and also production of cement products prone to dusting of fine powder and hence to non-uniformity in composition.

For such problems, it has been desired to develop a redispersible polymer which does not require such an anti-binding agent.

Core-Shell Polymers Having Alkali-Soluble Shells

Among the conventional techniques on redispersible polymer powders, the method making use of a core-shell polymer equipped with alkali-soluble shells is accompanied by a problem in redispersibility because the shells have a low density due to their solubility and are unable to completely prevent cohesion of particles during drying.

Moreover, omission of an anti-binding agent results in a new problem that the cohesion of particles cannot be prevented.

Spray Drying Technique

Most redispersible polymer powders are produced by spray drying, which directly obtains powder by causing water to evaporate while preventing aggregation.

Conventional spray drying however involves a problem in redispersibility, because powder is dried usually at a temperature as high as 100° C. or higher and cohesion of particles cannot be prevented completely.

In some instances, a deposit or the like occurs on an inner wall of a drying tower upon spray drying, leading to a substantial reduction in yield.

A further serious problem is also involved in that enormous time and energy are needed in large-scale production or batchwise production.

The present inventors considered that the conventional techniques for the production of a redispersible polymer or its powder are not satisfactory for the need for such enormous time and energy.

D. Technical Background Concerning Cement Additives

Dai 50 Kai Semento Gijyutsu Taikai Koen Yoshishu (Abstracts of Lectures at the 50th Cement Technology Symposium), 324–325, 1996

A polymer cement mortar with a redispersible powder resin mixed therein is described to still involve an unsolved technical problem in redispersibility or the like and to result in lowered compression strength and/or flexural strength in some instances.

Dai 50 Kai Semento Gijyutsu Taikai Koen Yoshishu (Abstracts of Lectures at the 50th Cement Technology Symposium), 322–323, 1996

A polymer cement mortar with a redispersible powder resin mixed therein is described to have tendency to permit introduction of air into cement so that in some instances, the compression strength and/or flexural strength may be reduced to adversely affect various physical properties.

In view of the above-described teachings, development of a redispersible powder resin excellent in redispersibility, if succeeded, is expected to provide polymer cement mortar with improved physical properties because such a redispersible powder resin makes it possible to complete the mixing of water, cement, sand and the like in a short time and hence to reduce the amount of air to be introduced into cement.

SUMMARY OF THE INVENTION

In view of the above-described problems of the conventional techniques, the present inventors found it to be an extremely meaningful theme to provide a high-quality redispersible polymer product of the piping-cost saving, transportation-cost saving and waste-material reducing type by an efficient production process of the energy saving, labor saving, space saving and process simplifying type totally different from the conventional redispersible-polymer production techniques which require enormous time and energy (for example, those making use of spray drying or the like).

Namely, the following themes (1) and (2) were sought for achievement in the present invention.

(1) Powdering of a polymer: this is a theme to cause precipitation of (co)polymer particles in a polymer emulsion without aggregation.

(2) Redispersion of a powdered polymer: this is a theme to provide the (co)polymer particles, which has been converted into powder as described above under (1), with a function to be substantially redispersible in water of pH 5 or higher.

Such unique recognitions of the present inventors have been scarcely acknowledged by artisans to date.

Accordingly, the "themes sought for achievement by the invention" which served as a basis for the completion of the present invention have themselves novelty and unobviousness, to say nothing of the possession of novelty and unobviousness by the present invention.

As a result of an extensive investigation, the present inventors have found that an aqueous emulsion available by the polymerization of an ethylenically unsaturated monomer in the presence of a protective colloid under specific conditions forms a flocculate by the addition of an acid or a metal salt and moreover, this flocculate surprisingly has a function to be substantially redispersible in water of pH 5 or higher, leading to the completion of the present invention. The present invention therefore provides the following (co) polymers, and their production processes and compositions:

(1) A (co)polymer formed of particles and having a function to be substantially redispersible in water of pH 5 or higher, wherein:

said particles have a core/shell structure with at least a part of a surface of each core being covered with an associated shell;

said core is made of a (co)polymer (α2) composed of a recurring unit and 0 wt. % or more but less than 40 wt. % of at least one recurring unit selected from the group consisting of recurring units having pendant groups represented by the following formula (1) and the group consisting of recurring units having pendant groups represented by the following formula (2):

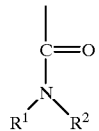

(1)

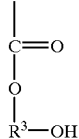

(2)

wherein in the formula (1), $R^1$ and $R^2$ are either the same or different and individually represent a hydrogen atom, an alkyl group having 1–12 carbon atoms, or an OH-containing alkyl group having 1–12 carbon atoms and in the formula (2), $R^3$ represents an alkylene group having 1–30 carbon atoms or $R^3$, together with the hydroxyl group bonded thereto, represents —$(R^{22}$—O$)_n$—H in which n stands for an integer of 2 to 33 and $R^{22}$s may be the same or different and individually represents an alkylene group having 2–5 carbon atoms;

said shell is made of a (co)polymer (α1) composed of a recurring unit and 20 wt. % or more but not greater than 100 wt. % of at least one recurring unit selected from the group consisting of said recurring units having said pendant groups represented by the formula (1) and the group consisting of said recurring units having said pendant groups represented by the formula (2);

based on the total weight of (α1) and (α2), (α1) ranges from 15 to 85 wt. % while (α2) ranges from 85 to 15 wt. %; and said at least one recurring unit having said pendant group represented by the formula (1) and/or (2) in (α1) is contained at a higher content than said at least one recurring unit in (α2).

(2) A (co)polymer having a function to be substantially redispersible in water of pH 5 or higher, wherein:

said (co)polymer is a mixture of particles (A) and a protective colloid;

said particles (A) are made of a (co)polymer (α2) composed of a recurring unit and 0 wt. % or more but less than 40 wt. % of at least one recurring unit selected from the group consisting of recurring units having pendant groups represented by the following formula (1) and the group consisting of recurring units having pendant groups represented by the following formula (2):

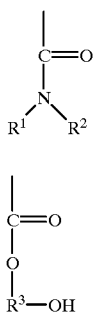

(1)

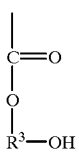

(2)

wherein in the formula (1), $R^1$ and $R^2$ are either the same or different and individually represent a hydrogen atom, an alkyl group having 1–12 carbon atoms, or an OH-containing alkyl group having 1–12 carbon atoms and in the formula (2), $R^3$ represents an alkylene group having 1–30 carbon atoms or $R^3$, together with the hydroxyl group bonded thereto, represents —$(R^{22}$—$O)_n$—H in which n stands for an integer of 2 to 33 and $R^{22}$s may be the same or different and individually represents an alkylene group having 2–5 carbon atoms;

said protective colloid is made of a (co)polymer (α1) composed of a recurring unit and 20 wt. % or more but not greater than 100 wt. % of at least one recurring unit selected from the group consisting of said recurring units having said pendant groups represented by the formula (1) and the group consisting of said recurring units having said pendant groups represented by the formula (2);

based on the total weight of (α1) and (α2), (α1) ranges from 15 to 85 wt. % while (α2) ranges from 85 to 15 wt. %; and said at least one recurring unit having said pendant group represented by the formula (1) and/or (2) in (α1) is contained at a higher content than said at least one recurring unit in (α2).

(3) A (co)polymer as described above under the item (1) or (2), wherein of said recurring units making up each of (α1) and (α2), the recurring unit other than said at least one recurring unit having said pendant group represented by the formula (1) and/or (2) is composed of at least one of the following structural units (v) to (z):

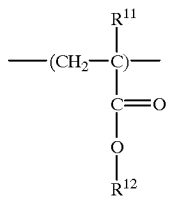

(v)

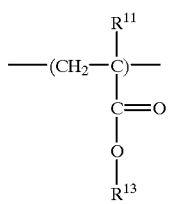

(w)

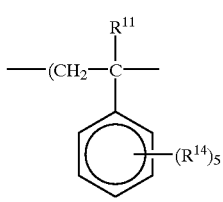

(x)

—$(R^{15})$—

(y)

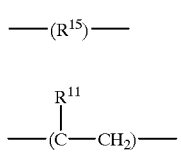

(z)

wherein $R^{11}$ represents a hydrogen atom or a methyl group, $R^{12}$ represents a hydrogen atom or an alkyl group having 1–12 carbon atoms, $R^{13}$ represents a hydrogen atom, an alkyl group having 1–20 carbon atoms, an alkenyl group having 1–20 carbon atoms or a phenyl group, $R^{14}$s are the same or different and individually represent a hydrogen atom, an alkyl group having 1–12 carbon atoms, a sulfonic group or a metal sulfonate group, and $R^{15}$ represents a divalent hydrocarbon group having 1–6 carbon atoms.

(4) A (co)polymer as described above under any one of the items (1) to (3), wherein (α1) comprises 20 wt. % or more but not greater than 100 wt. % of at least one recurring unit selected from the group consisting of said recurring units having said pendant groups represented by the following formula (2):

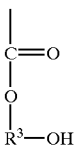

(2)

wherein $R^3$ represents an alkylene group having 1–30 carbon atoms or $R^3$, together with the hydroxyl group bonded thereto, represents —$(R^{22}$—$O)_n$—H in which n stands for an integer of 2 to 33 and $R^{22}$s may be the same or different and individually represents an alkylene group having 2–5 carbon atoms.

(5) A (co)polymer as described above under item (4), wherein said at least one recurring unit having said pendant group represented by the formula (2) has been derived from 2-hydroxyethyl methacrylate.

DESCRIPTION OF THE PREFERRED EMBODIMENTS

Specific processes for the production of the above-described (co)polymers include:

(6) A process for the production of a (co)polymer having a function to be substantially redispersible in water of pH 5 or higher, which comprises:

as step 1 (aqueous emulsion preparation step), subjecting a reaction mixture, which comprises:

a protective colloid (α1) obtained by radical (co)polymerization of an ethylenically unsaturated monomer comprising 20 wt. % or more but not greater than 100 wt. % of at least one monomer selected from the group consisting of ethylenically unsaturated monomers having pendant groups represented by the following formula (1) and the group consisting of ethylenically unsaturated monomers having pendant groups represented by the formula (2):

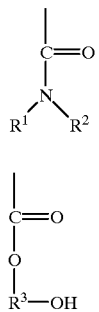

and an ethylenically unsaturated monomer for forming a copolymer (a2), said ethylenically unsaturated monomer comprising 0 wt. % or more but less than 40 wt. % of at least one monomer selected from the group consisting of said ethylenically unsaturated monomers having said pendant groups represented by the formula (1) and the group consisting of said ethylenically unsaturated monomers having said pendant groups represented by the formula (2), to radical (co)polymerization so that based on the total weight of (a1) and (a2), (a1) ranges from 15 to 85 wt. % while (a2) ranges from 85 to 15 wt. % and said at least one monomer having said pendant group represented by the formula (1) and/or (2) in (a1) is contained at a higher content than said at least one monomer in (a2), whereby an aqueous emulsion formed of a dispersed phase of (co)polymer particles (A) and a continuous phase of water is prepared; and as step 2 (flocculate forming step), adding a mineral acid and/or an organic acid to said aqueous emulsion, which has been prepared in step 1, to adjust the pH of said aqueous emulsion to 4 or lower, whereby said (co)polymer particles (A) are caused to flocculate and a flocculate (A') of said (co)polymer is formed.

(7) A process for the production of a (co)polymer having a function to be substantially redispersible in water of pH 5 or higher, which comprises:

as step 1 (core particle polymerization step), emulsion (co)polymerizing, into a (co)polymer (a2), an ethylenically unsaturated monomer comprising 0 wt. % or more but less than 40 wt. % of at least one monomer selected from the group consisting of ethylenically unsaturated monomers having pendant groups represented by the following formula (1) and the group consisting of ethylenically unsaturated monomers having pendant groups represented by the following formula (2):

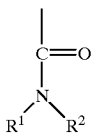

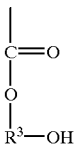

wherein in the formula (1), $R^1$ and $R^2$ are either the same or different and individually represent a hydrogen atom, an alkyl group having 1–12 carbon atoms, or an OH-containing alkyl group having 1–12 carbon atoms and in the formula (2), $R^3$ represents an alkylene group having 1–30 carbon atoms or $R^3$, together with the hydroxyl group bonded thereto, represents —$(R^{22}$—O$)_n$—H in which n stands for an integer of 2 to 33 and $R^{22}$s may be the same or different and individually represents an alkylene group having 2–5 carbon atoms, whereby an aqueous emulsion formed of a dispersed phase of (co)polymer core particles (A°) and a continuous phase of water is prepared;

as step 2 (shell polymerization step), subjecting a reaction mixture, which comprises:

said (co)polymer core particles (A') in said aqueous emulsion prepared in step 1, and an ethylenically unsaturated monomer for forming a copolymer (a1), said ethylenically unsaturated monomer comprising 20 wt. % or more but not greater than 100 wt. % of at least one monomer selected from the group consisting of said ethylenically unsaturated monomers having said pendant groups represented by the formula (1) and the group consisting of said ethylenically unsaturated monomers having said pendant groups represented by the formula (2), to radical (co)polymerization so that based on the total weight of (a1) and (a2), (a1) ranges from 15 to 85 wt. % while (a2) ranges from 85 to 15 wt. % and said at least one monomer having said pendant group represented by the formula (1) and/or (2) in (a1) is contained at a higher content than said at least one monomer in (a2), whereby shells (S) made of a protective colloid are formed on at least parts of surfaces of said (co)polymer core particles (A°) in said aqueous emulsion prepared in step 1 and an aqueous emulsion formed of a dispersed phase of core/shell (co)polymer particles (A) having a core/shell structure with at least a part of a surface of each core being covered with an associated shell and a continuous phase of water is prepared; and as step 3 (flocculate forming step),
adding a mineral acid and/or an organic acid to said aqueous emulsion, which has been prepared in step 2, to adjust the pH of said aqueous emulsion to 4 or lower, whereby said core/shell (co)polymer particles (A) are caused to flocculate and a flocculate (A') of said (co) polymers is formed.

(8) A process for the production of a (co)polymer having a function to be substantially redispersible in water of pH 5 or higher, which comprises:

as step 1 (aqueous emulsion preparation step),
emulsion (co polymerizing, into a (co)polymer (a2), an ethylenically unsaturated monomer comprising 0 wt. % or more but less than 40 wt. % of at least one monomer selected from the group consisting of ethylenically unsaturated monomers having pendant groups represented by the following formula (1) and the group consisting of ethylenically unsaturated monomers having pendant groups represented by the following formula (2):

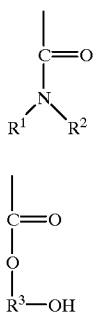

(1)

(2)

wherein in the formula (1), $R^1$ and $R^2$ are either the same or different and individually represent a hydrogen atom, an alkyl group having 1–12 carbon atoms, or an OH-containing alkyl group having 1–12 carbon atoms and in the formula (2), $R^3$ represents an alkylene group having 1–30 carbon atoms or $R^3$, together with the hydroxyl group bonded thereto, represents —$(R^{22}—O)_n$—H in which n stands for an integer of 2 to 33 and $R^{22}$s may be the same or different and individually represents an alkylene group having 2–5 carbon atoms, whereby an aqueous emulsion formed of a dispersed phase of (co)polymer core particles (A°) and a continuous phase of water is prepared;

as step 2 (protective colloid preparation step),
conducting radical (co)polymerization of an ethylenically unsaturated monomer comprising 20 wt. % or more but not greater than 100 wt. % of at least one monomer selected from the group consisting of said ethylenically unsaturated monomers having said pendant groups represented by the formula (1) and the group consisting of said ethylenically unsaturated monomers having said pendant groups represented by the formula (2), whereby a protective colloid (a1) is prepared;

As step 3 (mixing step),
mixing said aqueous emulsion prepared in step 1 with said protective colloid prepared in step 2 so that based on the total weight of (a1) and (a2), (a1) ranging from 15 to 85 wt. % while (a2) ranging from 85 to 15 wt. % and said at least one monomer having said pendant group represented by the formula (1) and/or (2) in (a1) is contained at a higher content than said at least one monomer in (a2); and as step 4 (flocculate forming step),
adding a mineral acid and/or an organic acid to a mixture of said aqueous emulsion and said protective colloid, which has been obtained in step 3, to adjust the pH of said mixture to 4 or lower, whereby said (co)polymer particles (A) and said protective colloid are caused to flocculate and a flocculate (A') of said (co)polymers is formed.

(9) A process for the production of a (co)polymer having a function to be substantially redispersible in water of pH 5 or higher, which comprises:

as step 1 (aqueous emulsion preparation step), subjecting a reaction mixture, which comprises:

a protective colloid (a1) obtained by radical (co) polymerization of an ethylenically unsaturated monomer comprising 20 wt. % or more but not greater than 100 wt. % of at least one monomer selected from the group consisting of ethylenically unsaturated monomers having pendant groups represented by the following formula (1) and the group consisting of ethylenically unsaturated monomers having pendant groups represented by the formula (2):

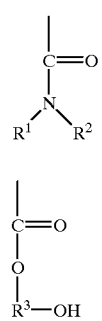

(1)

(2)

wherein in the formula (1), $R^1$ and $R^2$ are either the same or different and individually represent a hydrogen atom, an alkyl group having 1–12 carbon atoms, or an OH-containing alkyl group having 1–12 carbon atoms and in the formula (2), $R^3$ represents an alkylene group having 1–30 carbon atoms or $R^3$, together with the hydroxyl group bonded thereto, represents —$(R^{22}—O)_n$—H in which n stands for an integer of 2 to 33 and $R^{22}$s may be the same or different and individually represents an alkylene group having 2–5 carbon atoms, and an ethylenically unsaturated monomer for forming a copolymer (a2), said ethylenically unsaturated monomer comprising 0 wt. % or more but less than 40 wt. % of at least one monomer selected from the group consisting of said ethylenically unsaturated monomers having said pendant groups represented by the formula (1) and the group consisting of said ethylenically unsaturated monomers having said pendant groups represented by the formula (2), to radical (co)polymerization so that based on the total weight of (a1) and (a2), (a1) ranges from 15 to 85 wt. % while (a2) ranges from 85 to 15 wt. % and said at least one monomer having said pendant group represented by the formula (1) and/or (2) in (a1) is contained at a higher content than said at least one monomer in (a2), whereby an aqueous emulsion formed of a dispersed phase of (co)polymer particles (A) and a continuous phase of water is prepared; and as step 2 (flocculate forming step), adding a metal salt to said aqueous emulsion, which has been prepared in step 1, to salt out said (co)polymer particles (A), whereby a flocculate (A') of said (co)polymer is formed.

(10) A process for the production of a (co)polymer having a function to be substantially redispersible in water of pH 5 or higher, which comprises:

as step 1 (core particle polymerization step), emulsion (co)polymerizing, into a (co)polymer (a2), an ethylenically unsaturated monomer comprising 0 wt. % or more but less than 40 wt. % of at least one monomer selected from the group consisting of ethylenically unsaturated monomers having pendant groups represented by the following formula (1) and the group consisting of ethylenically unsaturated monomers having pendant groups represented by the following formula (2):

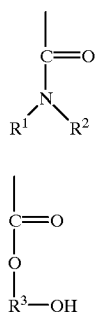

wherein in the formula (1), $R^1$ and $R^2$ are either the same or different and individually represent a hydrogen atom, an alkyl group having 1–12 carbon atoms, or an OH-containing alkyl group having 1–12 carbon atoms and in the formula (2), $R^3$ represents an alkylene group having 1–30 carbon atoms or $R^3$, together with the hydroxyl group bonded thereto, represents —$(R^{22}$—$O)_n$—H in which n stands for an integer of 2 to 33 and $R^{22}$s may be the same or different and individually represents an alkylene group having 2–5 carbon atoms, whereby an aqueous emulsion formed of a dispersed phase of (co)polymer core particles (A°) and a continuous phase of water is prepared;

as step 2 (shell polymerization step), subjecting a reaction mixture, which comprises:

said (co)polymer core particles (A°) in said aqueous emulsion prepared in step 1, and an ethylenically unsaturated monomer for forming a copolymer (a1), said ethylenically unsaturated monomer comprising 20 wt. % or more but not greater than 100 wt. % of at least one monomer selected from the group consisting of said ethylenically unsaturated monomers having said pendant groups represented by the formula (1) and the group consisting of said ethylenically unsaturated monomers having said pendant groups represented by the formula (2), to radical (co)polymerization so that based on the total weight of (a1) and (a2), (a1) ranges from 15 to 85 wt. % while (a2) ranges from 85 to 15 wt. % and said at least one monomer having said pendant group represented by the formula (1) and/or (2) in (a1) is contained at a higher content than said at least one monomer in (a2), whereby shells (S) made of a protective colloid are formed on at least parts of surfaces of said (co)polymer core particles (A°) in said aqueous emulsion prepared in step 1, whereby an aqueous emulsion formed of a dispersed phase of core/shell (co)polymer particles (A) having a core/shell structure with at least a part of a surface of each core being covered with an associated shell and a continuous phase of water is prepared; and as step 3 (flocculate forming step), adding a metal salt to said aqueous emulsion, which has been prepared in step 2, to salt out said core/shell (co)polymer particles (A), whereby a flocculate (A') of said (co)polymer is formed.

(11) A process for the production of a (co)polymer having a function to be substantially redispersible in water of pH 5 or higher, which comprises:

as step 1 (aaueous emulsion preparation step), emulsion (co)polymerizing, into a (co)polymer (a2), an ethylenically unsaturated monomer comprising 0 wt. % or more but less than 40 wt. % of at least one monomer selected from the group consisting of ethylenically unsaturated monomers having pendant groups represented by the following formula (1) and the group consisting of ethylenically unsaturated monomers having pendant groups represented by the following formula (2):

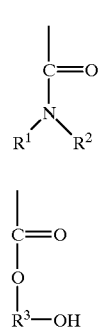

wherein in the formula (1), $R^1$ and $R^2$ are either the same or different and individually represent a hydrogen atom, an alkyl group having 1–12 carbon atoms, or an OH-containing alkyl group having 1–12 carbon atoms and in the formula (2), $R^3$ represents an alkylene group having 1–30 carbon atoms or $R^3$, together with the hydroxyl group bonded thereto, represents —$(R^{22}$—$O)_n$—H in which n stands for an integer of 2 to 33 and $R^{22}$s may be the same or different and individually represents an alkylene group having 2–5 carbon atoms, whereby an aqueous emulsion formed of a dispersed phase of (co)polymer core particles (A°) and a continuous phase of water is prepared;

as step 2 (protective colloid preparation step), conducting radical (co)polymerization of an ethylenically unsaturated monomer comprising 20 wt. % or more but not greater than 100 wt. % of at least one monomer selected from the group consisting of said ethylenically unsaturated monomers having said pendant groups represented by the formula (1) and the group consisting of said ethylenically unsaturated monomers having said pendant groups represented by the formula (2);

as step 3 (mixing step), mixing said aqueous emulsion prepared in step 1 with said protective colloid prepared in step 2 so that based on the total weight of (a1) and (a2), (a1) ranges from 15 to 85 wt. % while (a2) ranges from 85 to 15 wt. % and said at least one monomer having said pendant group represented by the formula (1) and/or (2) in (a1) is contained at a higher content than said at least one monomer in (a2); and as step 4 (flocculate forming step), adding a metal salt to a mixture of said aqueous emulsion and said protective colloid, which has been obtained in step 3, to salt out said (co)polymer particles (A) and said protective colloid, whereby a flocculate (A') of said (co)polymer is formed.

(12) A process as described above under any one of the items (6) to (11), wherein (a1) is obtained using at least one monomer selected from the group consisting of said ethylenically unsaturated monomers having said pendant groups represented by the following formula (2):

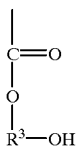

(2)

wherein $R^3$ represents an alkylene group having 1–30 carbon atoms or $R^3$, together with the hydroxyl group bonded thereto, represents $—(R^{22}—O)_n—H$ in which n stands for an integer of 2 to 33 and $R^{22}$s may be the same or different and individually represents an alkylene group having 2–5 carbon atoms.

(13) A process as described above under item (12), wherein said at least one monomer is 2-hydroxyethyl methacrylate.

(14) A (co)polymer having a function to be substantially redispersible in water of pH 5 or higher and obtained by a process as described above under any one of the items (7) to (13).

(15) A (co)polymer substantially redispersible at pH 5 or higher, wherein:

said (co)polymer is in the form of particles having a shell/core structure with at least a part of a surface of each core being covered with an associated shell;

said core is made of a water-insoluble (co)polymer; and said shell is made of a (co)polymer water-soluble at pH 5 or higher.

(16) A (co)polymer substantially redispersible at pH 5 or higher, wherein:

said (co)polymer is in the form of particles having a shell/core structure with at least a part of a surface of each core being covered with an associated shell;

said core is made of a water-insoluble (co)polymer;

said shell is made of a (co)polymer water-soluble at pH 5 or higher; and said shells account for at least 15 wt. % of the total weight of said cores and said shells.

(17) Particles substantially free of intraparticular blocking property, wherein:

said particles have a shell/core structure with at least a part of a surface of each core being covered with an associated shell;

said cores have a glass transition point in a range of from −40 to +30° C.; and said shells have a glass transition point at least 10° C. higher than said glass transition point of said cores, account for at least 15 wt. % of the total weight of said particles, and have a function to flocculate at pH 4 or lower.

(18) A hydraulic cement composition comprising 0.5–60 wt. %, based on hydraulic cement, of a (co)polymer as described above under the items (1) to (5) and (14) to (17) as calculated in a dry state.

(19) A method for the formation of a hardened cement body, which comprises mixing a hydraulic cement composition, which has been added with 0.5–60 wt. %, based on hydraulic cement, of a (co)polymer as described above under any one of the items (1) to (5) and (14) to (17) as calculated in a dry state, with water and then placing the resultant cement-water mixture.

As the flocculate according to the present invention can be readily subjected to solid-liquid separation by a simple operation such as filtration, centrifugation or decantation, it is not absolutely needed to conduct spray drying.

Another characteristic feature of such a flocculate resides in that any mixed protective colloid, free acid and other free water-soluble substances can be eliminated by washing the flocculate during and/or subsequent its solid-liquid separation.

Such a flocculant is characterized in that it has excellent anti-binding property without the need for an anti-binding agent (fine inorganic power, fine organic powder, or the like) as an essential component.

When used as a cement modifier, the redispersible (co) polymer according to the present invention improves the tensile strength, flexural strength, compression strength, bonding strength, wear resistance and the like of cement.

It is the characteristic feature of the present invention that an anti-binding agent (for example, a fine inorganic powder, a fine organic powder having no film-forming property, or the like) is not absolutely required. As applications other than the above-mentioned cement modifier, the present invention can be applied to a wide variety of fields where an aqueous emulsion is usually employed, for example, construction materials, papermaking chemicals, paints, adhesives, fiber finishes and the like.

Incidentally, no particular limitation is imposed on the form, shape and morphology of the "(co)polymer having a function to be substantially redispersible in water of pH 5 or higher" according to the present invention insofar as the "(co)polymer" has the function to be substantially redispersible in water of pH 5 or higher. In general, the redispersible (co)polymer according to the present invention is preferably in the form of powder, granules, paste, wet cake available after filtration, or beads or the like available by granulation of such powder, granules, paste or wet cake.

The present invention will hereinafter be described in detail.

A. Basic Concept

The glass transition point (Tg) of each (co)polymer described herein can be measured by a method known per se in the art, for example, by DSC or the like. In the case of a copolymer, its glass transition point is measured as will be described below.

Measured Glass Transition Point—Measurement of Glass Transition Point (Tg) of Copolymer The glass transition point (Tg) of a copolymer is measured and evaluated as will be described below.

The glass transition point (Tg) of a copolymer having a specific monomer composition can be determined by conducting a calculation in accordance with the Fox's equation. According to the Fox's equation, the Tg of a copolymer can be calculated on the basis of the Tgs of homopolymers of individual monomers forming the copolymer. Its details are described in Bulletin of the American Physical Society, Series 2, 1(3), 123, 1956. The term "calculated glass transition point" as used herein embraces glass transition points calculated in accordance with the Fox's equation.

As the Tgs of homopolymers of various monomers based on which Tgs of copolymers can be calculated in accordance with the Fox's equation, it is possible to use, for example, the values shown on pages 525–546 of Kobunshi Data Handbook, Volume: Basic Data (compiled by The Society of Polymer Science, Japan) or values actually measured by a method known per se in the art.

Concept of the Term "Emulsion (Co)Polymerization"

The term "emulsion (co)polymerization", which is used in the aqueous emulsion preparation step of the production process according to the present invention, embraces techniques such as not only ordinary emulsion (co)polymerization but also certain special techniques [protective colloid (co)polymerization, mini-emulsion (co)polymerization and micro-emulsion (co)polymerization].

Further, a process in which a polymer is subjected to self-emulsification or forced emulsification subsequent to its mixing with a solvent and an emulsifier is also encompassed by the concept of "emulsification" as used herein.

Protective Colloid Polymerization

The concepts of the terms "protective colloid polymerization" and "protective colloid" as well as the concept and principle of protective colloid polymerization are disclosed, for example, in an introductory textbook such as Tsunetaka Matsumoto: "Kogyo Zairyo (Industrial Material), Emarushion Gairon (Introduction to Emulsion)", 24(3), 10–15.

In particular, visual and readily-understandable explanations are found in "FIG. 2 Shinsuisei Monoma no Nyuka Jyugo (Emulsion Polymerization of Hydrophilic Monomers" (page 12) and its description [under "Shinsuisei Monoma no Nyuka Jyugo (Emulsion Polymerization of Hydrophilic Monomers" on page 12] and further in "FIG. 3 Mizu Emarushion no Anteika (Stabilization of Aqueous Emulsion)" (page 13) and its description [under "Mizu Emarushion no Anteika (Stabilization of Aqueous Emulsion)" on pages 12–13).

As a typical known example of protective colloid polymerization, the technique disclosed to the above-described Japanese Patent Laid-Open No. 173003/1990 can be mentioned.

Concept of the Term "(Co)Polymer"

The concept of the term "(co)polymer" as used herein embraces both homopolymers and copolymers.

No particular limitation is imposed on the arrangement of monomer segments in each copolymer. The copolymer can therefore be a random copolymer, an alternating copolymer, a block copolymer, a graft copolymer or the like.

The term "(co)polymer" as used herein also encompasses (co)polymers in each of which at least a part thereof has any one of linear, cyclic, macrocyclic, branched, star, three-dimensional network, IPN (interpenetrated network), PIC (polyion complex) and like structures.

Concept of the Expression "Substantially Redispersible in Water of pH 5 or Higher"

The concept of the expression "substantially redispersible in water of pH 5 or higher" as used herein means that the redispersible (co)polymer according to the present invention can show redispersibility to such an extent as not attainable by conventional spray drying. For example, it means that the value of "redispersibility (%)" as defined in Evaluation Example 1–2 to be described subsequently herein ranges from 40 to 100%, preferably from 60 to 100%, more preferably from 80 to 100%. In Evaluation Example 7–5, it is also meant that its value ranges from 20 to 100%, more preferably from 40 to 100%.

Form of Flocculate (A') of (Co)Polymer

In the present invention, a (co)polymer flocculate (A') is generally in the form of a paste containing some water in many instances.

The (co)polymer flocculate is however not limited to such a form and may also take any other form such as tablets, granules or a film.

(Co)Polymer Having a Function to be Substantially Redispersible in Water of pH 5 or Higher No particular limitation is imposed on the form, shape and morphology of the "(co)polymer having a function to be substantially redispersible in water of pH 5 or higher" according to the present invention insofar as the "(co)polymer" has the function to be substantially redispersible in water of pH 5 or higher. In general, the redispersible (co)polymer according to the present invention is preferably in the form of powder, granules or paste.

Concept of the Term "Particles"

The concept of the term "particles" as used herein fully embraces the concept which this term generally has in high-molecular chemistry, but they are not completely equivalent to each other. The scanning electron microscopic form of "particles" as used herein includes, for example, forms having many asperities like raspberries or konpeito ("confeitos" in Portuguese), flattened forms like erythrocytes, prolate-spheroidal forms like rugger balls, and spindle-shaped forms like *E. coli.*

The concept of the term "particles" as used herein embraces microspheres which form, for example, polymer emulsions, latexes or polymer suspensions. In the present invention, these exemplified forms are taken in general. As is appreciated from the foregoing, the term "particles" will be used for the sake of convenience in frequently referring to certain essential "embodiments" of a heteropolymer system according to the present invention although the concept of the term "particles" as used herein is not completely equivalent to the concept which the same term generally has in high-molecular chemistry.

Particles Having Core/Shell Structure

The terms "core", "shell" and "core/shell" as used in herein fully embrace the concepts which these terms generally have in high-molecular chemistry, but they are not completely equivalent to each other. For example, concerning "core/shell" particles according to the present invention, the term "core/shell" as used herein encompasses such embodiments that a "core" is at least partly enclosed in a "shell". As is appreciated from the foregoing, the term "core", "shell" and "core/shell" will be used for the sake of convenience in frequently referring to certain essential "embodiments" of a heteropolymer system according to the present invention although the concepts of the terms "core", "shell" and "core/shell" as used herein are not completely equivalent to the concepts which these terms generally have in high-molecular chemistry.

In high-molecular chemistry, the term "core" is generally used in a sense equivalent to the term "core", "center", "nucleus", "center" or "seed". On the other hand, the term "shell" is used in a sense equivalent to the term "skin", "husk", "sheath" or "robe".

Accordingly, the term "core", "center", "nucleus", "center" or "seed" can be used interchangeably with the term "core" as used herein, and the term "skin", "husk", "sheath" or "robe" can be used interchangeably with the term "shell" as used herein.

Structure of Particles

Examples of the particle structure of the (co)polymer particles (A) as primary particles include:

(1) a structure generally called the "core/shell" type, in which the surface of the (co)polymer particle of the ethylenically unsaturated monomer (a2), said particle being contained in each particle, is fully covered with the protective colloid (a1);

(2) a structure in which the protective colloid (a1) is deposited on a part of the (co)polymer particle of the ethylenically unsaturated monomer (a2), said particle being contained in each particle, and the surface of the (co)polymer particle is not fully covered with the protective colloid; and (3) a so-called salami structure in which the protective colloid (a1) is contained in each (co)polymer particle of the ethylenically unsaturated monomer (a2).

Morphologically, the term "particle" as used herein also embraces particles of special shapes such as hollow particles and particles of the structure that an additional particle exists in each hollow particle. Accordingly, no particular limitation is imposed on the structure of particles.

It is to be noted that the structure of particles is not limited to such exemplified structures insofar as on an outer wall of each (co)polymer particle of the ethylenically unsaturated monomer (a2), the protective colloid (al) exists in a quantity sufficient to show redispersibility.

High-Order Particles

In the present invention, when the (co)polymer particles (A) are considered to exist as primary particles, the flocculate (A') of the (co)polymer particles can be in the form of secondary particles, tertiary particles formed of plural secondary particles united together, or particles of a still higher order insofar as the flocculate conforms with the objects of the present invention. No particular limitation is therefore imposed in this respect.

In the present invention, the flocculate (A') of the (co)polymer is generally in the form of particles of the tertiary or still higher order which are formed of secondary particles obtained by cohesion of plural (co)polymer particles (A) as primary particles. When added to water or alkaline water, the flocculate is readily emulsified back into primary particles or into a form substantially resembling primary particles.

The flocculate (A') of the (co)polymer in the present invention may generally be in the form of secondary particles obtained by cohesion of plural (co)polymer particles (A) as primary particles. When added to water or alkaline water, such a flocculate is also readily emulsified back into primary particles or into a form substantially resembling primary particles.

Concept of the Term "Salting Out"

The concept of the term "salting out" as used herein embraces the concept which the same term generally has in high-molecular chemistry, but they are not completely equivalent to each other. For example, "Kagaku Daijiten (ENCYCLOPAEDIA CHIMICA)", Volume 1 (a,i,u,e), 1960 (Kyoritsu Shuppan Co., Ltd.) contains an annotation of the term "salting out" in the left-right column on page 1108, where "salting out" is described to mean "to add to an aqueous solution another substance (primarily, an inorganic salt or the like) to cause coagulation of a substance dissolved beforehand (in the aqueous solution)".

The concept of the term "salting out" as used herein fully encompasses the concept recognized in general chemistry as described in "Kagaku Daijiten (ENCYCLOPAEDIA CHIMICA)" and as will be described next, also embraces the concept which this term generally has in colloid chemistry and high-molecular chemistry.

Namely, as is described on pages 187–200 of Soichi Muroi: "Kohbunshi Ratekkusu no Kagaku (Chemistry of High-Molecular Latex)", 1980 (Kobunshi Kankokai, Inc), particles which are maintained in a uniformly-dispersed state can be caused to undergo coagulation by adding an electrolyte and hence developing a dispersion-destructing action (salting out). The concept of the term "salting out" as used herein also embraces such a phenomenon.

As is appreciated from the foregoing, the term "salting out" will be used for the sake of convenience in frequently referring to certain essential "embodiments" of the present invention although the concept of the term "salting out" as used herein is not completely equivalent to the concept which the same term generally has in general chemistry.

Illustrative of the (co)polymer according to the present invention are:

(1) A (co)polymer formed of particles and having a function to be substantially redispersible in water of pH 5 or higher, wherein:

said particles have a core/shell structure with at least a part of a surface of each core being covered with an associated shell;

said core is made of a (co)polymer ($\alpha 2$) composed of a recurring unit and 0 wt. % or more but less than 40 wt. % of at least one recurring unit selected from the group consisting of recurring units having pendant groups represented by the following formula (1) and the group consisting of recurring units having pendant groups represented by the following formula (2):

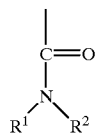

(1)

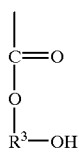

(2)

wherein in the formula (1), $R^1$ and $R^2$ are either the same or different and individually represent a hydrogen atom, an alkyl group having 1–12 carbon atoms, or an OH-containing alkyl group having 1–12 carbon atoms and in the formula (2), $R^3$ represents an alkylene group having 1–30 carbon atoms or $R^3$, together with the hydroxyl group bonded thereto, represents —$(R^{22}—O)_n$—H in which n stands for an integer of 2 to 33 and $R^{22}$s may be the same or different and individually represents an alkylene group having 2–5 carbon atoms;

said shell is made of a (co)polymer ($\alpha 1$) composed of a recurring unit and 20 wt. % or more but not greater than 100 wt. % of at least one recurring unit selected from the group consisting of said recurring units having said pendant groups represented by the formula (1) and the group consisting of said recurring units having said pendant groups represented by the formula (2);

based on the total weight of ($\alpha 1$) and ($\alpha 2$), ($\alpha 1$) ranges from 15 to 85 wt. % while ($\alpha 2$) ranges from 85 to 15 wt. %; and said at least one recurring unit having said pendant group represented by the formula (1) and/or (2) in ($\alpha 1$) is contained at a higher content than said at least one recurring unit in ($\alpha 2$).

(2) A (co)polymer having a function to be substantially redispersible in water of pH 5 or higher, wherein:

said (co)polymer is a mixture of particles (A) and a protective colloid;

said particles (A) are made of a (co)polymer (α2) composed of a recurring unit and 0 wt. % or more but less than 40 wt. % of at least one recurring unit selected from the group consisting of recurring units having pendant groups represented by the following formula (1) and the group consisting of recurring units having pendant groups represented by the following formula (2):

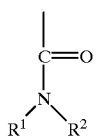
(1)

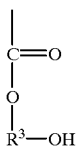
(2)

wherein in the formula (1), $R^1$ and $R^2$ are either the same or different and individually represent a hydrogen atom, an alkyl group having 1–12 carbon atoms, or an OH-containing alkyl group having 1–12 carbon atoms and in the formula (2), $R^3$ represents an alkylene group having 1–30 carbon atoms or $R^3$, together with the hydroxyl group bonded thereto, represents —$(R^{22}$—O$)_n$—H in which n stands for an integer of 2 to 33 and $R^{22}$s may be the same or different and individually represents an alkylene group having 2–5 carbon atoms;

said protective colloid is made of a (co)polymer (α1) composed of a recurring unit and 20 wt. % or more but not greater than 100 wt. % of at least one recurring unit selected from the group consisting of said recurring units having said pendant groups represented by the formula (1) and the group consisting of said recurring units having said pendant groups represented by the formula (2);

based on the total weight of (α1) and (α2), (α1) ranges from 15 to 85 wt. % while (α2) ranges from 85 to 15 wt. %; and said at least one recurring unit having said pendant group represented by the formula (1) and/or (2) in (α1) is contained at a higher content than said at least one recurring unit in (α2).

(3) A (co)polymer according to claim 1 or 2, wherein of said recurring units making up each of (α1) and (α2), the recurring unit other than said at least one recurring unit having said pendant group represented by the formula (1) and/or (2) is composed of at least one of the following structural units (v) to (z):

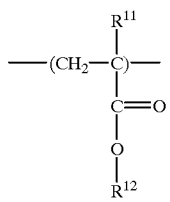
(v)

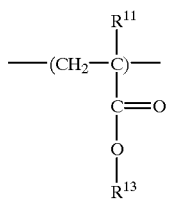
(w)

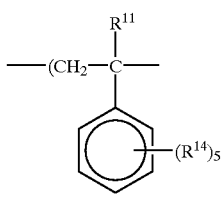
(x)

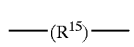
(y)

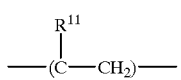
(z)

wherein $R^{11}$ represents a hydrogen atom or a methyl group, $R^{12}$ represents a hydrogen atom or an alkyl group having 1–12 carbon atoms, $R^{13}$ represents a hydrogen atom, an alkyl group having 1–20 carbon atoms, an alkenyl group having 1–20 carbon atoms or a phenyl group, $R^{14}$s are the same or different and individually represent a hydrogen atom, an alkyl group having 1–12 carbon atoms, a sulfonic group or a metal sulfonate group, and $R^{15}$ represents a divalent hydrocarbon group having 1–6 carbon atoms.

The present invention also provides:

(4) A (co)polymer substantially redispersible at pH 5 or higher, wherein:

said (co)polymer is in the form of particles having a shell/core structure with at least a part of a surface of each core being covered with an associated shell;

said core is made of a water-insoluble (co)polymer; and said shell is made of a (co)polymer water-soluble at pH 5 or higher.

(5) A (co)polymer substantially redispersible at pH 5 or higher, wherein:

said (co)polymer is in the form of particles having a shell/core structure with at least a part of a surface of each core being covered with an associated shell;

said core is made of a water-insoluble (co)polymer;

said shell is made of a (co)polymer water-soluble at pH 5 or higher; and said shells account for at least 15 wt. % of the total weight of said cores and said shells.

(6) Particles substantially free of intraparticular blocking property, wherein:

said particles have a shell/core structure with at least a part of a surface of each core being covered with an associated shell;

said cores have a glass transition point in a range of from −40 to +30° C.; and said shells have a glass transition point at least 10° C. higher than said glass transition point of said cores, account for at least 15 wt. % of the total weight of said particles, and have a function to flocculate at pH 4 or lower.

The present invention typically provides a (co)polymer substantially redispersible at pH 5 or higher, which is in the form of particles having a core/shell structure with at least a part of a surface of each core covered with an associated shell, said cores and shells being specified as described above.

The followings are more specific examples of the (co)polymer according to the present invention:

(7) A (co)polymer formed of particles and having a function to be substantially redispersible in water of pH 5 or higher, wherein:

said particles have a core/shell structure;

said core is made of a (co)polymer (α2) of an ethylenically unsaturated monomer comprising 0 wt. % or more but less than 40 wt. % of at least one ethylenically unsaturated monomer selected from the group consisting of recurring units having pendant groups represented by the following formula (1) and the group consisting of recurring units having pendant groups represented by the following formula (2):

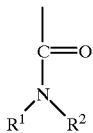

(1)

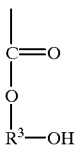

(2)

wherein in the formula (1), $R^1$ and $R^2$ are either the same or different and individually represent a hydrogen atom, an alkyl group having 1–12 carbon atoms, or an OH-containing alkyl group having 1–12 carbon atoms and in the formula (2), $R^3$ represents an alkylene group having 1–30 carbon atoms;

said shell is made of a (co)polymer (α1) of an ethylenically unsaturated monomer comprising 20 wt. % or more but not greater than 100 wt. % of at least one ethylenically unsaturated monomer selected from the group consisting of said recurring units having said pendant groups represented by the formula (1) and the group consisting of said recurring units having said pendant groups represented by the formula (2);

based on the total weight of (α1) and (α2), (α1) ranges from 15 to 85 wt. % while (α2) ranges from 85 to 15 wt. %; and said at least one ethylenically unsaturated monomer having said pendant group represented by the formula (α1) is contained at a higher content than said at least one ethylenically unsaturated monomer in (α2).

(8) A (co)polymer having a function to be substantially redispersible in water of pH 5 or higher, wherein:

said (co)polymer is a mixture of particles (A) and a protective colloid;

said particles (A) are made of a (co)polymer (α2) of an ethylenically unsaturated monomer comprising 0 wt. % or more but less than 40 wt. % of at least one ethylenically unsaturated monomer selected from the group consisting of recurring units having pendant groups represented by the following formula (1) and the group consisting of recurring units having pendant groups represented by the following formula (2):

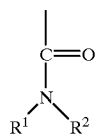

(1)

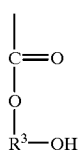

(2)

wherein in the formula (1), $R^1$ and $R^2$ are either the same or different and individually represent a hydrogen atom, an alkyl group having 1–12 carbon atoms, or an OH-containing alkyl group having 1–12 carbon atoms and in the formula (2), $R^3$ represents an alkylene group having 1–30 carbon atoms;

said protective colloid is made of a (co)polymer (α1) of an ethylenically unsaturated monomer comprising 20 wt. % or more but not greater than 100 wt. % of at least one ethylenically unsaturated monomer selected from the group consisting of said recurring units having said pendant groups represented by the formula (1) and the group consisting of said recurring units having said pendant groups represented by the formula (2);

based on the total weight of (α1) and (α2), (α1) ranges from 15 to 85 wt. % while (α2) ranges from 85 to 15 wt. %; and said at least one recurring unit having said pendant group represented by the formula (1) and/or (2) in (α1) is contained at a higher content than said at least one recurring unit in (α2).

Ethylenically Unsaturated Monomer Having a Pendant Group Represented by the Formula (1)

Examples of the ethylenically unsaturated monomer having the pendant group, which is represented by the following formula (1):

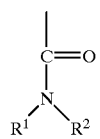

(1)

wherein $R^1$ and $R^2$ are either the same or different and individually represent a hydrogen atom, an alkyl group having 1–12 carbon atoms, or an OH-containing alkyl group having 1–12 carbon atoms, include ethylenically unsaturated monomers represented by the following formulas (3) to (6), respectively:

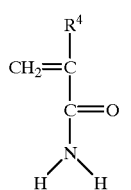
(3)

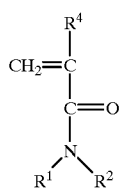
(4)

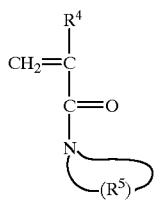
(5)

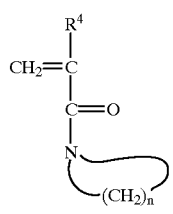
(6)

wherein in the formula (4), $R^1$ and $R^2$ are either the same or different and individually represent a hydrogen atom, an alkyl group having 1–12 carbon atoms, or an OH-containing alkyl group having 1–12 carbon atoms; in the formula (5), $R^5$ represents an alkylene group having 1–12 carbon atoms or an OH-containing alkylene group having 1–12 carbon atoms; in the formulas (3) to (6), $R^4$ represents a hydrogen atom or an alkyl group having 1–12 carbon atoms; and in the formula (6), n stands for an integer of 1–20.

Ethylenically Unsaturated Monomer Having a Pendant Group Represented by the Formula (2)

Examples of the ethylenically unsaturated monomer having the pendant group, which is represented by the following formula (2):

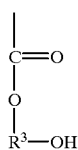
(2)

wherein $R^3$ represents an alkylene group having 1–30 carbon atoms, include ethylenically unsaturated monomers represented by the following formulas (7) to (9), respectively:

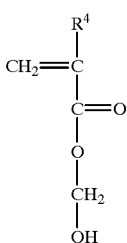
(7)

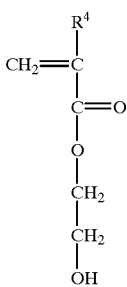
(8)

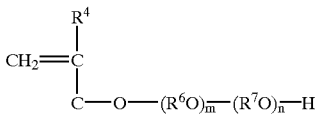
(9)

wherein in the formulas (7) to (9), $R^4$ represents a hydrogen atom or an alkyl group having 1–12 carbon atoms; and in the formula (9), m stands for an integer of 1–16 and n stands for an integer of 0–14.

Examples of $R^6$ in the formula (9) include the groups represented by the following formulas (10) and (11), respectively:

(10)

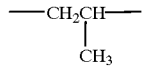
(11)

Illustrative of $R^7$ in the formula (9) are the groups represented by the following formulas (12) to (14), respectively:

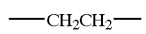
(12)

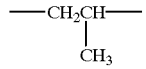
(13)

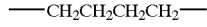
(14)

In the present invention, the content of said at least one monomer having the recurring unit(s) represented by the formula (1) and/or the formula (2) ranges, based on the whole monomers making up the (a2) or the (a1), from 0 to 40 wt. %, preferably from 0 to 30 wt. %, more preferably from 0 to 20 wt. % in (a2) and from 20 to 100 wt. %, preferably from 30 to 100 wt. %, more preferably 40–100 wt. % in (a1).

In addition, it is required that said at least one monomer having the recurring unit(s) containing the pendant group(s) represented by the formula (1) and/or (2) in (a1) be contained at a higher content than said at least one monomer (a2). The difference ranges preferably from 5 to 95 wt. %, more preferably from 20 to 90 wt. %, still more preferably from 40 to 80 wt. %.

Recurring Unit Having the Pendant Group Represented by the Formula (1)

Examples of the recurring unit having the pendant group represented by the following formula (1):

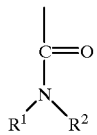

(1)

wherein $R^1$ and $R^2$ are either the same or different and individually represent a hydrogen atom, an alkyl group having 1–12 carbon atoms, or an OH-containing alkyl group having 1–12 carbon atoms, include recurring units represented by the following formulas (15) to (18), respectively:

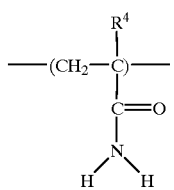

(15)

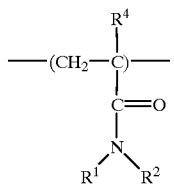

(16)

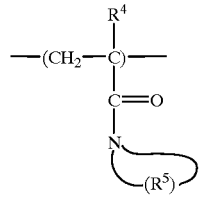

(17)

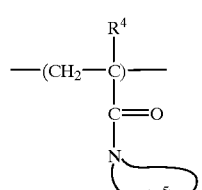

(18)

wherein in the formula (16), $R^1$ and $R^2$ are either the same or different and individually represent a hydrogen atom, an alkyl group having 1–12 carbon atoms, or an OH-containing alkyl group having 1–12 carbon atoms; in the formula (17), $R^5$ represents an alkylene group having 1–12 carbon atoms or an OH-containing alkyl group having 1–12 carbon atoms; in the formulas (15) to (18), $R^4$ represents a hydrogen atom or an alkyl group having 1–12 carbon atoms; and in the formula (18), n stands for an integer of 1–20.

Recurring Unit Having the Pendant Group Represented by the Formula (2)

Examples of the recurring unit having the pendant group represented by the following formula (2):

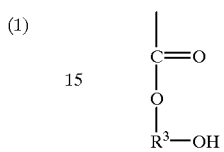

(2)

wherein $R^3$ represents an alkylene group having 1–30 carbon atoms, include recurring units represented by the following formulas (19) to (21), respectively:

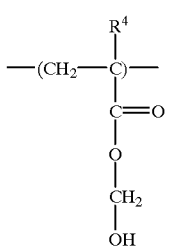

(19)

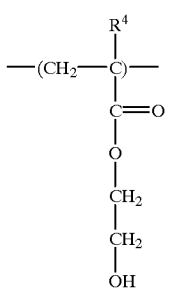

(20)

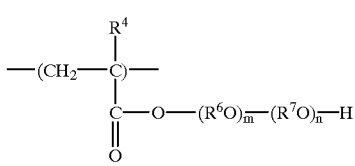

(21)

wherein in the formulas (19) to (21), $R^4$ represents a hydrogen atom or an alkyl group having 1–12 carbon atoms; and in the formula (21), m stands for an integer of 1–16 and n stands for an integer of 0–14.

Examples of $R^6$ in the formula (21) include the groups represented by the following formulas (10) and (11), respectively:

(10)

-continued

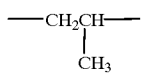

(11)

Illustrative of $R^7$ in the formula (21) are the groups represented by the following formulas (12) to (14), respectively:

(12)

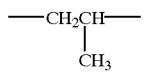

(13)

(14)

In the present invention, the content of the recurring unit(s) represented by the formula (1) and/or the formula (2) ranges, based on the whole recurring units, from 0 to 40 wt. %, preferably from 0 to 30 wt. %, more preferably from 0 to 20 wt. % in (a2) and from 20 to 100 wt. %, preferably from 30 to 100 wt. %, more preferably 40–100 wt. % in (α1).

In addition, it is required that said at least one recurring unit having the pendant group represented by the formula (1) and/or (2) in (α1) be contained at a higher content than said at least one recurring unit in (α2). The difference ranges preferably from 5 to 95 wt. %, more preferably from 20 to 90 wt. %, still more preferably from 40 to 80 wt. %.

Blocking

The term "blocking" as used herein means "compression bonding" as described, for example, under the entry of "blocking" in the right column on page 403 of "KOBUNSHI JITEN (Dictionary of Polymer Technology)", 1988 (compiled by: The Society of Polymer Science, Japan; published by: Asakura Shoten Co., Ltd.), and specifically means firm cohesion that polymer particles, which have been dispersed in a solvent, are brought into contact with each other and are bonded together at their surfaces of contact without permitting easy separation.

From the viewpoint of a principle, to show redispersibility means to allow polymer particles to individually disperse in water when added to water. If blocking, that is, cohesion of polymer particles takes place firmly, the polymer particles are brought into such a state that they can no longer readily separated from each other, leading to a reduction in redispersibility.

To show excellent redispersibility, it is therefore necessary to permit easy separation by suppressing blocking as much as possible.

The present invention has made it possible to allow polymer particles to exhibit superb redispersibility by associating a protective colloid or shells with polymer particles under particular conditions and suppressing blocking between the polymer particles.

Namely, the function of the protective colloid or shells in the present invention is essentially to act as a blocking preventive for polymer particles themselves. In the present invention, the protective colloid is therefore not absolutely required to exhibit a function as a stabilizer for emulsion polymerization. If the protective colloid does not function as a stabilizer for emulsion polymerization, it is only necessary to achieve a stable polymerization reaction by using a surfactant. In other words, the extent of exhibition of redispersibility in the present invention is closely correlated to the blocking-preventing function of the protective colloid or shells.

It is therefore very important to use the protective colloid (a1) and the (co)polymer (a2) of the ethylenically unsaturated monomer in proportions of 85–15 wt. % and 15–85 wt. %, respectively, based on the total weight of the (co)polymer (a2) and the protective colloid (a1) or shells (S).

Here, the proportion of the latter is preferably 15 wt. % or greater, more preferably 25 wt. % or greater, still more preferably 35 wt. % or greater, notably 45 wt. % or greater. Its upper limit is preferably 85 wt. % or less, more preferably 70 wt. % or less, especially 60 wt. % or less.

Further, the glass transition point of the protective colloid (a1) or shell (S) is preferably 20° C. or higher, more preferably 30° C. or higher, still more preferably 40° C. or higher, notably 50° C. or higher.

Preferred examples of the material of the protective colloid or shells include a copolymer having a carboxyl-containing recurring unit in addition to a recurring unit containing a pendant group represented by the formula (1) and/or a recurring unit containing a pendant group represented by the formula (2). In the case of the recurring unit of the formula (1), the proportion of the carboxyl-containing recurring unit ranges preferably from 0.5 to 30 wt. %, more preferably from 0.5 to 10 wt. %, still more preferably from 1 to 3 wt. %, all based on the copolymer. In the case of the recurring unit of the formula (2) on the other hand, the proportion of the carboxyl-containing recurring unit ranges preferably from 0.5 to 60 wt. %, more preferably from 0.5 to 40 wt. %, still more preferably from 0.5 to 20 wt. %, all based on the copolymer (a1).

The above-described copolymer having the carboxyl-containing recurring unit is characterized in that it has particularly good solubility in water and it easily flocculates in the flocculation step.

Anti-Blocking Property

As a common cause for blocking, the glass transition point (Tg) of polymer particles is so low that the polymer particles become soft and show tackiness in a high-temperature environment.

The term "anti-blocking property" as used herein embraces the property that neither compression bonding nor firm cohesion takes place even when polymer particles are brought into contact with each other.

B. Mechanism

Mechanism of Flocculation by the Addition of an Acid in a Flocculate-Forming Step In a flocculate-forming step, a mineral acid and/or an organic acid is added to adjust the pH to 4 or lower, whereby (co)polymer particles (A) are caused to flocculate to form a flocculate (A') of the (co) polymer.

The scientific mechanism of the phenomenon that the (co)polymer particles (A) according to the present invention undergo flocculation in the presence of an acid has not been fully elucidated. However, the (co)polymer particles (A) are considered to flocculate into the flocculate (A') of the (cozpolymer by the addition of the mineral acid and/or the organic acid because of the existence of the protective colloid or shells (which have properties to undergo self-insolubilization and self-flocculation under acidic conditions) in the specific amount. In other words, it is presumed that the intervening protective colloid or shells are rendered hydrophobic at pH 4 or lower and act as a flocculant or the like, thereby flocculating the (co)polymer particles (A).

As flocculants, polymers which are called high-molecular flocculants and exhibit flocculating action are commonly known. These polymers are presumed to be adsorbed on suspended particles and then crosslinked there so that the suspended particles may be coarsened to undergo flocculation and settling. As an alternative, such polymers presumably lower the ζ-potential of surfaces of the suspended particles, whereby the suspended particles may flocculate together.

In the present invention, the protective colloid or shells are considered to induce flocculation of the (co)polymer particles (A) under acidic conditions in accordance with a similar mechanism.

Details of the above-described flocculation mechanism by a high-molecular flocculant is described in Eiji Ohmori: "Kobunshi Gyoshuzai (High-molecular Flocculants)", 1–90, 1975 (Kobunshi Kankokai, Inc.).

Mechanism of Flocculation by the Addition of a Metal Salt in a Flocculate-Forming Step In a flocculate-forming step, (co)polymer particles (A) are caused to flocculate by the addition of a metal salt. The scientific mechanism of the phenomenon in which the (co)polymer particles according to the present invention flocculate with the metal salt has not been fully elucidated.

It is known to separate a solid polymer from a (co)polymer particle dispersion, which has been produced by emulsion (co)polymerization, by using a salting-out phenomenon, that is, by adding a metal salt and forming a flocculate.

From the standpoint of high-molecular physical chemistry, the following interactions are considered to take place between (co)polymer particles in an aqueous emulsion:

(1) van der Waals attraction (intermolecular attraction),
(2) electrostatic repulsion, and
(3) steric repulsion at particle surfaces.

The dispersing and flocculating properties of the (co)polymer particles are considered to be determined by the balance between these attraction and repulsions (repulsive forces).

In such a system, a metal salt primarily acts to lower electrostatic repulsion.

It is therefore considered that the addition of a metal salt to an aqueous emulsion, i.e., a system with a disperse phase [(co)polymer particles] evenly dispersed in a continuous phase (water) reduces the repulsion between the (co)polymer particles and hence converts the (co)polymer particles from a dispersed form into a flocculated form.

Details of the above-described consideration of the flocculation mechanism of (co)polymer particles from the standpoint of high-molecular physical chemistry are descried on pages 187–200 of Soichi Muroi: "tKohbunshi Ratekkusu no Kagaku (Chemistry of High-Molecular Latex)", 1980 (Kobunshi Kankokai, Inc).

At least a part of the mechanism of flocculation by the addition of a metal salt in the flocculate-forming step is presumed to take place in the above-described mechanism.

Mechanism of the Exhibition of a Function to be Substantially Redispersible in Water of pH 5 or Higher When an aqueous emulsion prepared in an aqueous emulsion preparation step is dried by spray drying, marked cohesion of (co)polymer particles (A) generally takes place because they are dried fast at high temperatures. As a consequence, the redispersibility is substantially lowered. Moreover, a great deal of deposit occurs on a wall of a drying tower so that the operability and productivity are lowered.

However, the formation of a flocculate (A') of a (co)polymer by the flocculate-forming step of the production process according to the present invention makes it possible to obtain the copolymer having a function to be substantially redispersible in water either directly or after drying the flocculate or further grinding the thus-dried flocculate.

Further, the flocculate (A') of the (co)polymer may be subjected to thorough washing either during and/or after its solid/liquid separation upon its recovery. Any mixed free protective colloid, free acid and other free water-soluble substances are hence removed, thereby making it possible to eliminate substances which would otherwise give undesired effects to the properties of the flocculate (A') of the (co)polymer.

General examples, as primary particles, of the (co)polymer particles (A) obtained by the production process according to the present invention include composite particles which are each formed of the (co)polymer of the ethylenically unsaturated monomer (a2) and the protective colloid (al) deposited or otherwise applied on the (co)polymer.

The general examples, as primary particles, of the (co)polymer particles (A) obtained by the production process according to the present invention also include composite particles which are each formed of the (co)polymer particle of the ethylenically unsaturated monomer (a2) and the protective colloid (a1) existing in a large amount on an outer wall of the (co)polymer particle.

The (co)polymer particles (A) which are obtained in the aqueous emulsion preparation step can be converted to the flocculate (A') of the (co)polymer, which has a function to be substantially redispersible in water, by flocculating the (co)polymer particles in the flocculate-forming step of the production process according to the present invention.

It is presumed that in the thus-formed flocculate (A') of the (cozpolymer, the interaction of the (co)polymer particles of the ethylenically unsaturated monomer (a2) contained in the (co)polymer particles (A) is reduced by the buffer action of the protective colloid (a1) contained in the (co)polymer particles (A) to control the strength of cohesion of the particles themselves, thereby allowing the flocculate (A') of the (co)polymer to show a function to be substantially redispersible in water.

Problems of Spray Drying

Spray drying is a method for effecting drying by spraying an aqueous dispersion of (co)polymer particles through nozzles into a high-temperature gas.

According to spray drying, capillary water between (co)polymer particles abruptly evaporates upon conducting drying of a dispersion of the (co)polymer particles by spraying it through nozzles into a high-temperature gas. Since a pressure resulting from a capillary pressure is applied between the (co)polymer particles and heat of the system is applied to the particles, strong cohesion takes place between the particles themselves, resulting in the problem that the particles become susceptible to irreversible cohesion. This capillary pressure theory upon cohesion of the (co)polymer particles themselves is described in detail on pages 242–248 of Soichi Muroi: I"Kohbunshi Ratekkusu no Kagaku (Chemistry of High-Molecular Latex)", 1980 (Kobunshi Kankokai, Inc).

It should be worthy to note that the present invention can avoid the application of unnecessary capillary pressure and high temperature to particles owing to the formation of a flocculate without heating the particles although the application of such capillary pressure and intense heat is inevitable in the case of spray drying.

In the present invention, it is possible to bring the particles into a dispersed form without cohesion between the particles or, even if such cohesion takes place, by reversibly, easily and substantially destructing the state of cohesion.

In the present invention, the reversible state of cohesion between particles (namely, the state which can be substantially and reversibly brought back to a dispersed state even after a cohered state is once formed) can be controlled by suitably choosing conditions for flocculating particles, for example, the temperature, the amount of an acid to be used for flocculation and the like upon conducting flocculation. It is therefore possible to practically avoid the irreversible state of cohesion between particles (namely, the state which cannot be substantially and reversibly brought back to a dispersed state once a cohered state is formed) which is unavoidable in the case of spray drying.

Polymerization of Protective Colloid or Shells

In the present invention, the protective colloid or shells, when taken singly, are water-soluble or hydrophilic, and have property to insolubilize and flocculate under acidic conditions or in the presence of a metal salt and also anti-blocking property.

Namely, the degree of development of redispersibility in the present invention is closely correlated to the anti-blocking function of the protective colloid or shells.

It is therefore very important, in the radical (co) polymerization of the protective colloid (a1) or shells (S), to use at least one monomer selected from the group consisting of ethylenically unsaturated monomers having pendant groups represented by the following formula (1) and the group consisting of ethylenically unsaturated monomers having pendant groups represented by the following formula (2):

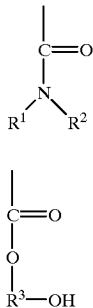

wherein in the formula (1), $R^1$ and $R^2$ are either the same or different and individually represent a hydrogen atom, an alkyl group having 1–12 carbon atoms, or an OH-containing alkyl group having 1–12 carbon atoms and in the formula (2), $R^3$ represents an alkylene group having 1–30 carbon atoms.

It is also very important to use the ethylenically unsaturated monomer (a2) and the protective colloid (a1) or shells (S) in proportions of from 85 to 15 wt. % and from 15 to 85 wt. %, respectively, based on the total weight of the former and the latter. Here, the proportion of the latter is preferably 15 wt. % or greater, more preferably 25 wt. % or greater, more preferably 35 wt. % or greater, notably 45 wt. % or greater.

Further, the calculated glass transition point of the protective colloid (a1) or shells (S) is preferably 20° C. or higher, more preferably 30° C. or higher, still more preferably 40° C. or higher, notably 50° C. or higher. No particular limitation is imposed on its upper limit, but one having a glass transition point of 300° C. or so can be preferably used.

Preferred examples of the material of the protective colloid or shells include a copolymer having a carboxyl-containing recurring unit in addition to the essential element or elements, that is, the recurring unit containing the pendant group represented by the formula (1) and/or the recurring unit containing a pendant group represented by the formula (2). In the case of the recurring unit of the formula (1), the proportion of the carboxyl-containing recurring unit ranges preferably from 0.5 to 30 wt. %, more preferably from 0.5 to 10 wt. %, still more preferably from 1 to 3 wt. %, all based on the copolymer. In the case of the recurring unit of the formula (2) on the other hand, the proportion of the carboxyl-containing recurring unit ranges preferably from 0.5 to 60 wt. %, more preferably from 0.5 to 40 wt. %, still more preferably from 0.5 to 20 wt. %, all based on the copolymer (a1).

Ethylenically Unsaturated Monomer Having a Pendant Group Represented by the Formula (1)

Examples of the ethylenically unsaturated monomer having the pendant group, which is represented by the following formula (1), include ethylenically unsaturated monomers represented by the following formulas (3) to (6), respectively:

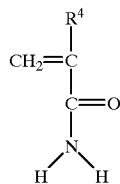

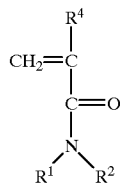

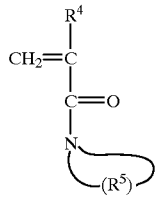

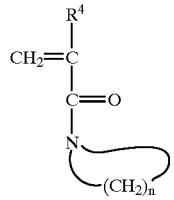

wherein in the formula (4), $R^1$ and $R^2$ are either the same or different and individually represent a hydrogen atom, an alkyl group having 1–12 carbon atoms, or an OH-containing alkyl group having 1–12 carbon atoms; in the formula (5), $R^5$ represents an alkylene group having 1–12 carbon atoms or an OH-containing alkylene group having 1–12 carbon atoms; in the formulas (3) to (6), $R^4$ represents a hydrogen atom or an alkyl group having 1–12 carbon atoms; and in the formula (6), n stands for an integer of 1–20.

Upon frequently referring herein to the ethylenically unsaturated monomer having the pendant group represented by the formula (1), the term "ethylenically unsaturated, amido-containing monomer" may be used for the sake of convenience.

Specific examples of the ethylenically unsaturated, amido-containing monomer include acrylamide, methacrylamide, N-methylol methacrylamide, N-methylol acrylamide, N-acryloylpyridine, N,N-dimethylacrylamide, N-isopropylacrylamide, N-hexylacrylamide, N-octylacrylamide, N-dodecylacrylamide, N,N-diethylacrylamide, N-acryloylpyrrolidine, diacetone acrylamide, and maleic amide. Of these, particularly preferred are methacrylamide, N,N-dimethylacrylamide, N-isopropylacrylamide, N-hexylacrylamide, N-octylacrylamide, N,N-diethylacrylamide, and N-acryloylpyrrolidine, They can be used either singly or in combination. Methacrylamide is especially preferred.

Concept of the Word "Amido Group"

The concept of the word "amido group" as used herein completely encompasses the concept which this word generally has in high-molecular chemistry, but they are not completely equivalent to each other. For example, "Kagagu Daijiten (ENCYCLOPAEDIA CHIMICA)", Volume 1 (a,i, u,e), 1960 (Kyoritsu Shuppan Co., Ltd.) contains an annotation of the term "amido or amide" in the left column on page 244, where the term "amido or amide" is defined as "1]". The name of a group in the form of RCONH— formed as a result of bonding of an amino group, —NH$_2$, with an acid group (acyl group). For example, CH$_3$CONH— is called "acetamido". [2](1) (Compound obtained) by substituting one or more acid groups (acyl groups) for the like number of hydrogen atoms of ammonia. RCONH$_2$. Same as the "acid amides.". The concept of the term "amido group" as used herein completely embraces the concept recognized in general chemistry as described in the "Kagagu Daijiten (ENCYCLOPAEDIA CHIMICA)" and also fully encompasses the concept based on the pendant group represented by the formula 1.

Ethylenically Unsaturated Monomer Having a Pendant Group Represented by the Formula (2)

Examples of the ethylenically unsaturated monomer having the pendant group, which is represented by the formula (2), include ethylenically unsaturated monomers represented by the following formulas (7) to (9), respectively:

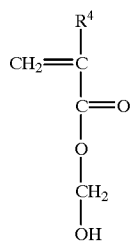

(7)

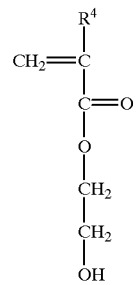

(8)

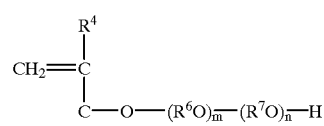

(9)

wherein in the formulas (7) to (9), R$^4$ represents a hydrogen atom or an alkyl group having 1–12 carbon atoms; and in the formula (9), m stands for an integer of 1–16 and n stands for an integer of 0–14.

Examples of R$^6$ in the formula (9) include the groups represented by the following formulas (10) and (11), respectively:

(10)

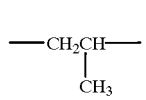

(11)

Illustrative of R$^7$ in the formula (9) are the groups represented by the following formulas (12) to (14), respectively:

(12)

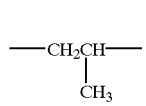

(13)

(14)

Upon frequently referring herein to the ethylenically unsaturated monomer having the pendant group represented by the formula (2), the expression "OH-containing ethylenically unsaturated monomer" may be used for the sake of convenience. A (co)polymer making use of this "OH-containing ethylenically unsaturated monomer" can be preferably used for cement as it provides good stability.

Specific examples of the OH-containing ethylenically unsaturated monomer preferably include (meth)-acrylates such as hydroxymethyl (meth)acrylates, 2-hydroxyethyl (meth)acrylates, hydroxypropyl (meth)-acrylates, hydroxybutyl (meth)acrylates, hydroxypentyl (meth)acrylates, polyethylene glycol mono(meth)-acrylates, polypropylene glycol mono(meth)acrylates, polyethylene glycol polypropylene glycol mono(meth)-acrylates, polyethylene glycol polytetramethylene glycol mono(meth)acrylates, and polypropylene glycol polytetramethylene glycol (meth) acrylates. They can be used either singly or in combination.

Particularly preferred is 2-hydroxyethyl methacrylate.

Carboxyl-Containing Ethylenically Unsaturated Monomer

Particularly preferred specific examples of the carboxyl-containing ethylenically unsaturated monomer include unsaturated carboxylic acids such as acrylic acid, methacrylic acid, itaconic acid, maleic acid, fumaric acid, acrylic anhydride, methacrylic anhydride, maleic anhydride, itaconic anhydride and fumaric anhydride.

Other Ethylenically Unsaturated Monomer

As particularly preferred specific examples of the ethylenically unsaturated monomer which makes up (a1) and is other than the ethylenically unsaturated monomer having the pendant group represented by the formula (1), the ethylenically unsaturated monomer having the pendant group represented by the formula (2) and the carboxyl-containing ethylenically unsaturated monomers, ethylenically unsaturated monomers copolymerizable with unsaturated monomers, such as those to be described below under (1) to (3), can be mentioned.

(1) Acrylates of alkyl groups having 1–12 carbon atoms, such as methyl, ethyl, isopropyl, n-butyl, isobutyl, n-amyl, isoamyl, n-hexyl, 2-ethylhexyl, octyl, decyl, dodecyl, octadecyl, cyclohexyl, phenyl, and benzyl acrylates.

(2) Methacrylates of alkyl groups having 1–12 carbon atoms, such as methyl, ethyl, isopropyl, n-butyl, isobutyl, n-amyl, isoamyl, n-hexyl, 2-ethyl-hexyl, octyl, decyl, dodecyl, octadecyl, cyclohexyl, phenyl, and benzyl methacrylates.

(3) Others such as glycidyl acrylate, glycidyl methacrylate, allyl glycidyl ether, isopropenyl-$\alpha,\alpha$-dimethylbenzyl isocyanate, styrene, acrylonitrile, methacrylonitrile, sodium styrenesulfonate, and acrylamido-2-methylpropanesulfonic acid and the sodium salt thereof.

Initiator

No particular limitation is imposed on the initiators which are used in the present invention, namely, in the protective colloid formation step and the shell polymerization step. Usable examples include hydrogen peroxide; persulfates such as ammonium persulfate and potassium persulfate; sodium azobiscyanovalerate; and redox initiators composed of such compounds, metal ions such as iron ions and reducing agents such as sodium sulfoxylate, formaldehyde, sodium pyrosulfite, sodium hydrogensulfite and L-ascorbic acid.

These polymerization initiators are generally used in a proportion of from 0.01 to 25 parts by weight per 100 parts by weight of all the monomers which are charged upon polymerization of the protective colloid (a1) or shells (S).

Molecular Weight Regulator

In the present invention, a mercaptan such as t-dodecyl mercaptan or n-dodecyl mercaptan or an allyl compound such as allylsulfonic acid, methallylsulfonic acid or the sodium salt thereof can be used as a molecular weight regulator, as needed, in the protective colloid formation step or the shell polymerization step.

Properties of Protective Colloid or Shells

In the present invention, no particular limitation is imposed on the protective colloid (a) or shells (S) insofar as, when taken individually, it is a substantially water-soluble or hydrophilic (co)polymer and has property to insolubilize and flocculate under acidic conditions or in the presence of a metal salt. The weight average molecular weight of the protective colloid (a1) generally ranges from 1,000 to 500,000, preferably from 1,000 to 350,000, more preferably from 1,000 to 200,000.

To provide the flocculate (A') of the (co)polymer with practically complete dispersibility, the calculated value of the glass transition point of the protective colloid (a1) or shells (S) is preferably 20° C. or higher, more preferably 30° C. or higher, still more preferably 40° C. or higher, notably 50° C. or higher.

Ethylenically Unsaturated Monomer for Forming (a2)

No particular limitation is imposed on the ethylenically unsaturated monomer employed in the present invention for forming (a2), insofar as it undergoes substantial polymerization and forms desired (co)polymer particles. Specific examples of the ethylenically unsaturated monomer include those employed for the production of aqueous emulsions which are used for applications such as construction materials, papermaking chemicals, paints, adhesives and fiber finishes.

Specific examples of the ethylenically unsaturated monomer include:

acrylate esters, for example, methyl, ethyl, isopropyl, n-butyl, isobutyl, n-amyl, isoamyl, n-hexyl, 2-ethylhexyl, octyl, decyl, dodecyl, octadecyl, cyclohexyl, phenyl, benzyl, 2-hydroxyethyl, and hydroxypropyl acrylates;

methacrylate esters, for example, methyl, ethyl, isopropyl, n-butyl, isobutyl, n-amyl, isoamyl, n-hexyl, 2-ethylhexyl, octyl, decyl, dodecyl, octadecyl, cyclohexyl, phenyl, benzyl, 2-hydroxyethyl, and hydroxypropyl methacrylates;

the acrylates of other alkyl groups having 3–12 carbon atoms;

the methacrylate of other alkyl groups having 3–12 carbon atoms;

2-methoxyethyl acrylate, 2-ethoxyethyl acrylate, acrylonitrile, methacrylonitrile, glycidyl acrylate, glycidyl methacrylate, and allyl glycidyl ether;

unsaturated carboxylic acids such as acrylic acid, methacrylic acid, itaconic acid, maleic acid, fumaric acid, acrylic anhydride, methacrylic anhydride, maleic anhydride, itaconic anhydride, and fumaric anhydride;

amino-containing monomers such as N-methylaminoethyl acrylate, N-methylaminoethyl methacrylate, dimethylaminoethyl acrylate, and dimethylaminoethyl methacrylate;

aromatic vinyl compounds such as styrene, 2-methylstyrene, t-butylstyrene, chlorostyrene, vinylanisole, vinylnaphthalene, and divinylbenzene;

vinyl esters such as vinyl acetate, vinyl propionate, and fatty acid vinyl esters (e.g., "VeoVa", trade mark; product of Shell Japan Ltd.);

halogenated vinyl compounds such as vinyl chloride;

halogenated vinylidene compounds such as vinylidene chloride, and vinylidene fluoride;

olefins such as ethylene, propylene, isoprene, butadiene and chloroprene;

others such as vinylpyrrolidone, acrylonitrile, methacrylonitrile, ethylene glycol dimethacrylate, diethylene glycol dimethacrylate, triethylene glycol dimethacrylate, polyethylene glycol dimethacrylate, polypropylene glycol dimethacrylate, neopentyl glycol dimethacrylate, 1,3-butylene glycol dimethacrylate, 1,6-hexanediol dimethacrylate, neopentyl glycol dimethacrylate, polyethylene glycol diacrylate, 1,6-hexanediol diacrylate, neopentyl glycol diacrylate, tripropylene glycol diacrylate, polypropylene glycol diacrylate, trimethylol propane trimethacrylate, trimethylol propane triacrylate, tetramethylol methane triacrylate, tetramethylol methane tetraacrylate, allyl methacrylate, dicyclopentenyl acrylate, dicyclopentenyloxyethyl acrylate, isopropenyl-α,α-dimethylbenzyl isocyanate, and allyl mercaptan; and amides such as acrylamide, methacylamide, N-methylolmethacrylamide, N-methylolacrylamide, diacetoneacrylamide, and maleamide.

They can be used either singly or in combination.

Among these, preferred are aromatic vinyl compounds, dienes, olefins, (meth)acrylates and vinyl esters. Preferred specific examples include styrene, butyl acrylate, 2-ethylhexyl acrylate, butadiene, methyl methacrylate, vinyl acetate, "VeoVa", and ethylene. For use in cement, alkali-resistant monomers are preferred.

Polymerization Process

No particular limitation is imposed on the polymerization process for the aqueous emulsion preparation step or the core particle preparation step in the present invention, insofar as an aqueous emulsion formed of a disperse phase of the (co)polymer particles (A) and a continuous phase of water can be prepared. In general, however, emulsion polymerization is preferably adopted. In emulsion polymerization, a surfactant, a pH regulator and the like can be used as needed insofar as the use of such additives conforms with the objects of the present invention.

Specific examples of the polymerization process usable for the aqueous emulsion preparation step or the core particle preparation step in the present invention include:

(1) a process in which polymerization is conducted by adding a polymerization initiator in the presence of the ethylenically unsaturated monomer (a2);

(2) a process in which a polymerization initiator is added and polymerization is then conducted while adding the ethylenically unsaturated monomer (a2) dropwise (suited when intense heat is given off by the polymerization);

(3) a process in which a polymerization initiator is dissolved in the ethylenically unsaturated monomer (a2) and polymerization is conducted while adding the thus-prepared solution dropwise; and (4) a process in which a polymerization initiator is dissolved in an appropriate solvent and polymerization is conducted while adding the thus-prepared solution and the ethylenically unsaturated monomer (a2) dropwise at the same time but separately.

Specific examples of the polymerization process usable for the protective colloid formation step in the present invention include:

(1) a process in which monomer(s) as component(s) for the protective colloid are mixed and then heated to a desired polymerization temperature, followed by the addition of a polymerization initiator to conduct polymerization;

(2) a process in which a polymerization initiator is added and polymerization is then conducted while adding dropwise monomer(s) as component(s) for the protective colloid (suited when intense heat is given off by the polymerization);

(3) a process in which a polymerization initiator is dissolved in monomer(s) as components (s) for the protective colloid and polymerization is conducted while adding the thus-prepared solution dropwise; and (4) a process in which a polymerization initiator is dissolved in an appropriate solvent and polymerization is conducted while adding the thus-prepared solution and monomer(s) as component(s) for the protective colloid dropwise at the same time but separately.

Since protective colloid polymerization can be adopted for the aqueous emulsion preparation step in the present invention, the polymerization in the presence of a protective colloid can bring about the advantage that the stability of the polymerization is improved and the amount of a surfactant to be used can be reduced.

As an hydrophilic, ethylenically unsaturated monomer having a pendant group represented by the formula (1) or the formula (2) is used for the shell polymerization step in the present invention, an advantage can be brought about that the stability of the polymerization is improved and the amount of a surfactant to be used can be reduced.

Because the surfactant can be used in a smaller amount, a further advantage can be brought about that, when a redispersion of the redispersible polymer is formed into a film, the film can be provided with improved waterproofness.

According to the production process of the present invention, the polymerization of the ethylenically unsaturated monomer (a1) is conducted in the presence of a protective colloid (a1) which will be described subsequently herein. This polymerization can be conducted following ordinary emulsion polymerization, that is, the ethylenically unsaturated monomer (a1) is polymerized in the absence of the protective colloid (a1).

Surfactant

No particular limitation is imposed on the surfactant usable for the emulsion polymerization process adopted in the present invention, insofar as a disperse phase can be formed practically in a long-lasting uniform and stable form in a water-based continuous phase. As the surfactant, known surfactants which are employed in ordinary emulsion polymerization can be suitably used either singly or in combination.

Specific examples of nonionic surfactants, anionic surfactants and cationic surfactants will be listed below. They can be suitably used either singly or in combination.

(1) Nonionic Surfactants

Specific examples of a nonionic surfactant usable in step 1 (aqueous emulsion preparation step) of the production process according to the present invention include polyoxyethylene lauryl ether, polyoxyethylene octylphenyl ether, polyoxyethylene oleyl ether, polyoxyethylene nonylphenyl ether, and oxyethylene-oxypropylene block copolymer. They can be used either singly or in combination.

(2) Anionic Surfactants

Specific examples of an anionic surfactant usable in step 1 (aqueous emulsion preparation step) of the production process according to the present invention include sodium dodecylbenzene sulfonate, sodium lauryl sulfate, sodium alkyl diphenyl ether disulfonate, sodium alkylnaphthalenesulfonate, sodium dialkylsulfosuccinate, potassium stearate, potassium oleate, sodium dioctyl sulfosuccinate, sodium polyoxyethylene alkyl ether sulfate, sodium polyoxyethylene alkyl phenyl ether sulfate, sodium stearate, and sodium oleate. They can be used either singly or in combination.

(3) Cationic Surfactants

Specific examples of a cationic surfactant usable in step 1 (aqueous emulsion preparation step) of the production process according to the present invention include lauryltrimethylammonium chloride and stearyltrimethylammonium chloride. They can be used either singly or in combination.

Amount of Surfactant to be Used

No particular limitation is imposed on the amount of the surfactant to be used, insofar as it is used in an amount sufficient to practically form micelles in a reaction system or in an amount sufficient to form a disperse phase practically in a long-lasting uniform and stable form in a water-base continuous phase.

As the kind and concentration of the surfactant, it is generally necessary to adequately choose conditions sufficient to substantially achieve desired particle properties (layer structure, shape, particle size, particle size distribution, etc.) while taking into consideration the CMC (critical micelle concentration) value inherent to the surfactant and HLB (hydrophilic-lipophilic balance) value.

In general, the surfactant can be used in an amount of from 0.1 to 10 wt. % based on the total weight of all monomers supplied to the reaction system.

Polymerization Initiator

No particular limitation is imposed on the polymerization initiator usable in the emulsion polymerization process adopted in the present invention, insofar as it can substantially show a function to initiate polymerization.

Specific examples of the polymerization initiator include hydrogen peroxide; persulfates such as ammonium persulfate and potassium persulfate; organic peroxides such as cumene hydroperoxide and tert-butyl hydroperoxide; azo compounds such as azobisisobutyronitrile; and redox initiators composed of such compounds, metal ions such as iron ions and reducing agents such as sodium sulfoxylate, formaldehyde, sodium pyrosulfite, sodium hydrogensulfite and L-ascorbic acid.

These polymerization initiators are used in an amount of 0.01–15 parts by weight per 100 parts by weight of the ethylenically unsaturated monomer (a2).

Molecular Weight Regulator

In the present invention, the preferred weight average molecular weight of the (co)polymer particles (A) generally ranges from 50,000 to 90,000,000.

Particle Size of (Co)Polymer Particles (A)

Concerning the particle size of the (co)polymer particles (A), the average particle size as measured in a wet state by the laser light scattering method can range preferably from 50 to 5,000 nm, more preferably from 70 to 3,000 nm, still more preferably from 100 to 1,000 nm.

In general, as the particle size is progressively reduced beyond 50 nm, the viscosity of the redispersion of the flocculate (A') of the (co)polymer is observed to have a tendency to rapidly increase and the workability upon use is observed to have a tendency to become poorer, and because the specific surface area of the particles progressively increases, the stability of the redispersion itself of the flocculate (A') of the (co)polymer is observed to have a tendency to drop correspondingly.

On the other hand, as the particle size is progressively increased beyond 5,000 nm, it is generally observed that the film-forming ability of the redispersion drops and a composition obtained by adding the particles according to the present invention tends to have lower waterproofness and strength.

Properties of Aqueous Emulsion Prepared in the Core Particle Polymerization Step As the aqueous emulsion prepared in the core particle polymerization step of the present invention, a redispersible polymer capable of forming a redispersion which forms a film when dried at room temperature is useful. Upon production of such a redispersible polymer, it is effective to use an aqueous emulsion which forms a film when dried at room temperature.

Especially, to make it possible to form a film by room-temperature drying, Tg as determined in accordance with the Fox's equation ranges preferably from about −40° C. to about +30° C, more preferably from about −30° C. to about +20° C. It is important in the present invention that the polymer of the cores has Tg lower than that of the shells. Their temperature difference can be preferably 10° C. or greater, more preferably 40° C. or greater.

As a polymerization process to be adopted for the core particle polymerization step in the present invention, emulsion polymerization is most preferred because it can easily obtain core particles of a smaller particle size, facilitates the control of the particle size, and is excellent in stability.

Mineral Acid and/or Organic Acid Employed in the Flocculate Forming Step

No particular limitation is imposed on the mineral acid and/or organic acid employed in the flocculate forming step, insofar as they have a function to insolubilize the (co)polymer particles (A) as the flocculate (A') of the (co)polymer.

Specific examples of the mineral acid and organic acid include sulfuric acid, hydrochloric acid, nitric acid, phosphoric acid and acetic acid. They can be used either singly or in combination. Sulfuric acid is particularly preferred, as it can be added in a smaller amount and does not contain chlorine.

Manner of Addition of Mineral Acid and/or Organic Acid in the Flocculate Forming Step It is also effective to add an alcohol or electrolyte upon formation of a flocculate to facilitate the occurrence of flocculation by making combined use of coagulation or salting-out. Preferred as the electrolyte are those containing aluminum ions and capable of showing their effects in a small amount. For example, aluminum sulfate can be mentioned.

No particular limitation is imposed on the temperature of the emulsion system upon addition of the mineral acid and/or organic acid, insofar as the temperature is in such a range as allowing the aqueous emulsion or the mixture of the aqueous emulsion and the protective colloid to retain a liquid phase. The temperature of the emulsion system upon addition of an acid is generally in a range of from 0 to 100° C. As flocculation is caused to occur at a higher temperature, the resulting flocculate lumps become more solid and greater so that their solid-liquid separation becomes easier. In some instances, however, cohesion of particles may become stronger upon flocculation so that the redispersibility may be reduced. In general, the temperature ranges preferably from 10° C. to 80° C., more preferably from 20° C. to 60° C.

It is also possible to induce flocculation by raising the temperature of the system subsequent to the addition of an acid.

Amount of Mineral Acid and/or Organic Acid to be Added in the Flocculate Forming Step In general, the mineral acid and/or organic acid can be added preferably in an amount sufficient to adjust the pH of the aqueous emulsion or the mixture of the aqueous emulsion and the protective colloid to 4 or lower, more preferably in an amount sufficient to adjust its pH to 3 or lower.

Generally, addition of the acid in an unduly small amount may lead to incomplete flocculation and difficult solid-liquid separation, whereas addition of the acid in an excessively large amount may lead to a failure in allowing the (co)polymer particles (A) to exhibit their inherent properties or to difficulty in eliminating the acid by washing same during and/or after solid-liquid separation.

Manner of Addition of Mineral Acid and/or Organic Acid in the Flocculate Forming Step No particular limitation is imposed on the manner of addition of the mineral acid and/or organic acid.

It is generally preferred to use the acid in the form of an aqueous solution for mixing the acid more uniformly and also from the standpoint of safety, although the acid is not necessarily limited to such a solution.

In general, it is preferred to add the acid in the form of a 50% or lower aqueous solution.

Metal Salt for Use in the Flocculate Forming Step

No particular limitation is imposed on the metal salt to be used in the flocculate forming step, insofar as it has a function to insolubilize the (co)polymer particles (A) as the flocculate (A') of the (co)polymer.

Specific examples of the metal salt include aluminum salts such as aluminum sulfate, aluminum chloride, ammonium alum, potassium alum, aluminum polychloride and aluminum polysulfate; iron salts such as ferrous sulfate, ferric sulfate, ferric chloride, ferric polychloride and ferric polysulfate; zinc salts such as zinc chloride and zinc sulfate; magnesium salts such as magnesium oxide, magnesium carbonate and magnesium sulfate; and others, including aluminum hydroxide, iron hydroxide, calcium chloride, sodium chloride, calcium thiosulfate, calcium nitrite, calcium formate, calcium sulfate and potassium nitrate. They can be used either singly or in combination. As the valence of a metal ion becomes higher, the flocculating power becomes stronger so that flocculation can be induced using the metal salt in a smaller amount. Use of an aluminum salt or iron salt is hence preferred in general. Such an aluminum salt or iron salt is also preferred from the standpoint of the safety of effluent or the like.

pH Upon Addition of Metal Salt in the Flocculate Forming Step

Upon addition of the metal salt, it is generally preferred to adjust the pH to a level of from 6 to 2, more preferably from 5 to 3.

This is because, as the acidity increases, the metal can be used in a smaller amount, a flocculate permitting easier solid-liquid separation is formed, and the yield is improved.

Here, use of a mineral acid and/or organic acid as a pH regulator is feasible. Specific examples of the pH regulator include hydrochloric acid, sulfuric acid, phosphoric acid and acetic acid. Sulfuric acid is preferred as a pH regulator, because it can be added in a smaller amount and does not contain chlorine.

No particular limitation is imposed on the temperature of the emulsion system upon addition of the metal salt, insofar as the temperature is in such a range as allowing the aqueous emulsion, which has been obtained in step 2 (aqueous emulsion preparation step), to retain a liquid phase. The temperature of the emulsion system at the time of the addition of the metal salt generally ranges from 0 to 100° C. In general, however, the temperature ranges preferably from 10° C. to 80° C., more preferably from 20° C. to 60° C. because, as the flocculation is caused to occur at a higher temperature, the resulting flocculate lumps become more solid and greater and permits easier solid-liquid separation.

Amount of the Metal to be Added in the Flocculate Forming Step

In general, the amount of the metal to be added is preferably from 0.01 to 70 wt. %, more preferably from 1 to 50 wt. %, still more preferably from 5 to 30 wt. %, all, based on the solid content of the (co)polymer particles (A).

Generally, addition of the metal salt in an unduly small amount may lead to incomplete flocculation and difficult solid-liquid separation, whereas addition of the metal salt in an excessively large amount may lead to a failure in allowing the (co)polymer particles (A) to exhibit their inherent properties or to difficulty in eliminating the metal salt by washing same during and/or after solid-liquid separation.

Manner of Addition of the Metal Salt in the Flocculate Forming Step

No particular limitation is imposed on the manner of addition of the metal salt.

It is generally preferred to add the metal salt in the form of an aqueous solution from the standpoint of safety, although the metal salt is not necessarily limited to such a solution.

Examples of the manner of addition of the metal salt include:

(1) addition of the metal salt in a solid form to the aqueous emulsion; and (2) addition of the metal salt to the aqueous emulsion after converting the metal salt into an solution by dissolving it in a solvent capable of dissolving same at a predetermined concentration or higher.

Separation Method, Drying Method and Grinding Method of the Flocculate (A') of the (Co)Polymer No particular limitation is imposed on the solid-liquid separation method in the process of the present invention, insofar as it is generally employed. In particular, a commonly employed method such as filtration, centrifugation or decantation can be used. Further, the separated flocculate can also be used after drying same.

No particular limitation is imposed on the drying method. For example, the flocculate can be dried by hot-air drying, vacuum drying or the like. The flocculate may undergo further flocculation by drying.

A redispersible polymer—which is available by completely drying a flocculate, which has been subjected to solid-liquid separation, at a temperature of from room temperature to 100° C.—is generally crushable because it is hard and does not have tackiness.

No particular limitation is imposed on the crushing method of the dried redispersible polymer, and a conventional equipment, for example, a hammer mill, a jet mill, a pin mill or the like can be used. This crushing is not required to crush the polymer into primary particles. It is only necessary to crush the polymer to powder in a form convenient for further processing.

To increase the redispersing speed, it is desired to crush the polymer to an average particle size of 1 mm or smaller, with 500 μm or smaller being more preferred and with 300 μm or smaller being still more preferred.

Utility and Application—Hydraulic Cement Composition

The redispersible polymer according to the present invention can be preferably used as a modifier for hydraulic cement. A hydraulic cement composition can be modified by mixing the redispersible polymer in an amount of from 0.5 to 60 wt. %, preferably from 1 to 40 wt. %, still more preferably from 2 to 20 wt. %, all, based on the hydraulic cement.

Utility and Application—Placing Method of Hydraulic Cement

An excellent hardened cement structure can be obtained by mixing 0.5–60 wt. %, preferably 1–40 wt. %, more preferably 2–20 wt. %, based on hydraulic cement, of the redispersible polymer according to the present invention and water with the cement and then placing the mixed concrete. The use of the redispersible polymer according to the present invention as a cement additive can bring about the following marked advantageous effects:

1. improvement in flexural strength;
2. improvement in tensile strength;
3. improvement in bonding strength (which leads to an improvement in the bonding strength to hardened mortar or concrete, plywood, metal, tiles or the like);

4. retention of bonding strength after immersed in water;
5. retention of bonding strength over a long period of time;
6. reduction in the amount of water to be used and hence, an improvement in strength owing to the use of water in the reduced amount, because the redispersible polymer according to the present invention can improve the flowability upon mixing hydraulic cement and has effects as a water reducing agent; and
7. prevention of introduction of air into a mixed cement because the mixing can be completed in a short time owing to the excellent redispersibility.
8. improvement in anti-permeability.
9. improvement in wear resistance.

EXAMPLES

To more specifically describe the present invention, the present invention will be described further on the basis of the following examples and comparative examples.

It should however be borne in mind that in the present specification, the examples, production examples and embodiments are to assist the understanding of the details of the present invention and are not intended to limit the present invention.

All designations of "%", which will follow, refer to "wt. %" unless specified otherwise.

Abbreviations of various raw materials, which will appear in tables to be described in the following examples and comparative examples, are shown below:
MAm: methacrylamide,
AAm: acrylamide,
HEA: 2-hydroxyethyl acrylate,
HEMA: 2-hydroxyethyl methacrylate,
MAc: methacrylic acid,
ST: styrene,
BA: n-butyl acrylate,
n-DM: n-dodecylmercaptan,
MMA: methyl methacrylate,
t-DM: t-dodecylmercaptan,
BD: butadiene,
AN: acrylonitrile,
AA: acrylic acid,
$Al_2(SO_4)_3$: aluminum sulfate,
$CaCl_2$: calcium chloride, and
$FeSO_4$: ferric sulfate.

1. Examples directed to the flocculation of an aqueous emulsion, which had been prepared by protective colloidal polymerization, with an acid (a system making use of an amido-containing ethylenically unsaturated monomer).

Example 1-1
(1) Step 1 (Aqueous Emulsion Preparation Step)
Preparation of Protective Colloid (a1)

In a reaction vessel equipped with a stirrer, a reflux condenser and a thermometer, 785.0 g of purified water and 150.0 g of methacrylamide were charged. Under stirring in a nitrogen gas atmosphere, the contents were heated to 75° C. and were maintained at the same temperature. After the methacrylamide was completely dissolved, 45.0 g of a 5% aqueous solution of ammonium persulfate were added and the resultant mixture was maintained at 75° C. for 7 hours.

Aqueous ammonia and purified water were added to the resultant mixture, whereby a protective colloid (B-1) of 15% resin content and pH 7 was obtained. When that protective colloid (B-1) was acidified to pH 3 with sulfuric acid, flocculation of a polymer took place.

Protective Colloid Polymerization

In a reaction vessel equipped with a stirrer, a reflux condenser and a thermometer, 666.7 g of the protective colloid (B-1) were charged, followed by the addition of 0.5 g of potassium persulfate at 80° C. under stirring in a nitrogen gas atmosphere. On the side, an emulsion of the below-described composition was prepared. The emulsion was added dropwise to the above protective colloid at 80° C. over 3 hours, followed by stirring at 80° C. for 3 hours.

| Purified water | 40.0 g |
| Sodium dodecylbenzenesulfonate | 0.1 g |
| Styrene | 40.0 g |
| n-Butyl acrylate | 50.0 g |
| 2-Hydroxyethyl methacrylate | 5.0 g |
| Methacrylic acid | 3.0 g |
| Acrylamide | 2.0 g |
| n-Dodecylmercaptan | 0.1 g |

Aqueous ammonia and purified water were added to the resultant polymer, whereby an aqueous emulsion (C-1) of 10% resin content and pH 9 was prepared.
(2) Step 2 (Flocculate Forming Step)

When a 5% aqueous solution of sulfuric acid was added at room temperature to 1,000 g of (C-1) until the pH dropped to 2.5, a flocculate was formed. The flocculate was subjected to solid-liquid separation by filtration, and was then dried at 80° C. until the residual water content dropped to 2% or less [note: The residual water content was measured by the measuring method of weight loss on heating prescribed under K5407.5 of JIS (Japanese Industrial Standards). All residual water contents described herein are values measured by this method.]. The thus-dried flocculate was crushed, whereby redispersible polymer powder was obtained.

Example 1-2

Following the procedures of Example 1-1, a protective colloid (B-2) was prepared in accordance with a composition shown in Table 1-1. [When the pH of this protective colloid (B-2) was lowered to pH 3 with sulfuric acid, flocculation of a polymer took place.]Protective colloid polymerization was then conducted to prepare an aqueous emulsion (C-2) of 10% resin content and pH 9. Redispersible polymer powder was obtained by similar procedures.

Example 1-3

Following the procedures of Example 1-1, a protective colloid (B-3) was prepared in accordance with a composition shown in Table 1-1. [When the pH of this protective colloid (B-3) was lowered to pH 3 with sulfuric acid, flocculation of a polymer took place.]Protective colloid polymerization was then conducted to prepare an aqueous emulsion (C-3) of 10% resin content and pH 9. Redispersible polymer powder was obtained by similar procedures.

Example 1-4

Following the procedures of Example 1-1, a protective colloid (B-4) was prepared in accordance with a composition shown in Table 1-1. [When the pH of this protective colloid (B-4) was lowered to pH 3 with sulfuric acid, flocculation of a polymer took place.] Protective colloid polymerization was then conducted to prepare an aqueous emulsion (C-4) of 10% resin content and pH 9. Redispersible polymer powder was obtained by similar procedures.

Example 1-5

Following the procedures of Example 1-1, a protective colloid (B-5) was prepared in accordance with a composition shown in Table 1-1. [When the pH of this protective colloid (B-5) was lowered to pH 3 with sulfuric acid, flocculation of a polymer took place.] Protective colloid polymerization was then conducted to prepare an aqueous emulsion (C-5) of 10% resin content and pH 9. Redispersible polymer powder was obtained by similar procedures.

Example 1-6

Following the procedures of Example 1-1, a protective colloid (B-6) was prepared in accordance with a composition shown in Table 1-1. [When the pH of this protective colloid (B-6) was lowered to pH 3 with sulfuric acid, flocculation of a polymer took place.] Protective colloid polymerization was then conducted to prepare an aqueous emulsion (C-6) of 10% resin content and pH 9. Redispersible polymer powder was obtained by similar procedures.

Example 1-7

Following the procedures of Example 1-1, a protective colloid (B-7) was prepared in accordance with a composition shown in Table 1-1. [When the pH of this protective colloid (B-7) was lowered to pH 3 with sulfuric acid, flocculation of a polymer took place.] Protective colloid polymerization was then conducted to prepare an aqueous emulsion (C-7) of 10% resin content and pH 9. Redispersible polymer powder was obtained by similar procedures.

Example 1-8

Following the procedures of Example 1-1, a protective colloid (B-8) was prepared in accordance with a composition shown in Table 1-1. [When the pH of this protective colloid (B-8) was lowered to pH 3 with sulfuric acid, flocculation of a polymer took place.] Protective colloid polymerization was then conducted to prepare an aqueous emulsion (C-8) of 10% resin content and pH 9. Redispersible polymer powder was obtained by similar procedures.

Example 1-9

Following the procedures of Example 1-1, a protective colloid (B-1) was prepared in accordance with the composition shown in Table 1-1. Protective colloid polymerization was then conducted under the below-described conditions, whereby an aqueous emulsion (C-9) of 10% resin content and pH 9 was prepared. Redispersible polymer powder was obtained by similar procedures.

Protective Colloid Polymerization

In a reaction vessel equipped with a stirrer, a reflux condenser and a thermometer, 400 g of the protective colloind (B-1) and 210 g of purified water were charged, followed by the addition of 0.7 g of potassium persulfate at 80° C. under stirring in a nitrogen gas atmosphere. On the side, an emulsified monomer mixture of the below-described composition was prepared. The emulsified monomer mixture was added dropwise to the above aquoues solution at 80° C. over 3 hours, followed by aging for 3 hours.

| | |
|---|---|
| Purified water | 56.0 g |
| Sodium dodecylbenzenesulfonate | 0.14 g |
| Styrene | 56.0 g |

-continued

| | |
|---|---|
| n-Butyl acrylate | 70.0 g |
| 2-Hydroxyethyl methacrylate | 7.0 g |
| Methacrylic acid | 4.2 g |
| Acrylamide | 2.8 g |
| n-Dodecylmercaptan | 0.14 g |

Example 1-10

Redispersible polymer powder was obtained as in Example 1-4 except that a 5% aqueous solution of hydrochloric acid was added instead of the 5% aqueous solution of sulfuric acid employed for obtaining the flocculate in Example 1-4.

Example 1-11

Redispersible polymer powder was obtained as in Example 1-4 except that a 5% aqueous solution of acetic acid was added instead of the 5% aqueous solution of sulfuric acid employed for obtaining the flocculate in Example 1-4.

Example 1-12

Redispersible polymer powder was obtained as in Example 1-4 except that a flocculate was repeatedly washed with sufficient amounts of purified water upon its collection by filtration.

The redispersible polymer powder and that of Example 1-4 were separately added to portions of a 1% aqueous solution of sodium hydroxide to obtain redispersions. Those redispersions were coated on glass plates and were then dried at room temperature for 3 days, so that films were obtained. Those films were immersed in water for a day and their percent water absorptions were measured. The film formed from the redispersible polymer powder of Example 1-12 was lower in percent water absorption and was superior in waterproofness.

Example 1-13

Following the procedures of Example 1-2 except for the replacement of the emulsion composition used in Example 1-1 by that shown in Table 1-4, an aqueous emulsion (C-10) was obtained and redispersible polymer powder was then obtained from the aqueous emulsion.

| | |
|---|---|
| Purified water | 40.0 g |
| Sodium dodecylbenzenesulfonate | 0.1 g |
| Butyl acrylate | 40.0 g |
| 2-Hydroxyethyl methacrylate | 5.0 g |
| Methacrylic acid | 3.0 g |
| Acrylamide | 2.0 g |
| n-Dodecylmercaptan | 0.1 g |

Example 1-14

Following the procedures of Example 1-13 except for the replacement of the protective colloid (B-1) by the protective colloid (B-4), an aqueous emulsion (C-11) was obtained and redispersible polymer powder was then obtained from the aqueous emulsion.

Example 1-15

In a reaction vessel equipped with a stirrer, 666.7 g of the protective colloid (B-1) were charged, followed by the addition of 1.0 g of potassium persulfate at 70° C. under stirring in a nitrogen gas atmosphere. On the side, an emulsion of the below-described composition was prepared. The emulsion was added dropwise to the above protective colloid at 70° C. over 6 hours, followed by stirring at the same temperature.

| Purified water | 40.0 g |
|---|---|
| Sodium lauryl sulfate | 0.3 g |
| Styrene | 28.0 g |
| Butadiene | 70.0 g |
| Acrylic acid | 2.0 g |
| t-Dodecylmercaptan | 0.3 g |

Aqueous ammonia and purified water were added to the resultant polymer, whereby an aqueous emulsion (C-12) of 10% solid content and pH 9 was prepared.

When a 5% aqueous solution of sulfuric acid was added at room temperature to 1,000 g of (C-12) until the pH dropped to 2.5, a flocculate was formed. The flocculate was subjected to solid-liquid separation by filtration, and was then dried at 80° C. until the residual water content dropped to 2% or less. The thus-dried flocculate was crushed, whereby redispersible polymer powder was obtained.

Comparative Example 1-1

Following the procedures of Example 1-13 except that the protective colloid (B-1) was replaced by 650.0 g of purified water, an aqueous emulsion polymer (C-14) free of the protective colloid (B-1) was obtained. As in Example 1-13, a 5% aqueous solution of sulfuric acid was added until the pH dropped to 2.5. No flocculate was however formed.

Comparative Example 1-2

Following the procedures of Example 1-13 except that the protective colloid (B-1) was replaced by 650.0 g of purified water, an aqueous emulsion polymer (C-14) free of the protective colloid (B-1) was obtained. As in Example 1-13, a 5% aqueous solution of sulfuric acid was added until the pH dropped to 2.5. No flocculate was however formed.

Comparative Example 1-3

Following the procedures of Example 1-15 except that the protective colloid (B-1) was replaced by 650.0 g of purified water, an aqueous emulsion polymer (C-15) free of the protective colloid (B-1) was obtained. As in Example 1-15, a 5% aqueous solution of sulfuric acid was added until the pH dropped to 2.5. No flocculate was however formed.

Comparative Example 1-4

The aqueous emulsions (C-1) to (C-12) were separately subjected to spray drying at an inlet air temperature of 120° C. and an outlet air temperature of 60° C. instead of subjecting same to flocculation with an acid, whereby redispersible polymer powders were obtained. All the aqueous emulsions formed a great deal of deposit on an inner wall of a drying tower. Each redispersible polymer powder had a yield of 30% or lower and was also substantially inferior in redispersibility.

Evaluation Example 1-1

A yield was calculated in accordance with the following formula:

Yield (%)=[{M2−(M2×A/100}/M1]×100 where
M1: solid weight of an aqueous emulsion,
M2: weight of a flocculate dried at 80° C. after filtration,
A: residual water content (%) of the flocculate.

The yield was ranked in accordance with the following system:
A: 95% or higher
B: 90% (inclusive) to 95% (exclusive)
C: 90% to 30% (both, exclusive)
D: 30% or lower Evaluation Example 1-2

Each redispersible polymer powder was crushed to a particle size not greater than 1 mm. The thus-crushed redispersible polymer powder was added to a 1% aqueous solution of sodium hydroxide to give a solid content of 10.00%. The resulting mixture was thoroughly stirred for 30 minutes and then left over for 24 hours. A supernatant was collected and to eliminate any undissolved matter, the solution was filtered through a filter cloth of 300 mesh (50 μm) to prepare a redispersion.

However, the redispersible polymer obtained by spray drying in Comparative Example 1-4 had already been in the form of powder, so that it was sifted through a 16-mesh (1 mm) sieve. Using powder of a particle size of 1 mm and smaller, a redispersion was prepared in the same manner as described above.

The external appearance, redispersibility and room-temperature film-forming properties of the redispersion were evaluated as will be described hereinafter.
(i) Redispersibility
The solid content of the redispersion was measured in accordance with JIS K5407.4 (measuring method of residue after heating) and from the solid content so measured, the redispersibility (%) was determined in accordance with the following calculation formula:
Redispersibility (%)
=[Solid content (%) of
redispersion/10.00]×100
The redispersibility (%) was ranked in accordance with the following system:
A: 100% to 80% (both, inclusive)
B: 80% (exclusive) to 40% (inclusive)
C: 40% (exclusive) to 10% (inclusive)
D: 10% (exclusive) to 0% (inclusive)
(ii) External Appearance
The external appearance of the redispersion was visually measured.
(iii) Room-Temperature Film-Forming Properties
The redispersion was coated on a glass plate and then dried at room temperature for 1 day. The external appearance of the resultant film was visually evaluated and was ranked in accordance with the following system:
A: Film was formed.
B: Film was formed with cracks formed therein.
C: No film was formed.

Evaluation Example 1-3

Redispersible polymer powder was crushed until the plus-sieve residue on an 80-mesh (200-μm) sieve became 5% or less. The resultant powder was mixed in the below-described portion in cement, and the resulting cement mix was tested in mixing time, workability, flexural strength and compression strength.

However, the redispersible polymer obtained by spray drying in Comparative Example 1-4 had already been in the form of powder so that powder, which was obtained by classifying the polymer to give a plus-sieve residue of 5% on an 80-mesh (200-μm) sieve, was tested in the same manner as described above.

| Portland cement | 1,000 g |
|---|---|
| Toyoura standard sand | 2,000 g |
| Solid anti-foaming agent | 5 g |
| Redispersible polymer powder | 100 g |

Water was mixed with the above-described dry mix to give a flow value of 170±10 mm. Aging was conducted first at 20° C. and at least 80% R.H. for 2 days and then at 20° C. and 65 R.H. Testing methods will be described below.
(i) Mixing Time
A time required from the addition of water to the dry mix until being mixed into a uniform moisturized form was measured.
(ii) Trowelability
Workability upon conducting surface flattening by a trowel was ranked in accordance with the following system:
A: Excellent
B: Good
C: Average
D: Poor
(iii) Flexural Strength
Samples of 7 days of age and 28 days of age were tested in accordance with JIS A1172.
(iv) Compression Strength
Samples of 7 days of age and 28 days of age were tested in accordance with JIS A1172.
Further, samples obtained without using any redispersible polymer powder were also tested as controls.
The compositions of the protective colloids used in the above Examples and Comparative Examples are presented in Table 1-1, the compositions of the aqueous emulsions employed in the above Examples and Comparative Examples are shown in Table 1-2 to Table 1-4, and the compositions and evaluation results of the redispersible polymer powders obtained in the above Examples and Comparative Examples are summarized in Table 1-5 to Table 1-15.
2. Examples directed to the flocculation of an aqueous emulsion, which had been prepared by core/shell polymerization, with an acid (a system making use of an amido-containing ethylenically unsaturated monomer).

Example 2-1

(i) Step 1 (Core Particle Polymerization Step—Preparation of Aqueous Emulsion)
In a reaction vessel equipped with a stirrer, a reflux condenser and a thermometer, an aqueous solution consisting of 785 g of purified water and 3 g of sodium dodecylbenzenesulfonate (abbreviated as "DBS") was charged, followed by the addition of 5 g of potassium persulfate at 80° C. under stirring in a nitrogen gas atmosphere. On the side, an emulsion of the below-described composition was prepared. The emulsion was added dropwise to the above aqueous solution at 80° C. over 3 hours, followed by maintenance at 80° C. for 3 hours.

| Purified water | 400 g |
|---|---|
| DBS | 1 g |

-continued

| Styrene | 400 g |
|---|---|
| n-Butyl acrylate | 500 g |
| 2-Hydroxyethyl methacrylate | 50 g |
| Methacrylic acid | 30 g |
| Acrylamide | 20 g |
| n-Dodecylmercaptan | 1 g |

Aqueous ammonia and purified water were added to the resultant aqueous emulsion to adjust its pH and resin content to 9 and 45%, respectively. This aqueous emulsion will be designated "(A-1)".
(ii) Step 2 (Shell Polymerization Step)
In a reaction vessel equipped with a stirrer, a reflux condenser and a thermometer, 222.2 g of the aqueous emulsion (A-1), 647.8 g of purified water and 100.0 g of methacrylamide were charged. The contents were heated to 75° C. under stirring in a nitrogen gas atmosphere and were maintained at the same temperature. After the methacrylamide was completely dissolved, 30.0 g of a 5% aqueous solution of ammonium persulfate were added and the resultant mixture was maintained at 75° C. for 7 hours.
As a result, an aqueous emulsion of 20% resin content and pH 9 was obtained. This aqueous emulsion will be designated "C-1".
(iii) Step 3 (Flocculate Forming Step)
When the aqueous emulsion (C-1) was diluted to 10% solid content with purified water and a 5% aqueous solution of sulfuric acid was then added at room temperature to 1,000 g of the thus-diluted aqueous emulsion until the pH dropped to 2.5, a flocculate was formed. The flocculate was subjected to solid-liquid separation by filtration, and was then dried at 80° C. until the residual water content dropped to 2% or less. The thus-dried flocculate was crushed, whereby redispersible polymer powder was obtained.

Examples 2-2 to 2-9

(i) Step 1 (Core Particle Polymerization Step—Preparation of Aqueous Emulsion)
An aqueous emulsion (A-1) was obtained as in Example 2-1.
(ii) Step 2 (Shell Polymerization Step)
Aqueous emulsions (C-2 to C-9) were each prepared in accordance with its corresponding composition shown in Table 2-2.
(iii) Step 3 (Flocculate Forming Step)
From the aqueous emulsions (C-2 to C-9), redispersible polymer powders were obtained following the procedures of Example 2-1.

Example 2-10

(i) Step 1 (Core Particle Polymerization Step—Preparation of Aqueous Emulsion)
Based on the monomer composition shown in Table 2-1, an aqueous emulsion (A-2) of pH 9 and 45% solid content was obtained in the same manner as the aqueous emulsion (A-1).
(ii) Step 2 (Shell Polymerization Step)
An aqueous emulsion (C-10) was prepared in accordance with its corresponding composition shown in Table 2-3.
(iii) Step 3 (Flocculate Forming Step)
From the aqueous emulsion (C-10), redispersible polymer powder was obtained following the procedures of Example 2-1.

Example 2-11

(i) Step 1 (Core Particle Polymerization Step—Preparation of Aqueous Emulsion)

An aqueous emulsion (A-2) was obtained as in Example 2-10.

(ii) Step 2 (Shell Polymerization Step)

An aqueous emulsion (C-11) was prepared in accordance with its corresponding composition shown in Table 2-3.

(iii) Step 3 (Flocculate Forming Step)

From the aqueous emulsion (C-11), redispersible polymer powder was obtained following the procedures of Example 2-1.

Example 2-12

(i) Step 1 (Core Particle Polymerization Step—Preparation of Aqueous Emulsion)

An aqueous emulsion (A-3) was prepared by the following procedures.

In an autoclave equipped with a stirrer, an aqueous solution consisting of 790 g of purified water, 2 g of sodium laurylsulfate and 1 g of sodium hydrogencarbonate was charged, followed by the addition of 10 g of potassium persulfate at 70° C. under stirring in a nitrogen gas atmosphere. On the side, an emulsion of the below-described composition was prepared. The emulsion was added dropwise to the above aqueous solution at 70° C. over 3 hours, followed by maintenance at the same temperature for 3 hours.

| | |
|---|---:|
| Purified water | 400 g |
| Sodium lauryl sulfate | 3 g |
| Styrene | 280 g |
| Butadiene | 700 g |
| Acrylic acid | 20 g |
| t-Dodecylmercapatan | 3 g |

Aqueous ammonia and purified water were added to the thus-obtained SBR latex, whereby an aqueous emulsion (A-3) of pH 9 and 45% solid content was prepared.

(ii) Step 2 (Shell Polymerization Step)

An aqueous emulsion (C-12) was prepared in accordance with its corresponding composition shown in Table 2-3.

(iii) Step 3 (Flocculate Forming Step)

From the aqueous emulsion (C-12), redispersible polymer powder was obtained following the procedures of Example 2-1.

Example 2-13

Redispersible polymer powder was obtained as in Example 2-4 except that a 5% aqueous solution of hydrochloric acid was added instead of the 5% aqueous solution of sulfuric acid employed for obtaining the flocculate in Example 2-4.

Example 2-14

Redispersible polymer powder was obtained as in Example 2-4 except that a 5% aqueous solution of acetic acid was added instead of the 5% aqueous solution of sulfuric acid employed for obtaining the flocculate in Example 2-4.

Example 2-15

Redispersible polymer powder was obtained as in Example 2-4 except that a flocculate was repeatedly washed with sufficient amounts of purified water upon its collection by filtration.

The redispersible polymer powder and that of Example 2-4 were separately added to portions of a 1% aqueous solution of sodium hydroxide to obtain redispersions. Those redispersions were coated on glass plates and were then dried at room temperature for 3 days, so that films were obtained. Those films were immersed in water for a day and the percent water absorptions of the films were measured. The film formed from the redispersible polymer powder of Example 2-15 was lower in percent water absorption and was superior in waterproofness.

Comparative Examples 2-1 to 2-3

The aqueous emulsions (A-1) to (A-3) were each diluted to 10% solid content with purified water and a 5% aqueous solution of sulfuric acid was then added at room temperature to 1,000 g of the thus-diluted emulsion until its pH dropped to 2.5. No flocculate was however formed from any of the aqueous emulsions.

Comparative Example 2-4

The aqueous emulsions (C-1) to (C-12) were separately subjected to spray drying at an inlet air temperature of 120° C. and an outlet air temperature of 60° C., whereby redispersible polymer powders were obtained. All the aqueous emulsions formed a great deal of deposit on an inner wall of a drying tower. Each redispersible polymer powder had a yield of 30% or lower and was also substantially inferior in redispersibility.

Evaluation Example 2-1

Yields were calculated and ranked as in Evaluation Example 1-1.

Evaluation Example 2-2 to 2-3

From the redispersible polymer powders, redispersions were prepared as in Evaluation Examples 1-2 to 1-3.

However, the redispersible polymer obtained by spray drying in Comparative Example 2-4 had already been in the form of powder, so that it was sifted through a 16-mesh (1 mm) sieve. Using powder of a particle size of 1 mm and smaller, a redispersion was prepared in the same manner as described above.

The external appearance, redispersibility and room-temperature film-forming properties of each of those redispersions were evaluated by the methods described in Evaluation Example 1-2. Further, cement mixes were prepared and evaluated by the methods described in Evaluation Example 1-3.

However, the redispersible polymer obtained by spray drying in Comparative Example 2-4 had already been in the form of powder so that powder, which was obtained by classifying the polymer to give a plus-sieve residue of 5% or less on an 80-mesh (200-$\mu$m) sieve, was tested in the same manner as described above.

The compositions of the aqueous emulsions prepared in Step 1 and employed in the above Examples and Comparative Examples are shown in Table 2-1, the compositions of the aqueous emulsions prepared in Step 2 and employed in the above Examples and Comparative Examples are presented in Table 2-2 and Table 2-3, and the compositions and evaluation results of the redispersible polymer powders obtained in the above Examples and Comparative Examples are summarized in Table 2-4 to Table 2-13.

3. Examples directed to the flocculation of a mixture of an aqueous emulsion and a protective colloid with an acid (a system making use of an amido-containing ethylenically unsaturated monomer).

Example 3-1

(i) Aqueous Emulsion Preparation Step

An aqueous emulsion (A-1) was prepared by the following procedures.

In a reaction vessel equipped with a stirrer, a reflux condenser and a thermometer, an aqueous solution consisting of 785 g of purified water and 3 g of sodium dodecylbenzenesulfonate (abbreviated as "DBS") was charged, followed by the addition of 5 g of potassium persulfate at 80° C. under stirring in a nitrogen gas atmosphere. On the side, an emulsion of the below-described composition was prepared. The emulsion was added dropwise to the above aqueous solution at 80° C. over 3 hours, followed by maintenance at the same temperature for 3 hours.

| Purified water | 400 g |
|---|---|
| DBS | 1 g |
| Styrene | 400 g |
| n-Butyl acrylate | 500 g |
| 2-Hydroxyethyl methacrylate | 50 g |
| Methacrylic acid | 30 g |
| Acrylamide | 20 g |
| n-Dodecylmercaptan | 1 g |

Aqueous ammonia and purified water were added to the resultant aqueous emulsion to adjust its pH and resin content to 9 and 45%, respectively. This aqueous emulsion will be designated "(A-1)".

(ii) Protective Colloid Preparation Step

A protective colloid (a1) was prepared by the following procedures.

In a reaction vessel equipped with a stirrer, a reflux condenser and a thermometer, 850 g of purified water and 100.0 g of methacrylamide were charged. The contents were heated to 75° C. under stirring in a nitrogen gas atmosphere and were maintained at the same temperature. After the methacrylamide was completely dissolved, 30.0 g of a 5% aqueous solution of ammonium persulfate were added and the resultant mixture was maintained at 75° C. for 7 hours.

Aqueous ammonia and purified water were then added, whereby a protective colloid (B-1) of 10% resin content and pH 9 was obtained.

(iii) Mixing Step

The aqueous emulsion (A-1) and the protective colloid (B-1) were mixed and stirred to give a solid ratio of 50/50.

(iv) Flocculate Forming Step

When the mixture of the aqueous emulsion (A-1) an the protective colloid (B-1), which had been formed in the mixing step, was diluted to 10% resin content with purified water and a 5% aqueous solution of sulfuric acid was then added at room temperature to 1,000 g of the thus-diluted mixture until the pH dropped to 2.5, a flocculate was formed. The flocculate was subjected to solid-liquid separation by filtration, and was then dried at 80° C. until the residual water content dropped to 2% or less. The thus-dried flocculate was crushed, whereby redispersible polymer powder was obtained.

Examples 3-2 to 3-9

(i) Aqueous Emulsion Preparation Step

Aqueous emulsions (A-1 to A-3) of the compositions shown in Table 3-1 were prepared as in Example 3-1.

(ii) Protective Colloid Preparation Step

Following the procedures of Example 3-1, protective colloids (B-2 to B-8) were prepared in accordance with their corresponding compositions shown in Table 3-2.

(iii) Mixing Step

The aqueous emulsions (A-1 to A-3) and the protective colloids (B-2 to B-8) were mixed and stirred to give a solid ratio of 50/50 or 70/30.

(iv) Flocculate Forming Step

Following the procedures of Example 3-1, redispersible polymer powders were obtained.

Example 3-10

Redispersible polymer powder was obtained as in Example 3-4 except that a 5% aqueous solution of hydrochloric acid was added instead of the 5% aqueous solution of sulfuric acid employed for obtaining the flocculate in Example 3-4.

Example 3-11

Redispersible polymer powder was obtained as in Example 3-4 except that a 5% aqueous solution of acetic acid was added instead of the 5% aqueous solution of sulfuric acid employed for obtaining the flocculate in Example 3-4.

Example 3-12

Redispersible polymer powder was obtained as in Example 3-4 except that a flocculate was repeatedly washed with sufficient amounts of purified water upon its collection by filtration.

The redispersible polymer powder and that of Example 3-4 were separately added to portions of a 1% aqueous solution of sodium hydroxide to obtain redispersions. Those redispersions were coated on glass plates and were then dried at room temperature for 3 days, so that films were obtained. Those films were immersed in water. The film formed from the redispersible polymer powder of Example 3-12 was found to be superior in waterproofness.

Example 3-13

After the protective colloid (B-1) was mixed and stirred with the aqueous emulsion (A-2) to give a solid ratio of 50/50, redispersible polymer powder was obtained following the procedures of Example 3-1.

Example 3-14

After the protective colloid (B-4) was mixed and stirred with the aqueous emulsion (A-2) to give a solid ratio of 50/50, redispersible polymer powder was obtained following the procedures of Example 3-1.

Example 3-15

(i) Aqueous Emulsion Preparation Step

An aqueous emulsion (A-3) was prepared by the following procedures.

In an autoclave equipped with a stirrer, 790 g of purified water, 2 g of sodium laurylsulfate and 1 g of sodium hydrogencarbonate were charged, followed by the addition of 10 g of potassium persulfate at 70° C. under stirring in a nitrogen gas atmosphere. On the side, an emulsified monomer mixture of the below-described composition was prepared. The monomer mixture was added dropwise to the above aqueous solution over 6 hours, followed by aging.

| | |
|---|---|
| Purified water | 400 g |
| Sodium lauryl sulfate | 3 g |
| Styrene | 280 g |
| Butadiene | 700 g |
| Acrylic acid | 20 g |
| t-Dodecylmercaptan | 3 g |

Aqueous ammonia and purified water were added to the thus-obtained SBR latex, whereby an aqueous emulsion (A-3) of pH 9 and 45% solid content was prepared.

(ii) Protective Colloid Preparation Step

A protective colloid (B-1) of the corresponding composition shown in Table 3-2 was prepared by the following the procedures of Example 3-1.

(iii) Mixing Step

The aqueous emulsion (A-3) and the protective colloid (B-1) were mixed and stirred to give a solid ratio of 50/50.

(iv) Flocculate Forming Step

Redispersible polymer powder was obtained as in Example 3-4 except that a flocculate was repeatedly washed with sufficient amounts of purified water upon its collection by filtration.

Comparative Examples 3-1 to 3-3

The aqueous emulsions (A-1) to (A-3) were each diluted to 10% solid content with purified water and a 5% aqueous solution of sulfuric acid was then added at room temperature to 1,000 g of the thus-diluted emulsion until its pH dropped to 2.5. No flocculate was however formed from any of the aqueous emulsions.

Comparative Example 3-4

Mixtures of the aqueous emulsions and the protective colloids, said mixtures having been prepared in Examples 3-1 to 3-9 and 3-13 to 3-15, were separately subjected to spray drying at an inlet air temperature of 120° C. and an outlet air temperature of 60° C., whereby redispersible polymer powders were obtained. All the mixtures formed a great deal of deposit on an inner wall of a drying tower. Each redispersible polymer powder had a yield of 30% or lower and was also substantially inferior in redispersibility.

Evaluation Example 3-1

Yields were calculated and ranked as in Evaluation Example 1-1.

Evaluation Example 3-2 to 3-3

From the redispersible polymer powders, redispersions were prepared as in Evaluation Examples 1-2 to 1-3.

However, the redispersible polymer obtained by spray drying in Comparative Example 2-4 had already been in the form of powder, so that it was sifted through a 16-mesh (1 mm) sieve. Using powder of a particle size of 1 mm and smaller, a redispersion was prepared in the same manner as described above.

The external appearance, redispersibility and room-temperature film-forming properties of each of those redispersions were evaluated by the methods described in Evaluation Example 1-2. Further, cement mixes were prepared and evaluated by the methods described in Evaluation Example 1-3.

However, the redispersible polymer obtained by spray drying in Comparative Example 3-4 had already been in the form of powder, so that it was sifted through a 16-mesh (1 mm) sieve. Using powder of a particle size of 1 mm and smaller, a redispersion was prepared in the same manner as described above.

The compositions of the aqueous emulsions employed in the above Examples and Comparative Examples are shown in Table 3-1, the compositions of the protective colloids employed in the above Examples and Comparative Examples are presented in Table 3-2, and the compositions and evaluation results of the redispersible polymer powders obtained in the above Examples and Comparative Examples are summarized in Table 3-3 to Table 3-14.

4. Examples directed to the flocculation of an aqueous emulsion, which had been prepared by protective colloidal polymerization, with a metal salt (a system making use of an amido-containing ethylenically unsaturated monomer).

Example 4-1

(1) Step 1 (Aqueous Emulsion Preparation Step)

In a reaction vessel equipped with a stirrer, a reflux condenser and a thermometer, 785.0 g of purified water and 150.0 g of methacrylamide were charged. Under stirring in a nitrogen gas atmosphere, the contents were heated to 75° C. and were maintained at the same temperature. After the methacrylamide was completely dissolved, 45.0 g of a 5% aqueous solution of ammonium persulfate were added and the resultant mixture was maintained at 75° C. for 7 hours to obtain an aqueous solution. Aqueous ammonia and purified water were added to the aqueous solution, whereby a protective colloid (B-1) of 15% resin content and pH 9 was obtained.

Protective Colloid Polymerization

In a reaction vessel equipped with a stirrer, a reflux condenser and a thermometer, 666.7 g of the protective colloid (B-1) were charged, followed by the addition of 0.5 g of potassium persulfate at 80° C. under stirring in a nitrogen gas atmosphere. On the side, an emulsion of the below-described composition was prepared. The emulsion was added dropwise to the above aqueous solution at 80° C. over 3 hours, followed by stirring at the same temperature for 3 hours.

| | |
|---|---|
| Purified water | 40.0 g |
| Sodium dodecylbenzenesulfonate | 0.1 g |
| Styrene | 40.0 g |
| n-Butyl acrylate | 50.0 g |
| 2-Hydroxyethyl methacrylate | 5.0 g |
| Methacrylic acid | 3.0 g |
| Acrylamide | 2.0 g |
| n-Dodecylmercaptan | 0.1 g |

Aqueous ammonia and purified water were added to the resultant polymer, whereby an aqueous emulsion (C-1) of 10% resin content and pH 9 was prepared.

(2) Step 2 (Flocculate Forming Step)

When 50 g of a 45% aqueous solution of aluminum sulfate were added at room temperature to 1,000 g of (C-1), a flocculate was formed. The flocculate was subjected to solid-liquid separation by filtration, and was then dried at 80° C. until the residual water content dropped to 2% or less [note: Each residual water content will hereinafter mean a value measured by this method). The thus-dried flocculate was crushed, whereby redispersible polymer powder was obtained.

Examples 4-2 to 4-8

(1) Step 1 (Aqueous Emulsion Preparation Step)
Preparation of Protective Colloid (a1)

Following the procedures of Example 4-1, protective colloids (B-2) to (B-8) were prepared in accordance with their corresponding compositions shown in Table 4-1.

Protective Colloid Polymerization

Aqueous emulsions (C-2) to (C-8) were obtained following the procedures of Example 4-1 except that the protective colloid (B-1) in Example 4-1 was replaced by the protective colloids (B-2) to (B-8), respectively.

(2) Step 2 (Flocculate Forming Step)

Redispersible polymer powders were obtained following the procedures of Example 4-1 except that the aqueous emulsion (C-1) in Example 4-1 was replaced by the aqueous emulsions (C-2) to (C-8).

Example 4-9

(1) Step 1 (Aqueous Emulsion Preparation Step)
Preparation of Protective Colloid (a1)

Following the procedures of Example 4-1, a protective colloid (B-1) was prepared.

Protective Colloid Polymerization

In a reaction vessel equipped with a stirrer, a reflux condenser and a thermometer, 400.0 g of the protective colloid (B-1) and 210 g of purified water were charged, followed by the addition of 0.7 g of potassium persulfate at 80° C. under stirring in a nitrogen gas atmosphere. On the side, an emulsion of the below-described composition was prepared. The emulsion was added dropwise to the above aqueous solution over 3 hours, followed by aging for 3 hours.

| | |
|---|---|
| Purified water | 56.0 g |
| Sodium dodecylbenzenesulfonate | 0.14 g |
| Styrene | 56.0 g |
| n-Butyl acrylate | 70.0 g |
| 2-Hydroxyethyl methacrylate | 7.0 g |
| Methacrylic acid | 4.2 g |
| Acrylamide | 2.8 g |
| n-Dodecylmercaptan | 0.14 g |

Aqueous ammonia and purified water were added to the resultant polymer, whereby an aqueous emulsion (C-9) of 10% resin content and pH 9 was prepared.

(2) Step 2 (Flocculate Forming Step)

When 50 g of a 45% aqueous solution of aluminum sulfate were added at room temperature to 1,000 g of (C-9), a flocculate was formed. The flocculate was subjected to solid-liquid separation by filtration, and was then dried at 80° C. until the residual water content dropped to 2% or less. The thus-dried flocculate was crushed, whereby redispersible polymer powder was obtained.

Example 4-10

Redispersible polymer powder was obtained as in Example 4-4 except that 225 g of a 10% aqueous solution of ferric sulfate were added in place of the 45% aqueous solution of aluminum sulfate employed for obtaining the flocculate in Example 4-4.

Example 4-11

Redispersible polymer powder was obtained following the procedures of Example 4-4 except that the 45% aqueous solution of aluminum sulfate was added after the temperature of the aqueous emulsion was raised to 70° C. Flocculate lumps so obtained were greater than those obtained in Example 4-4, so that the solid-liquid separation time by filtration was shortened to 1/10 and the workability was improved.

Example 4-12

Redispersible polymer powder was obtained following the procedures of Example 4-4 except that 225 g of a 10% aqueous solution of calcium chloride were added in place of the 45% aqueous solution of aluminum sulfate employed for obtaining the flocculate in Example 4-4.

Example 4-13

Redispersible polymer powder was obtained following the procedures of Example 4-12 except that the pH of the aqueous emulsion was adjusted to 4 with sulfuric acid before the addition of a metal salt and 225 g of a 10% aqueous solution of calcium chloride were added as the metal salt. Flocculate lumps so obtained were greater than those obtained in Example 4-12, so that the solid-liquid separation time by filtration was shortened to 1/3 and the workability was improved.

Example 4-14

Redispersible polymer powder was obtained as in Example 4-4 except that the amount of the 45% aqueous solution of aluminum sulfate was changed to 6.5 g.

Example 4-15

Redispersible polymer powder was obtained as in Example 4-4 except that a flocculate was repeatedly washed with sufficient amounts of purified water upon its collection by filtration.

The redispersible polymer powder and that of Example 4-4 were separately added to portions of a 1% aqueous solution of sodium hydroxide to obtain redispersions. Those redispersions were coated on glass plates and were then dried at room temperature for 3 days, so that films were obtained. Those films were immersed in water for a day and their percent water absorptions were measured. The film formed from the redispersible polymer powder of Example 4-15 was lower in percent water absorption and was superior in waterproofness.

Example 4-16

(1) Step 1 (Aqueous Emulsion Preparation Step)
Preparation of Protective Colloid (a1)

Following the procedures of Example 4-1, a protective colloid (B-1) was prepared.

Protective Colloid Polymerization

Following the procedures of Example 4-1 except that the emulsion employed there was modified as will be described below, an aqueous emulsion (C-10) was obtained and from the aqueous emulsion, redispersible polymer powder was obtained.

| | |
|---|---|
| Purified water | 40.0 g |
| Sodium dodecylbenzenesulfonate | 0.1 g |
| Methyl methacrylate | 50.0 g |
| Butyl acrylate | 40.0 g |
| 2-Hydroxyethyl methacrylate | 5.0 g |

| | |
|---|---|
| Methacrylic acid | 3.0 g |
| Acrylamide | 2.0 g |
| n-Dodecylmercaptan | 0.1 g |

(2) Step 2 (Flocculate Forming Step)

Redispersible polymer powder was obtained as in Example 4-1.

Example 4-17

Following the procedures of Example 4-16 except that the protective colloid (B-1) was changed to the protective colloid (B-4), an aqueous emulsion (C-11) was obtained and from the aqueous emulsion, redispersible polymer powder was obtained.

Example 4-18
(1) Step 1 (Aqueous Emulsion Preparation Step)
Preparation of Protective Colloid (a1)

Following the procedures of Example 4-1, a protective colloid (B-1) was prepared.
Protective Colloid Polymerization In an autoclave equipped with a stirrer, 666.7 g of the protective colloid (B-1) were charged, followed by the addition of 1.0 g of potassium persulfate at 70° C. under stirring in a nitrogen gas atmosphere. On the side, an emulsion of the below-described composition was prepared. The emulsion was added dropwise to the above aqueous solution over 6 hours, followed by aging.

| | |
|---|---|
| Purified water | 40.0 g |
| Sodium lauryl sulfate | 0.3 g |
| Styrene | 28.0 g |
| Butadiene | 70.0 g |
| Acrylic acid | 2.0 g |
| t-Dodecylmercaptan | 0.3 g |

Aqueous ammonia and purified water were added to the resultant polymer, whereby an aqueous emulsion (C-12) of 10% solid content and pH 9 was prepared.
(2) Step 2 (Flocculate Forming Step)

When 50 g of a 45% aqueous solution of aluminum sulfate were added at room temperature to 1,000 g of (C-12), a flocculate was formed. The flocculate was subjected to solid-liquid separation by filtration, and was then dried at 80° C. until the residual water content dropped to 2% or less. The thus-dried flocculate was crushed, whereby redispersible polymer powder was obtained.

Comparative Example 4-1

Following the procedures of Example 4-1 except that the protective colloid (B-1) was replaced by 650.0 g of purified water, an aqueous emulsion polymer (C-13) free of the protective colloid (B-1) was obtained. It was then attempted to obtain redispersible polymer powder from the aqueous emulsion polymer. However, a flocculate obtained after drying was so soft that its crushing was impossible. Evaluation of its redispersibility was therefore conducted without crushing.

Comparative Example 4-2

Following the procedures of Example 4-16 except that the protective colloid (B-1) was replaced by 650.0 g of purified water, an aqueous emulsion polymer (C-14) free of the protective colloid (B-1) was obtained. It was then attempted to obtain redispersible polymer powder from the aqueous emulsion polymer. However, a flocculate obtained after drying was so soft that its crushing was impossible. Evaluation of its redispersibility was therefore conducted without crushing.

Comparative Example 4-3

Following the procedures of Example 4-18 except that the protective colloid (B-1) was replaced by 650.0 g of purified water, an aqueous emulsion polymer (C-15) free of the protective colloid (B-1) was obtained. It was then attempted to obtain redispersible polymer powder from the aqueous emulsion polymer. However, a flocculate obtained after drying was so soft that its crushing was impossible. Evaluation of its redispersibility was therefore conducted without crushing.

Comparative Example 4-4

The aqueous emulsions (C-1) to (C-12) were separately subjected to spray drying at an inlet air temperature of 120° C. and an outlet air temperature of 600° C. instead of subjecting to flocculation with any metal salt, whereby redispersible polymer powders were obtained. All the aqueous emulsions formed a great deal of deposit on an inner wall of a drying tower. Each redispersible polymer powder had a yield of 30% or lower and was also substantially inferior in redispersibility.

Comparative Example 4-5

It was attempted to obtain redispersible polymer powder as in Example 4-4 except that the amount of the 45% aqueous solution of aluminum sulfate was changed to 0.01 g. No flocculate was however formed.

Evaluation Example 4-1

Yields were calculated and ranked as in Evaluation Example 1-1.

Evaluation Example 4-2

The redispersible polymer powders were evaluated as in Evaluation Example 1-2.

Evaluation Example 4-3

Evaluation was conducted as in Evaluation Example 1-3.

However, the redispersible polymer obtained by spray drying in Comparative Example 4-4 had already been in the form of powder so that powder, which was obtained by classifying the polymer to give a plus-sieve residue of 5% or less on an 80-mesh (200-µm) sieve, was tested in the same manner as described above.

The compositions of the protective colloids used in the above Examples and Comparative Examples are presented in Table 4-1, the compositions of the aqueous emulsions employed in the above Examples and Comparative Examples are shown in Table 4-2 to Table 4-4, and the compositions and evaluation results of the redispersible polymer powders obtained in the above Examples and Comparative Examples are summarized in Table 4-5 to Table 4-13.

5. Examples directed to the flocculation of an aqueous emulsion, which had been prepared by core/shell polymerization, with a metal salt (a system making use of an amido-containing ethylenically unsaturated monomer).

Example 5-1

(i) Step 1 (Core Particle Polymerization Step—Preparation of Aqueous Emulsion)

In a reaction vessel equipped with a stirrer, a reflux condenser and a thermometer, 785 g of purified water and 3 g of sodium dodecylbenzenesulfonate (abbreviated as "DBS") were charged, followed by the addition of 5 g of potassium persulfate at 80° C. under stirring in a nitrogen gas atmosphere. On the side, an emulsion of the below-described composition was prepared. The emulsion was added dropwise to the above aqueous solution at 80° C. over 3 hours, followed by maintenance at the same temperature for 3 hours.

| | |
|---|---|
| Purified water | 400 g |
| DBS | 1 g |
| Styrene | 400 g |
| n-Butyl acrylate | 500 g |
| 2-Hydroxyethyl methacrylate | 50 g |
| Methacrylic acid | 30 g |
| Acrylamide | 20 g |
| n-Dodecylmercaptan | 1 g |

Aqueous ammonia and purified water were added to the resultant aqueous emulsion to adjust its pH and resin content to 9 and 45%, respectively. This aqueous emulsion will be designated "(A-1)".

(ii) Step 2 (Shell Polymerization Step)

In a reaction vessel equipped with a stirrer, a reflux condenser and a thermometer, 222.2 g of the aqueous emulsion (A-1), 647.8 g of purified water and 100.0 g of methacrylamide were charged. The contents were heated to 75° C. under stirring in a nitrogen gas atmosphere and were maintained at the same temperature. After the methacrylamide was completely dissolved, 30.0 g of a 5% aqueous solution of ammonium persulfate were added and the resultant mixture was maintained at 750° C. for 7 hours.

As a result, an aqueous emulsion of 20% resin content and pH 9 was obtained. This aqueous emulsion will be designated "C-1".

(iii) Step 3 (Flocculate Forming Step)

When the aqueous emulsion (C-1) was diluted to 10% resin content with purified water and 50 g of a 45% aqueous solution of aluminum sulfate were then added at room temperature to 1,000 g of the thus-diluted aqueous emulsion, a flocculate was formed. The flocculate was subjected to solid-liquid separation by filtration, and was then dried at 80° C. until the residual water content dropped to 2% or less [note: The residual water content was measured by the measuring method of weight loss on heating prescribed under JIS K5407.5. Each residual water content will hereinafter mean a value measured by this method]. The thus-dried flocculate was crushed, whereby redispersible polymer powder was obtained.

Examples 5-2 to 5-12

(1) Step 1 (Core Particle Polymerization Step—Preparation of Aqueous Emulsion)

i) Preparation of Aqueous Emulsion (A-1)

Following the procedures of Example 5-1, an aqueous emulsion (A-1) was prepared.

ii) Preparation of Aqueous Emulsion (A-2)

Following the procedures of the preparation process of the aqueous emulsion (A-1) shown in Example 5-1, an aqueous emulsion (A-2) of pH 9 and 45% resin content was obtained in accordance with its corresponding monomer composition shown in Table 5-1.

iii) Preparation of Aqueous Emulsion (A-3)

In an autoclave equipped with a stirrer, an aqueous solution consisting of 790 g of purified water, 2 g of sodium lauryl sulfate and 1 g of sodium hydrogencarbonate was charged, followed by the addition of 10 g of potassium persulfate at 70° C. under stirring in a nitrogen gas atmosphere. On the side, an emulsion of the below-described composition was prepared. The emulsion was added dropwise to the above aqueous solution at 70° C. over 3 hours, followed by maintenance at the same temperature for 3 hours.

| | |
|---|---|
| Purified water | 400 g |
| Sodium lauryl sulfate | 3 g |
| Styrene | 280 g |
| Butadiene | 700 g |
| Acrylic acid | 20 g |
| t-Dodecylmercaptan | 3 g |

Aqueous ammonia and purified water were added to the thus-obtained SBR latex, whereby an aqueous emulsion (A-3) of pH 9 and 45% solid content was prepared.

(2) Step 2 (Shell Polymerization Step)

Following the procedures of Example 5-1, aqueous emulsions (C-2) to (C-12) were prepared in accordance with their corresponding compositions shown in Table 5-2 and Table 5-3.

(3) Step 3 (Flocculate Forming Step)

From the aqueous emulsions (C-2) to (C-12), redispersible polymer powders were obtained, respectively, following the procedures of Example 5-1.

Example 5-13

Redispersible polymer powder was obtained as in Example 5-4 except that 225 g of a 10% aqueous solution of ferric sulfate were added instead of the 5% aqueous solution of sulfuric acid employed for obtaining the flocculate in Example 5-4.

Example 5-14

Redispersible polymer powder was obtained following the procedures of Example 5-4 except that a 45% aqueous solution of sulfuric acid was added after the temperature of the aqueous emulsion was raised to 70° C. Flocculate lumps so obtained were greater than those obtained in Example 5-4, so that the solid-liquid separation time by filtration was shortened to 1/10 and the workability was improved.

Example 5-15

Redispersible polymer powder was obtained following the procedures of Example 5-4 except that 225 g of a 10% aqueous solution of calcium chloride were added instead of the 45% aqueous solution of aluminum sulfate used for obtaining the flocculate in Example 5-4.

Example 5-16

Redispersible polymer powder was obtained following the procedures of Example 5-15 except that the pH of the aqueous emulsion was adjusted to 4 with sulfuric acid before the addition of a metal salt and 225 g of a 10% aqueous solution of calcium chloride were added as the metal salt. Flocculate lumps so obtained were greater than those obtained in Example 5-15, so that the solid-liquid separation time by filtration was shortened to 1/3 and the workability was improved.

Example 5-17

Redispersible polymer powder was obtained as in Example 5-4 except that the amount of the 45% aqueous solution of aluminum sulfate was changed to 6.5 g.

Example 5-18

Redispersible polymer powder was obtained as in Example 5-4 except that a flocculate was repeatedly washed with sufficient amounts of purified water upon its collection by filtration.

The redispersible polymer powder and that of Example 5-4 were separately added to portions of a 1% aqueous solution of sodium hydroxide to obtain redispersions. Those redispersions were coated on glass plates and were then dried at room temperature for 3 days, so that films were obtained. Those films were immersed in water for a day and the percent water absorptions of the films were measured. The film formed from the redispersible polymer powder of Example 5-18 was lower in percent water absorption and was superior in waterproofness.

Comparative Examples 5-1 to 5-3

The aqueous emulsions (A-1) to (A-3) were each diluted to 10% resin content with purified water and 50 g of a 45% aqueous solution of aluminum sulfate was then added at room temperature to 1,000 g of the thus-diluted emulsion. Each of the aqueous emulsions formed a flocculate. The flocculate was subjected to solid-liquid separation by filtration and was then dried at 80° C. until its residual water content dropped to 2% or lower. The flocculates so dried were however all soft so that their crushing was impossible. Evaluations of redispersibility was therefore conducted without crushing.

Comparative Example 5-4

The aqueous emulsions (C-1) to (C-12) were separately subjected to spray drying at an inlet air temperature of 120° C. and an outlet air temperature of 60° C., whereby redispersible polymer powders were obtained. All the aqueous emulsions formed a great deal of deposit on an inner wall of a drying tower. Each redispersible polymer powder had a yield of 30% or lower and was also substantially inferior in redispersibility.

Comparative Example 5-5

It was attempted to obtain redispersible polymer powder as in Example 5-4 except that the amount of the 45% aqueous solution of aluminum sulfate was changed to 0.01 g. No flocculate was however formed.

Evaluation Example 5-1

Yields were calculated and ranked as in Evaluation Example 1-1.

Evaluation Example 5-2

From the redispersible polymer powders, redispersions were prepared as in Evaluation Example 1-2.

However, the redispersible polymers of Comparative Examples 5-1 to 5-3 were all so soft that their crushing was impossible. Redispersions were prepared from them in a manner similar to the above-mentioned manner except that they were not crushed.

Further, the redispersible polymer obtained by spray drying in Comparative Example 5-4 had already been in the form of powder, so that it was sifted through a 16-mesh (1 mm) sieve. Using powder of a particle size of 1 mm and smaller, a redispersion was prepared in the same manner as described above and was evaluated as described in Evaluation Example 4-2.

Evaluation Example 5-3

The redispersible polymer powders were tested as in Evaluation Example 1-3.

However, the redispersible polymer obtained by spray drying in Comparative Example 5-4 had already been in the form of powder so that powder, which was obtained by classifying the polymer to give a plus-sieve residue of 5% or less on an 80-mesh (200-μm) sieve, was tested in the same manner as described above.

The compositions of the aqueous emulsions prepared in Step 1 and employed in the above Examples and Comparative Examples are shown in Table 5-1, the compositions of the aqueous emulsions prepared in Step 2 and employed in the above Examples and Comparative Examples are presented in Table 5-2 and Table 5-3, and the compositions and evaluation results of the redispersible polymer powders obtained in the above Examples and Comparative Examples are summarized in Table 5-4 to Table 5-15.

6. Examples directed to the flocculation of a mixture of an aqueous emulsion and a protective colloid with a metal salt (a system making use of an amido-containing ethylenically unsaturated monomer).

Example 6-1

(i) Aqueous Emulsion Preparation Step

An aqueous emulsion (A-1) was prepared by the following procedures.

In a reaction vessel equipped with a stirrer, a reflux condenser and a thermometer, 785 g of purified water and 3 g of sodium dodecylbenzenesulfonate (abbreviated as "DBS") were charged, followed by the addition of 5 g of potassium persulfate at 80° C. under stirring in a nitrogen gas atmosphere. On the side, an emulsion of the below-described composition was prepared. The emulsion was added dropwise to the above aqueous solution at 80° C. over 3 hours, followed by maintenance at the same temperature for 3 hours.

| | |
|---|---:|
| Purified water | 400 g |
| DBS | 1 g |
| Styrene | 400 g |
| n-Butyl acrylate | 500 g |
| 2-Hydroxyethyl methacrylate | 50 g |
| Methacrylic acid | 30 g |
| Acrylamide | 20 g |
| n-Dodecylmercaptan | 1 g |

Aqueous ammonia and purified water were added to the resultant aqueous emulsion to adjust its pH and resin content to 9 and 45%, respectively. This aqueous emulsion will be designated "(A-1)".

(ii) Protective Colloid Preparation Step

A protective colloid (a1) was prepared by the following procedures.

In a reaction vessel equipped with a stirrer, a reflux condenser and a thermometer, 850 g of purified water and 100.0 g of methacrylamide were charged. The contents were heated to 75° C. under stirring in a nitrogen gas atmosphere and were maintained at the same temperature. After the methacrylamide was completely dissolved, 30.0 g of a 5% aqueous solution of ammonium persulfate were added and the resultant mixture was maintained at 75° C. for 7 hours.

Aqueous ammonia and purified water were then added, whereby a protective colloid (B-1) of 10% resin content and pH 9 was obtained.
(iii) Mixing Step The aqueous emulsion (A-1) and the protective colloid (B-1) were mixed and stirred to give a solid ratio of 50/50.
(iv) Flocculate Forming Step When the mixture of the aqueous emulsion (A-1) an the protective colloid (B-1), which had been formed in the mixing step, was diluted to 10% resin content with purified water and 50 g of a 45% aqueous solution of aluminum sulfate were then added at room temperature to 1,000 g of the thus-diluted mixture, a flocculate was formed. The flocculate was subjected to solid-liquid separation by filtration, and was then dried at 80° C. until the residual water content dropped to 2% or less. The thus-dried flocculate was crushed, whereby redispersible polymer powder was obtained.

Examples 6-2 to 6-8
(1) Aqueous Emulsion Preparation Step
i) Preparation of Aqueous Emulsion (A-1)

As in Example 6-1, an aqueous emulsion (A-1) was prepared.
ii) Preparation of Aqueous Emulsion (A-2)

In the same manner as the preparation process of the aqueous emulsion (A-1) shown in Example 6-1, an aqueous emulsion (A-2) of pH 9 and 45% resin content was obtained in accordance with its corresponding monomer composition shown in Table 6-1.
iii) Preparation of Aqueous Emulsion (A-3)

In an autoclave equipped with a stirrer, 790 g of purified water, 2 g of sodium lauryl sulfate and 1 g of sodium hydrogencarbonate were charged, followed by the addition of 10 g of potassium persulfate at 70° C. under stirring in a nitrogen gas atmosphere to prepare an aqueous solution. On the side, an emulsion of the below-described composition was prepared. The emulsion was added dropwise to the above aqueous solution over 6 hours, followed by aging.

| | |
|---|---:|
| Purified water | 400 g |
| Sodium lauryl sulfate | 3 g |
| Styrene | 280 g |
| Butadiene | 700 g |
| Acrylic acid | 20 g |
| t-Dodecylmercaptan | 3 g |

Aqueous ammonia and purified water were added to the thus-obtained SBR latex, whereby an aqueous emulsion (A-3) of pH 9 and 45% solid content was prepared.
(2) Protective Colloid Preparation Step Protective colloids (B-2 to B-8) were prepared following the procedures of Example 6-1.
(3) Mixing Step The protective colloids (B-2 to B-8) were each mixed and stirred with the aqueous emulsion (A-1) to give a solid ratio of 50/50.
(4) Flocculate Forming Step Following the procedures of Example 6-1, redispersible polymer powders were obtained.

Example 6-9

After the aqueous emulsion (A-1) and the protective colloid (B-1) were mixed and stirred to give a solid ratio of 70/30, the procedures of Example 6-1 were followed so that redispersible polymer powder was obtained.

Example 6-10

Redispersible polymer powder was obtained as in Example 6-4 except that 225 g of a 10% aqueous solution of ferric sulfate were added in place of the 45% aqueous solution of aluminum sulfate employed for obtaining the flocculate in Example 6-4.

Example 6-11

Redispersible polymer powder was obtained following the procedures of Example 6-4 except that the 45% aqueous solution of aluminum sulfate was added after the temperature of the mixture of the aqueous emulsion and the protective colloid was raised to 70° C. Flocculate lumps so obtained were greater than those obtained in Example 6-4, so that the solid-liquid separation time by filtration was shortened to 1/10 and the workability was improved.

Example 6-12

Redispersible polymer powder was obtained following the procedures of Example 6-4 except that 225 g of a 10% aqueous solution of calcium chloride were added in place of the 45% aqueous solution of aluminum sulfate employed for obtaining the flocculate in Example 6-4.

Example 6-13

Redispersible polymer powder was obtained following the procedures of Example 6-12 except that the pH of the mixture of the aqueous emulsion and the protective colloid was adjusted to 4 with sulfuric acid before the addition of a metal salt and 225 g of a 10% aqueous solution of calcium chloride were added as the metal salt. Flocculate lumps so obtained were greater than those obtained in Example 6-12, so that the solid-liquid separation time by filtration was shortened to 1/3 and the workability was improved.

Example 6-14

Redispersible polymer powder was obtained as in Example 6-4 except that the amount of the 45% aqueous solution of aluminum sulfate was changed to 6.5 g.

Example 6-15

Redispersible polymer powder was obtained as in Example 6-4 except that a flocculate was repeatedly washed with sufficient amounts of purified water upon its collection by filtration.

The redispersible polymer powder and that of Example 6-4 were separately added to portions of a 1% aqueous solution of sodium hydroxide to obtain redispersions. Those redispersions were coated on glass plates and were then dried at room temperature for 3 days, so that films were obtained. Those films were immersed in water for a day and their percent water absorptions were measured. The film formed from the redispersible polymer powder of Example 6-15 was lower in percent water absorption and was superior in waterproofness.

Example 6-16

After the aqueous emulsion (A-2) and the protective colloid (B-1) were mixed and stirred to give a solid ratio of 50/50, the procedures of Example 6-1 were followed so that redispersible polymer powder was obtained.

Example 6-17

After the aqueous emulsion (A-2) and the protective colloid (B-4) were mixed and stirred to give a solid ratio of 50/50, the procedures of Example 6-1 were followed so that redispersible polymer powder was obtained.

Example 6-18

After the aqueous emulsion (A-3) and the protective colloid (B-1) were mixed and stirred to give a solid ratio of 50/50, the procedures of Example 6-1 were followed so that redispersible polymer powder was obtained.

Comparative Examples 6-1 to 6-3

The aqueous emulsions (A-1) to (A-3) were each diluted to 10% resin content with purified water and 50 g of a 45% aqueous solution of aluminum sulfate was then added at room temperature to 1,000 g of the thus-diluted emulsion. Each of the aqueous emulsions formed a flocculate. The flocculate was subjected to solid-liquid separation by filtration and was then dried at 80° C. until its residual water content dropped to 2% or lower. The flocculates so dried were however all soft so that their crushing was impossible. Evaluations of redispersibility was therefore conducted without crushing.

Comparative Example 6-4

Mixtures of the aqueous emulsions and the protective colloids, said mixtures having been prepared in Examples 6-1 to 6-9 and 6-16 to 6-18, were separately subjected to spray drying at an inlet air temperature of 120° C. and an outlet air temperature of 60° C. instead of subjecting them to flocculation with any metal salt, whereby redispersible polymer powders were obtained.

All the mixtures formed a great deal of deposit on an inner wall of a drying tower. Each redispersible polymer powder had a yield of 30% or lower and was also substantially inferior in redispersibility.

Comparative Example 6-5

It was attempted to obtain redispersible polymer powder as in Example 6-4 except that the amount of the 45% aqueous solution of aluminum sulfate was changed to 0.01 g. No flocculate was however formed.

Evaluation Example 6-1

Yields were calculated and ranked as in Evaluation Example 1-1.

Evaluation Example 6-2

The redispersible polymer powders were evaluated as in Evaluation Example 1-2.

Evaluation Example 6-3

As in Evaluation Example 1-3, redispersible polymer powders were mixed in cement and the resulting cement mixes were tested.

However, the redispersible polymer obtained by spray drying in Comparative Example 6-4 had already been in the form of powder so that powder, which was obtained by classifying the polymer to give a plus-sieve residue of 5% or less on an 80-mesh (200-$\mu$m) sieve, was tested in the same manner as described above.

The compositions of the aqueous emulsions employed in the above Examples and Comparative Examples are shown in Table 6-1, the compositions of the protective colloids employed in the above Examples and Comparative Examples are presented in Table 6-2, and the compositions and evaluation results of the redispersible polymer powders obtained in the above Examples and Comparative Examples are summarized in Table 6-3 to Table 6-14.

7. Examples directed to the flocculation of an aqueous emulsion, which had been prepared by protective colloidal polymerization, with a metal salt (a system making use of a hydroxyl-containing ethylenically unsaturated monomer).

Example 7-1

(1) Step 1 (Aqueous Emulsion Preparation Step)
Preparation of Protective Colloid (a1)

In a reaction vessel equipped with a stirrer, a reflux condenser and a thermometer, 700.0 g of a 1.5% aqueous solution of sodium hydroxide, 90.0 g of 2-hydroxyethyl methacrylate and 10.0 g of methacrylic acid were charged. Under stirring in a nitrogen gas atmosphere, the contents were heated to 40° C. When this temperature remained unchanged, 10.0 g of potassium persulfate were added. After the potassium persulfate was completely dissolved, 25.6 g of a 15% aqueous solution of sodium hydrogensulfite were added further as a reducing agent and the resultant mixture was maintained at 40° C. for 6 hours to prepare an aqueous solution.

| | |
|---|---|
| 1.5% Aq. soln. of NaOH | 700.0 g |
| 2-Hydroxyethyl methacrylate | 90.0 g |
| Methacrylic acid | 10.0 g |
| Potassium persulfate | 10.0 g |
| 15% Aq. soln. of NaHSO$_3$ | 25.6 g |

A colloid (B-1) of 15% resin content and pH 9 was obtained.

Protective Colloid Polymerization

In a reaction vessel equipped with a stirrer, a reflux condenser and a thermometer, 666.7 g of the protective colloid (B-1) were charged, followed by the addition of 0.5 g of potassium persulfate at 80° C. under stirring in a nitrogen gas atmosphere. On the side, an emulsion of the below-described composition was prepared. The emulsion was added dropwise to the above protective colloid at 80° C. over 3 hours, and the resultant mixture was maintained at the same temperature for 3 hours.

| | |
|---|---|
| Purified water | 40.0 g |
| Sodium dodecylbenzenesulfonate | 0.1 g |
| Styrene | 50.0 g |
| n-Butyl acrylate | 40.0 g |
| 2-Hydroxyethyl methacrylate | 5.0 g |
| Methacrylic acid | 3.0 g |
| Acrylamide | 2.0 g |
| n-Dodecylmercaptan | 0.1 g |

Aqueous ammonia and purified water were added to the resultant polymer, whereby an aqueous emulsion (C-1) of 10% resin content and pH 9 was prepared. The particle size of this aqueous emulsion (C-1) was 0.18 $\mu$m.

(2) Step 2 (Flocculate Forming Step)

When 50 g of a 45% aqueous solution of aluminum sulfate were added at room temperature to 1,000 g of (C-1), a flocculate was formed. The flocculate was subjected to solid-liquid separation by filtration, and was then dried at 80° C. until the residual water content dropped to 2% or less [note: The residual water content was measured by the measuring method of weight loss on heating prescribed under JIS K5407.5. Each residual water content will hereinafter mean a value measured by this method). The thus-dried flocculate was crushed and sifted through a 50-mesh (300-μm) sieve, whereby redispersible polymer powder of 300 μm and smaller in particle size was obtained. Its bulk specific gravity was 670 g/l.

Examples 7-2 to 7-7

(1) Step 1 (Aqueous Emulsion Preparation Step)
Preparation of Protective Colloid (a1)

Following the procedures of Example 7-1, protective colloids (B-2) to (B-7) were prepared in accordance with their corresponding compositions shown in Table 7-1.

Protective Colloid Polymerization

Aqueous emulsions (C-2) to (C-7) were obtained following the procedures of Example 7-1 except that the protective colloid (B-1) in Example 7-1 was replaced by the protective colloids (B-2) to (B-7), respectively.

(2) Step 2 (Flocculate Forming Step)

Redispersible polymer powders were obtained following the procedures of Example 7-1 except that the aqueous emulsion (C-1) in Example 7-1 was replaced by the aqueous emulsions (C-2) to (C-7).

Example 7-8

In a reaction vessel equipped with a stirrer, a reflux condenser and a thermometer, 400.0 g of the protective colloid (B-2) and 210 g of purified water were charged, followed by the addition of 0.7 g of potassium persulfate at 80° C. under stirring in a nitrogen gas atmosphere. On the side, an emulsion of the below-described composition was prepared. The emulsion was added dropwise to the above aqueous solution over 3 hours, followed by aging for 3 hours.

| | |
|---|---|
| Purified water | 56.0 g |
| Sodium dodecylbenzenesulfonate | 0.14 g |
| Styrene | 70.0 g |
| n-Butyl acrylate | 56.0 g |
| 2-Hydroxyethyl methacrylate | 7.0 g |
| Methacrylic acid | 4.2 g |
| Acrylamide | 2.8 g |
| n-Dodecylmercaptan | 0.14 g |

Aqueous ammonia and purified water were added to the resultant polymer, whereby an aqueous emulsion (C-8) of 10% resin content and pH 9 was prepared.

When 50 g of a 45% aqueous solution of aluminum sulfate were added at room temperature to 1,000 g of (C-8), a flocculate was formed. The flocculate was subjected to solid-liquid separation by filtration, and was then dried at 80° C. until the residual water content dropped to 2% or less. The thus-dried flocculate was crushed, whereby redispersible polymer powder was obtained.

Example 7-9

Redispersible polymer powder was obtained as in Example 7-2 except that 225 g of a 10% aqueous solution of ferric sulfate were added in place of the 45% aqueous solution of aluminum sulfate employed for obtaining the flocculate in Example 7-2.

Example 7-10

Redispersible polymer powder was obtained following the procedures of Example 7-2 except that the 45% aqueous solution of aluminum sulfate was added after the temperature of the aqueous emulsion was raised to 70° C. Flocculate lumps so obtained were greater than those obtained in Example 7-2, so that the solid-liquid separation time by filtration was shortened to 1/10 and the workability was improved.

Example 7-11

Redispersible polymer powder was obtained following the procedures of Example 7-2 except that 225 g of a 10% aqueous solution of calcium chloride were added in place of the 45% aqueous solution of aluminum sulfate employed for obtaining the flocculate in Example 7-2.

Example 7-12

Redispersible polymer powder was obtained following the procedures of Example 7-11 except that the pH of the aqueous emulsion was adjusted to 4 with sulfuric acid before the addition of a metal salt and 225 g of a 10% aqueous solution of calcium chloride were added as the metal salt. Flocculate lumps so obtained were greater than those obtained in Example 7-11, so that the solid-liquid separation time by filtration was shortened to 1/3 and the workability was improved.

Example 7-13

Redispersible polymer powder was obtained as in Example 7-2 except that the amount of the 45% aqueous solution of aluminum sulfate was changed to 6.5 g.

Example 7-14

Redispersible polymer powder was obtained as in Example 7-2 except that a flocculate was repeatedly washed with sufficient amounts of purified water upon its collection by filtration.

The redispersible polymer powder and that of Example 7-2 were separately added to portions of a 1% aqueous solution of sodium hydroxide to obtain redispersions. Those redispersions were coated on glass plates and were then dried at room temperature for 3 days, so that films were obtained. Those films were immersed in water for a day and their percent water absorptions were measured. The film formed from the redispersible polymer powder of Example 7-14 was lower in percent water absorption and was superior in waterproofness.

Example 7-15

Following the procedures of Example 7-1 except that the emulsion employed there was modified as will be described below, an aqueous emulsion (C-9) was obtained and from the aqueous emulsion, redispersible polymer powder was obtained.

| | |
|---|---|
| Purified water | 40.0 g |
| Sodium dodecylbenzenesulfonate | 0.1 g |
| Methyl methacrylate | 30.0 g |
| Butyl acrylate | 60.0 g |
| 2-Hydroxyethyl methacrylate | 5.0 g |
| Methacrylic acid | 3.0 g |
| Acrylamide | 2.0 g |
| n-Dodecylmercaptan | 0.1 g |

Example 7-16

Following the procedures of Example 7-15 except that the protective colloid (B-1) was changed to the protective colloid (B-2), an aqueous emulsion (C-10) was obtained and from the aqueous emulsion, redispersible polymer powder was obtained.

Example 7-17

In an autoclave equipped with a stirrer, 666.7 g of the protective colloid (B-2) were charged, followed by the addition of 1.0 g of potassium persulfate at 700° C. under stirring in a nitrogen gas atmosphere. On the side, an emulsion of the below-described composition was prepared. The emulsion was added dropwise to the above aqueous solution over 6 hours, followed by aging.

| Purified water | 40.0 g |
|---|---|
| Sodium lauryl sulfate | 0.3 g |
| Styrene | 28.0 g |
| Butadiene | 70.0 g |
| Acrylic acid | 2.0 g |
| t-Dodecylmercaptan | 0.3 g |

Aqueous ammonia and purified water were added to the resultant polymer, whereby an aqueous emulsion (C-11) of 10% solid content and pH 9 was prepared.

When 50 g of a 45% aqueous solution of aluminum sulfate were added at room temperature to 1,000 g of (C-11), a flocculate was formed. The flocculate was subjected to solid-liquid separation by filtration, and was then dried at 80° C. until the residual water content dropped to 2% or less. The thus-dried flocculate was crushed, whereby redispersible polymer powder was obtained.

Comparative Example 7-1

Following the procedures of Example 7-2 except that the protective colloid (B-2) was replaced by 650.0 g of purified water, an aqueous emulsion polymer (C-12) free of the protective colloid (B-2) was obtained. It was then attempted to obtain redispersible polymer powder from the aqueous emulsion polymer. However, a flocculate obtained after drying was so soft that its crushing was impossible. Evaluation of its redispersibility was therefore conducted without crushing.

Comparative Example 7-2

Following the procedures of Example 7-2 except that the protective colloid (B-2) employed in Example 7-13 was replaced by 650.0 g of purified water, an aqueous emulsion polymer (C-13) free of the protective colloid (B-2) was obtained. It was then attempted to obtain redispersible polymer powder from the aqueous emulsion polymer. However, a flocculate obtained after drying was so soft that its crushing was impossible. Evaluation of its redispersibility was therefore conducted without crushing.

Comparative Example 7-3

Following the procedures of Example 7-16 except that the protective colloid (B-2) employed in Example 7-14 was replaced by 650.0 g of purified water, an aqueous emulsion polymer (C-14) free of the protective colloid (B-2) was obtained. It was then attempted to obtain redispersible polymer powder from the aqueous emulsion polymer. However, a flocculate obtained after drying was so soft that its crushing was impossible. Evaluation of its redispersibility was therefore conducted without crushing.

Comparative Example 7-4

The aqueous emulsions (C-1) to (C-11) were separately subjected to spray drying at an inlet air temperature of 120° C. and an outlet air temperature of 60° C. instead of subjecting them to flocculation with any metal salt, whereby redispersible polymer powders were obtained. All the mixtures formed a great deal of deposit on an inner wall of a drying tower. Each redispersible polymer powder had a yield of 30% or lower and was also substantially inferior in redispersibility.

Comparative Example 7-5

It was attempted to obtain redispersible polymer powder as in Example 7-2 except that the amount of the 45% aqueous solution of aluminum sulfate was changed to 0.01 g. No flocculate was however formed.

Evaluation Example 7-1

The weights of the solid contents of the aqueous emulsions were measured as in Evaluation Example 1-1.

Evaluation Example 7-2

The redispersible polymer powders were evaluated as in Evaluation Example 1-2.

Evaluation Example 7-3

As in Evaluation Example 1-3, the redispersible polymer powders were mixed in cement and the resulting cement mixes were tested.

However, the redispersible polymer obtained by spray drying in Comparative Example 7-4 had already been in the form of powder so that powder, which was obtained by classifying the polymer to give a plus-sieve residue of 5% or less on an 80-mesh (200-$\mu$m) sieve, was tested in the same manner as described above.

Evaluation Example 7-4

The polymer powder obtained in Example 7-4 was mixed with Portland cement and water in accordance with the below-described composition. The resulting concrete was aged at 20° C. and 80% R.H. (relative humidity), whereby its smell and hardening were evaluated.

| <Composition> | |
|---|---|
| Portland cement | 1,000 g |
| Redispersible polymer powder | 100 g |
| Water | 500 g |

Evaluation

Smell: one day later, the existence or non-existence of ammonia smell was determined.

Hardening: By the setting test prescribed under JIS R5201, it was determined whether setting had been completed or not after one-day aging.

Results

Smell: Not sensed.

Hardening: Setting had been completed.

Evaluation Example 7-5

Evaluation of Redispersibility under the Assumption of Emulsification in Cement

Evaluation of redispersibility was conducted by the following method.

1. Cement (100 g) and water (500 g) were mixed for 1 minute and then filtered through filter paper ("Qualitative Filter Paper No. 1", trade name; product of Advantec Toyo Kaisha, Ltd.), whereby a filtrate was obtained.

2. In a 100-ml Erlenmeyer flask, 94 g of the filtrate were sampled, with which 3 g of calcium hydroxide (powder) were mixed.

3. The above mixture was added with 3 g of resin powder of 300 μm and smaller in diameter which had been crushed and sifted.

4. Three minutes later, the resultant mixture was filtered through filter paper ("Qualitative Filter Paper No. 1", trade name; product of Advantec Toyo Kaisha, Ltd.), whereby a filtrate was obtained. The non-volatile content of the filtrate was measured in accordance with the method prescribed under JIS K5407.4 This non-volatile content will be designated "N1 (wt. %)".

5. The mixture prepared above in step 2 was filtered as in step 4 and the non-volatile content of the filtrate was measured. This non-volatile content will be designated "N2 (wt. %)".

6. Redispersibility (%) was measured by the following formula:

Redispersibility (%)
under the assumption of = {(N1 − N2)/3} × 100
emulsification in cement The above redispersibility (%) of the polymer powder obtained in Example 7-2 was 40% or higher and was hence good. On the other hand, the redispersibility of the polymer powder obtained by spray drying the polymer of Example 7-2 was 15% or lower and was hence poor.

The compositions of the protective colloids employed in the above Examples and Comparative Examples are shown in Table 7-1, the compositions of the aqueous emulsions employed in the above Examples and Comparative Examples are presented in Table 7-2 and Table 7-3, and the compositions and evaluation results of the redispersible polymer powders obtained in the above Examples and Comparative Examples are summarized in Table 7-4 to Table 7-5.

8. Examples directed to the flocculation of an aqueous emulsion, which had been prepared by core/shell polymerization, with an acid (a system making use of a hydroxyl-containing ethylenically unsaturated monomer).

Example 8-1

(i) Step 1 (Core Particle Polymerization Step—Preparation of Aqueous Emulsion)

In a reaction vessel equipped with a stirrer, a reflux condenser and a thermometer, 785 g of purified water and 3 g of sodium dodecylbenzenesulfonate (abbreviated as "DBS") were charged, followed by the addition of 5 g of potassium persulfate at 80° C. under stirring in a nitrogen gas atmosphere. On the side, an emulsion of the below-described composition was prepared. The emulsion was added dropwise to the above aqueous solution at 80° C. over 3 hours, followed by maintenance at the same temperature for 3 hours.

| | |
|---|---|
| Purified water | 400 g |
| DBS | 1 g |
| Styrene | 500 g |
| n-Butyl acrylate | 400 g |
| 2-Hydroxyethyl methacrylate | 50 g |
| Methacrylic acid | 30 g |

-continued

| | |
|---|---|
| Acryiamide | 20 g |
| n-Dodecylmercaptan | 1 g |

Aqueous ammonia and purified water were added to the resultant aqueous emulsion to adjust its pH and resin content to 9 and 45%, respectively. This aqueous emulsion will be designated "(A-1)". The particle size of the aqueous emulsion (A-1) was 0.11 μm.

(ii) Step 2 (Shell Polymerization Step)

In a reaction vessel equipped with a stirrer, a reflux condenser and a thermometer, 725.0 g of purified water, 90.0 g of 2-hydroxyethyl methacrylate and 10.0 g of methacrylic acid were charged. The contents were adjusted to pH 9.5 with sodium hydroxide. The contents were then heated to 40° C. under stirring in a nitrogen gas atmosphere and were maintained at the same temperature. Potassium persulfate (10.0 g) was added. Subsequent to dissolution of potassium persulfate, 38.4 g of an 10% aqueous solution of sodium hydrogensulfite were added further and the resulting mixture was maintained at 40° C. for 6 hours.

| | |
|---|---|
| Aqueous emulsion polymer (A-1) | 222.2 g |
| Purified water | 725.0 g |
| 2-Hydroxyethyl methacrylate | 90.0 g |
| Methacrylic acid | 10.0 g |
| Sodium hydroxide | 6.6 g |
| Potassium persulfate | 10.0 g |
| 10% Aq. soln. of NaHSO₃ | 38.4 g |

As a result, an aqueous emulsion of 20% resin content and pH 8 was obtained. This aqueous emulsion will be designated "(C-1)". The particle size of this aqueous emulsion (C-1) was 0.13 μm.

(iii) Step 3 (Flocculate Forming Step)

When the aqueous emulsion (C-1) was diluted to 10% resin content with purified water and 50 g of a 45% aqueous solution of aluminum sulfate were then added at room temperature to 1,000 g of the thus-diluted aqueous emulsion, a flocculate was formed. The flocculate was subjected to solid-liquid separation by filtration, and was then dried at 80° C. until the residual water content dropped to 2% or less. The thus-dried flocculate was crushed, whereby redispersible polymer powder was obtained. The thus-dried flocculate was crushed and sifted through a 50-mesh (300-μm) sieve, whereby redispersible polymer powder of 300 μm and smaller in particle size was obtained. Its bulk specific gravity was 640 g/l.

Examples 8-2 to 8-11

(1) Step 1 (Core Particle Polymerization Step—Preparation of Aqueous Emulsion)

i) Preparation of Aqueous Emulsion (A-1)

Following the procedures of Example 8-1, an aqueous emulsion (A-1) was prepared.

ii) Preparation of Aqueous Emulsion (A-2)

Following the procedures of the preparation process of the aqueous emulsion (A-1) shown in Example 8-1, an aqueous emulsion (A-2) of pH 9 and 45% resin content was obtained in accordance with its corresponding monomer composition shown in Table 8-1.

iii) Preparation of Aqueous Emulsion (A-3)

In an autoclave equipped with a stirrer, an aqueous solution consisting of 790 g of purified water, 2 g of sodium lauryl sulfate and 1 g of sodium hydrogencarbonate was charged, followed by the addition of 10 g of potassium persulfate at 70° C. under stirring in a nitrogen gas atmosphere. On the side, an emulsion of the below-described composition was prepared. The emulsion was added dropwise to the above aqueous solution at 70° C. over 6 hours, followed by maintenance at the same temperature for 6 hours.

| | |
|---|---|
| Purified water | 400 g |
| Sodium lauryl sulfate | 3 g |
| Styrene | 280 g |
| Butadiene | 700 g |
| Acrylic acid | 20 g |
| t-Dodecylmercaptan | 3 g |

Aqueous ammonia and purified water were added to the thus-obtained SBR latex, whereby an aqueous emulsion (A-3) of pH 9 and 45% solid content was prepared.

(2) Step 2 (Shell Polymerization Step)

Following the procedures of Example 8-1, aqueous emulsions (C-2) to (C-11) were prepared in accordance with their corresponding compositions shown in Table 8-2 and Table 8-3.

(3) Step 3 (Flocculate Forming Step)

From the aqueous emulsions (C-2) to (C-12), redispersible polymer powders were obtained, respectively, following the procedures of Example 8-1.

Example 8-12

Redispersible polymer powder was obtained as in Example 8-2 except that 225 g of a 10% aqueous solution of ferric sulfate were added instead of the 5% aqueous solution of sulfuric acid employed for obtaining the flocculate in Example 8-2.

Example 8-13

Redispersible polymer powder was obtained following the procedures of Example 8-2 except that a 45% aqueous solution of sulfuric acid was added after the temperature of the aqueous emulsion was raised to 70° C. Flocculate lumps so obtained were greater than those obtained in Example 8-2, so that the solid-liquid separation time by filtration was shortened to $\frac{1}{10}$ and the workability was improved.

Example 8-14

Redispersible polymer powder was obtained following the procedures of Example 8-2 except that 225 g of a 10% aqueous solution of calcium chloride were added instead of the 45% aqueous solution of aluminum sulfate used for obtaining the flocculate in Example 8-2.

Example 8-15

Redispersible polymer powder was obtained following the procedures of Example 8-14 except that the pH of the aqueous emulsion was adjusted to 4 with sulfuric acid before the addition of a metal salt and 225 g of a 10% aqueous solution of calcium chloride were added as the metal salt. Flocculate lumps so obtained were greater than those obtained in Example 8-17, so that the solid-liquid separation time by filtration was shortened to $\frac{1}{3}$ and the workability was improved.

Example 8-16

Redispersible polymer powder was obtained as in Example 8-2 except that the amount of the 45% aqueous solution of aluminum sulfate was changed to 6.5 g.

Example 8-17

Redispersible polymer powder was obtained as in Example 8-2 except that a flocculate was repeatedly washed with sufficient amounts of purified water upon its collection by filtration.

The redispersible polymer powder and that of Example 8-2 were separately added to portions of a 1% aqueous solution of sodium hydroxide to obtain redispersions. Those redispersions were coated on glass plates and were then dried at room temperature for 3 days, so that films were obtained. Those films were immersed in water for a day and the percent water absorptions of the films were measured. The film formed from the redispersible polymer powder of Example 8-17 was lower in percent water absorption and was superior in waterproofness.

Comparative Examples 8-1 to 8-3

The aqueous emulsions (A-1) to (A-3) were each diluted to 10% resin content with purified water and 50 g of a 45% aqueous solution of aluminum sulfate was then added at room temperature to 1,000 g of the thus-diluted emulsion. Each of the aqueous emulsions formed a flocculate. The flocculate was subjected to solid-liquid separation by filtration and was then dried at 80° C. until its residual water content dropped to 2% or lower. The flocculates so dried were however all soft so that their crushing was impossible. Evaluations of redispersibility was therefore conducted without crushing.

Comparative Example 8-4

The aqueous emulsions (C-1) to (C-11) were separately subjected to spray drying at an inlet air temperature of 120° C. and an outlet air temperature of 60° C., whereby redispersible polymer powders were obtained. All the aqueous emulsions formed a great deal of deposit on an inner wall of a drying tower. Each redispersible polymer powder had a yield of 30% or lower and was also substantially inferior in redispersibility.

Comparative Example 8-5

It was attempted to obtain redispersible polymer powder as in Example 8-2 except that the amount of the 45% aqueous solution of aluminum sulfate was changed to 0.01 g. No flocculate was however formed.

Evaluation Example 8-1

Yields were calculated and ranked as in Evaluation Example 1-1.

Evaluation Example 8-2

The redispersible polymer powders were evaluated as in Evaluation Example 1-2.

Evaluation Example 8-3

As in Evaluation Example 1-3, the redispersible polymer powders were mixed in cement and the resulting cement mixes were tested.

However, the redispersible polymer obtained by spray drying in comparative Example 8-4 had already been in the form of powder so that powder, which was obtained by classifying the polymer to give a plus-sieve residue of 5% or less on an 80-mesh (200-$\mu$m) sieve, was tested in the same manner as described above.

Evaluation Example 8-4

With respect to the polymer powder obtained in Example 7-4, smell and hardening were determined.
Results
  Smell: Not sensed.
  Hardening: Setting had been completed.

Evaluation Example 8-5
Evaluation of Redispersibility under the Assumption of Emulsification in Cement Evaluation of redispersibility was conducted in the same manner as in Evaluation Example 7-5.

The above redispersibility (%) of the polymer powder obtained in Example 8-2 was 40% or higher and was hence good. On the other hand, the redispersibility of the polymer powder obtained by spray drying the polymer of Example 8-2 was 15% or lower and was hence poor.

The compositions of the protective colloids prepared in Step 1 and employed in the above Examples and Comparative Examples are shown in Table 8-1, the compositions of the aqueous emulsions prepared in Step 2 and employed in the above Examples and Comparative Examples are presented in Table 8-2 and Table 8-3, and the compositions and evaluation results of the redispersible polymer powders obtained in the above Examples and Comparative Examples are summarized in Table 8-4 to Table 8-15.

9. Examples directed to the flocculation of a mixture of an aqueous emulsion and a protective colloid with a metal salt (a system making use of a hydroxyl-containing ethylenically unsaturated monomer).

Example 9-1
(i) Aqueous Emulsion Preparation Step

An aqueous emulsion (A-1) was prepared by the following procedures.

In a reaction vessel equipped with a stirrer, a reflux condenser and a thermometer, 785 g of purified water and 3 g of sodium dodecylbenzenesulfonate (abbreviated as "DBS") were charged, followed by the addition of 5 g of potassium persulfate at 80° C. under stirring in a nitrogen gas atmosphere. On the side, an emulsion of the below-described composition was prepared. The emulsion was added dropwise to the above aqueous solution at 80° C. over 3 hours, followed by maintenance at the same temperature for 3 hours.

| | |
|---|---|
| Purified water | 400 g |
| DBS | 1 g |
| Styrene | 500 g |
| n-Butyl acrylate | 400 g |
| 2-Hydroxyethyl methacrylate | 50 g |
| Methacrylic acid | 30 g |
| Acrylamide | 20 g |
| n-Dodecylmercaptan | 1 g |

Aqueous ammonia and purified water were added to the resultant aqueous emulsion to adjust its pH and resin content to 9 and 45%, respectively. This aqueous emulsion will be designated "(A-1)". The particle size of the aqueous emulsion (A-1) was 0.11 µm.

(ii) Protective Colloid Preparation Step

A protective colloid (a1) was prepared by the following procedures.

In a reaction vessel equipped with a stirrer, a reflux condenser and a thermometer, 700.0 g of a 1.5% aqueous solution of sodium hydroxide, 90.0 g of 2-hydroxyethyl methacrylate and 10.0 g of methacrylic acid were charged. The contents were then heated to 40° C. under stirring in a nitrogen gas atmosphere and were maintained at the same temperature. Potassium persulfate (10.0 g) was added. Subsequent to dissolution of potassium persulfate, 25.6 g of an 15% aqueous solution of sodium hydrogensulfite were added further as a reducing agent and the resulting mixture was maintained at 40° C. for 6 hours.

| | |
|---|---|
| 1.5% Aq. soln. of NaOH | 700.0 g |
| 2-Hydroxyethyl methacrylate | 90.0 g |
| Methacrylic acid | 10.0 g |
| Potassium persulfate | 10.0 g |
| 15% Aq. soln. of NaHSO$_3$ | 25.6 g |

Purified water was added to the thus-obtained mixture, whereby a protective colloid (B-1) of 10% resin content and pH 5 was obtained.

(iii) Mixing Step

The aqueous emulsion (A-1) and the protective colloid (B-1) were mixed and stirred to give a solid ratio of 50/50.

(iv) Flocculate Forming Step

When the mixture of the aqueous emulsion (A-1) an the protective colloid (B-1), which had been formed in the mixing step, was diluted to 10% resin content with purified water and 50 g of a 45% aqueous solution of aluminum sulfate were then added at room temperature to 1,000 g of the thus-diluted mixture, a flocculate was formed. The flocculate was subjected to solid-liquid separation by filtration, and was then dried at 80° C. until the residual water content dropped to 2% or less. The thus-dried flocculate was crushed, whereby redispersible polymer powder was obtained.

The thus-dried flocculate was crushed and sifted through a 50-mesh (300-µm) sieve, whereby redispersible polymer powder of 300 µm and smaller in particle size was obtained. Its bulk specific gravity was 605 g/l.

Examples 9-2 to 9-7
(1) Aqueous Emulsion Preparation Step
i) Preparation of Aqueous Emulsion (A-1)

As in Example 9-1, an aqueous emulsion (A-1) was prepared.

ii) Preparation of Aqueous Emulsion (A-2)

In the same manner as the preparation process of the aqueous emulsion (A-1) shown in Example 9-1, an aqueous emulsion (A-2) of pH 9 and 45% resin content was obtained in accordance with its corresponding monomer composition shown in Table 9-1.

iii) Preparation of aqueous emulsion (A-3)

In an autoclave equipped with a stirrer, 790 g of purified water, 2 g of sodium laurylsulfate and 1 g of sodium hydrogencarbonate were charged, followed by the addition of 10 g of potassium persulfate at 70° C. under stirring in a nitrogen gas atmosphere to prepare an aqueous solution. On the side, an emulsion of the below-described composition was prepared. The emulsion was added dropwise to the above aqueous solution over 6 hours and was maintained at the same temperature for 6 hours.

| | |
|---|---|
| Purified water | 400 g |
| Sodium lauryl sulfate | 3 g |
| Styrene | 280 g |

|  |  |
| --- | --- |
| Butadiene | 700 g |
| Acrylic acid | 20 g |
| t-Dodecylmercaptan | 3 g |

Aqueous ammonia and purified water were added to the thus-obtained SBR latex, whereby an aqueous emulsion (A-3) of pH 9 and 45% solid content was prepared.
(2) Protective Colloid Preparation Step Protective colloids (B-2) to (B-7) were prepared following the procedures of Example 9-1.
(3) Mixing Step The protective colloids (B-2) to (B-8) were each mixed and stirred with the aqueous emulsion (A-1) to give a solid ratio of 50/50.
(4) Flocculate Forming Step Following the procedures of Example 9-1, redispersible polymer powders were obtained.

Example 9-8

After the aqueous emulsion (A-1) and the protective colloid (B-2) were mixed and stirred to give a solid ratio of 70/30, the procedures of Example 9-2 were followed so that redispersible polymer powder was obtained.

Example 9-9

Redispersible polymer powder was obtained as in Example 9-2 except that 225 g of a 10% aqueous solution of ferric sulfate were added in place of the 45% aqueous solution of aluminum sulfate employed for obtaining the flocculate in Example 9-2.

Example 9-10

Redispersible polymer powder was obtained following the procedures of Example 9-2 except that the 45% aqueous solution of aluminum sulfate was added after the temperature of the mixture of the aqueous emulsion and the protective colloid was raised to 70° C. Flocculate lumps so obtained were greater than those obtained in Example 9-2, so that the solid-liquid separation time by filtration was shortened to $\frac{1}{10}$ and the workability was improved.

Example 9-11

Redispersible polymer powder was obtained following the procedures of Example 9-2 except that 225 g of a 10% aqueous solution of calcium chloride were added in place of the 45% aqueous solution of aluminum sulfate employed for obtaining the flocculate in Example 9-2.

Example 6-12

Redispersible polymer powder was obtained following the procedures of Example 9-11 except that the pH of the mixture of the aqueous emulsion and the protective colloid was adjusted to 4 with sulfuric acid before the addition of a metal salt and 225 g of a 10% aqueous solution of calcium chloride were added as the metal salt. Flocculate lumps so obtained were greater than those obtained in Example 9-11, so that the solid-liquid separation time by filtration was shortened to $\frac{1}{3}$ and the workability was improved.

Example 9-13

Redispersible polymer powder was obtained as in Example 9-2 except that the amount of the 45% aqueous solution of aluminum sulfate was changed to 6.5 g.

Example 9-14

Redispersible polymer powder was obtained as in Example 9-2 except that a flocculate was repeatedly washed with sufficient amounts of purified water upon its collection by filtration.

The redispersible polymer powder and that of Example 9-2 were separately added to portions of a 1% aqueous solution of sodium hydroxide to obtain redispersions. Those redispersions were coated on glass plates and were then dried at room temperature for 3 days, so that films were obtained. Those films were immersed in water for a day. The film formed from the redispersible polymer powder of Example 9-14 was superior in waterproofness.

Example 9-15

After the aqueous emulsion (A-2) and the protective colloid (B-1) were mixed and stirred to give a solid ratio of 50/50, the procedures of Example 9-1 were followed so that redispersible polymer powder was obtained.

Example 9-16

After the aqueous emulsion (A-2) and the protective colloid (B-2) were mixed and stirred to give a solid ratio of 50/50, the procedures of Example 9-2 were followed so that redispersible polymer powder was obtained.

Example 9-17

After the aqueous emulsion (A-3) and the protective colloid (B-2) were mixed and stirred to give a solid ratio of 50/50, the procedures of Example 9-1 were followed so that redispersible polymer powder was obtained.

Comparative Examples 9-1 to 9-3

The aqueous emulsions (A-1) to (A-3) were each diluted to 10% resin content with purified water and 50 g of a 45% aqueous solution of aluminum sulfate was then added at room temperature to 1,000 g of the thus-diluted emulsion. Each of the aqueous emulsions formed a flocculate. The flocculate was subjected to solid-liquid separation by filtration and was then dried at 80° C. until its residual water content dropped to 2% or lower. The flocculates so dried were however all soft so that their crushing was impossible. Evaluations of redispersibility was therefore conducted without crushing.

Comparative Example 9-4

The mixtures of the aqueous emulsions and the protective colloids, said mixtures having been prepared in Examples 9-1 to 9-8 and 9-15 to 9-17, were separately subjected to spray drying at an inlet air temperature of 120° C. and an outlet air temperature of 60° C. instead of subjecting them to flocculation with any metal salt, whereby redispersible polymer powders were obtained.

All the mixtures formed a great deal of deposit on an inner wall of a drying tower. Each redispersible polymer powder had a yield of 30% or lower and was also substantially inferior in redispersibility.

Comparative Example 9-5

It was attempted to obtain redispersible polymer powder as in Example 9-2 except that the amount of the 45% aqueous solution of aluminum sulfate was changed to 0.01 g. No flocculate was however formed.

Evaluation Example 9-1

Yields were calculated and ranked as in Evaluation Example 1-1.

Evaluation Example 9-2

The redispersible polymer powders were evaluated as in Evaluation Example 1-2.

Evaluation Example 9-3

As in Evaluation Example 1-3, the redispersible polymer powders were mixed in cement and the resulting cement mixes were tested with respect to mixing time, workability, flexural strength and compression strength.

However, the redispersible polymer obtained by spray drying in Comparative Example 9-4 had already been in the form of powder so that powder, which was obtained by classifying the polymer to give a plus-sieve residue of 5% or less on an 80-mesh (200-$\mu$m) sieve, was tested in the same manner as described above.

Evaluation Example 9-4

With respect to the polymer powder obtained in Example 9-2, smell and hardening were determined in a similar manner as in Evaluation Example 7-4.
Results
Smell: Not sensed.
Hardening: Setting had been completed.

Evaluation Example 9-5

Evaluation of Redispersibility under the Assumption of Emulsification in Cement

Evaluation of redispersibility was conducted in the same manner as in Evaluation Example 7-5.

The above redispersibility (%) of the polymer powder obtained in Example 9-2 was 40% or higher and was hence good. On the other hand, the redispersibility of the polymer powder obtained by spray drying the polymer of Example 9-2 was 15% or lower and was hence poor.

The compositions of the aqueous emulsions employed in the above Examples and Comparative Examples are shown in Table 9-1, the compositions of the protective colloids employed in the above Examples and Comparative Examples are presented in Table 9-2, and the compositions and evaluation results of the redispersible polymer powders obtained in the above Examples and Comparative Examples are summarized in Table 9-3 to Table 9-14.

Advantages of the Invention

The present invention can provide a (co)polymer or (co)polymer powder having a function to be substantially redispersible in water of pH 5 or higher.

When the (co)polymer or (co)polymer powder is used as a hydraulic cement modifier, the resulting mixed mortar or concrete shows good trowelability and provides a hardened mortar or concrete having excellent flexural strength and compression strength.

The redispersible polymer according to the present invention is characterized in that it requires no It is hence not required to add fine inorganic powder. The redispersible polymer according to the present invention is therefore also characterized in that it does not cause increases in water absorption properties and flow value, uneven suspension of fine powder and other problems, all of which would be unavoidable if fine inorganic powder were added, and can reduce the water/cement ratio.

As the addition of fine inorganic powder is not required, resulting cement products do not have high water absorption properties.

The redispersible polymer according to the present invention is advantageous over conventional aqueous emulsions at least for the following reasons:

(1) It is possible to reduce the cost and energy required for piping, transportation or storage.

(2) As no large liquid containers are needed, the packaging cost can be reduced.

(3) As no large liquid containers are needed, industrial waste materials can be reduced in volume.

(4) When formed into a premixed one-package product, practically no measuring operation is needed at a construction site, thereby achieving substantial labor saving.

(5) When formed into a premixed one-package product, its mixing with water makes it possible to prepare a desired mortar or concrete in a single step, thereby achieving significant labor saving.

(6) When formed into a premixed one-package product, its components have already been accurately proportioned so that the quality control of a mortar or concrete at the time of construction can be facilitated.

A redispersible polymer produced by the conventional art making use of conventional spray drying is disadvantageous at least for the following reasons:

(1) Particles are prone to thermal cohesion so that the redispersibility is not fully satisfactory.

(2) Conventional spray drying requires large facilities and consumes a great deal of energy, so that it is disadvantageous in cost.

Such problems have been solved by the present invention.

When employed as a cement modifier, the redispersible polymer according to the present invention can impart high tensile strength, flexural strength, compression strength, bonding strength, wear resistance an the like.

Owing to the characteristic feature of the redispersible polymer according to the present invention that it does not absolutely require an anti-binding agent (for example, fine inorganic powder, fine organic powder having no film-forming properties, or the like), it can be used in a wide variety of fields where aqueous emulsions are generally employed, including, for example, construction materials, papermaking chemicals, paints, adhesives, fiber finishes and the like as applications other than cement modifiers.

TABLE 1-1

Compositions of protective colloids

| | B-1 | B-2 | B-3 | B-4 | B-5 | B-6 | B-7 | B-8 |
|---|---|---|---|---|---|---|---|---|
| MAm | 100.0 | 99.5 | 99.0 | 97.5 | 80.0 | 80.0 | 30.0 | 50.0 |
| AAm | — | — | — | — | — | — | 20.0 | — |
| HEMA | — | — | — | — | 17.5 | — | 25.0 | 30.0 |
| HEA | — | — | — | — | — | 17.5 | 25.0 | 20.0 |
| MAc | — | 0.5 | 1.0 | 2.5 | 2.5 | 2.5 | — | — |
| Tg (° C.) | 256 | 256 | 255 | 254 | 162 | 204 | 80 | 82 |

TABLE 1-2

Compositions of aqueous emulsions (1)

| | C-1 | C-2 | C-3 | C-4 | C-5 |
|---|---|---|---|---|---|
| Protective colloid (a1) | B-1 100.0 | B-2 100.0 | B-3 100.0 | B-4 100.0 | B-5 100.0 |
| Monomer (a2) | | | | | |
| ST | 40.0 | 40.0 | 40.0 | 40.0 | 40.0 |
| BA | 50.0 | 50.0 | 50.0 | 50.0 | 50.0 |
| HEMA | 5.0 | 5.0 | 5.0 | 5.0 | 5.0 |

TABLE 1-2-continued

Compositions of aqueous emulsions (1)

|  | C-1 | C-2 | C-3 | C-4 | C-5 |
|---|---|---|---|---|---|
| MAc | 3.0 | 3.0 | 3.0 | 3.0 | 3.0 |
| AAm | 2.0 | 2.0 | 2.0 | 2.0 | 2.0 |
| n-DM | 0.1 | 0.1 | 0.1 | 0.1 | 0.1 |
| Tg of (a2) (° C.) | 5 | 5 | 5 | 5 | 5 |
| (a2)/(a1) ratio | 50/50 | 50/50 | 50/50 | 50/50 | 50/50 |

TABLE 1-3

Compositions of aqueous emulsions (2)

|  | C-6 | C-7 | C-8 | C-9 |
|---|---|---|---|---|
| Protective colloid (a1) | B-6 100.0 | B-7 100.0 | B-8 100.0 | B-1 140.0 |
| Monomer (a2) | | | | |
| ST | 40.0 | 40.0 | 40.0 | 40.0 |
| BA | 50.0 | 50.0 | 50.0 | 50.0 |
| HEMA | 5.0 | 5.0 | 5.0 | 5.0 |
| MAc | 3.0 | 3.0 | 3.0 | 3.0 |
| AAm | 2.0 | 2.0 | 2.0 | 2.0 |
| n-DM | 0.1 | 0.1 | 0.1 | 0.1 |
| Tg of (a2) (° C.) | 5 | 5 | 5 | 5 |
| (a2)/(a1) ratio | 50/50 | 50/50 | 50/50 | 70/30 |

TABLE 1-4

Compositions of aqueous emulsions (3)

|  | C-10 | C-11 | C-12 | C-13 | C-14 | C-15 |
|---|---|---|---|---|---|---|
| Protective colloid (a1) | B-1 100.0 | B-4 100.0 | B-1 100.0 | Not used | Not used | Not used |
| Monomer (a2) | | | | | | |
| MMA | 50.0 | 50.0 | — | — | 50.0 | — |
| ST | — | — | 28.0 | 40.0 | — | 28.0 |
| BA | 40.0 | 40.0 | — | 50.0 | 40.0 | — |
| BD | — | — | 70.0 | — | — | 70.0 |
| HEMA | 5.0 | 5.0 | — | 5.0 | 5.0 | — |
| MAc | 3.0 | 3.0 | — | 3.0 | 3.0 | — |
| AA | — | — | 2.0 | — | — | 2.0 |
| AAm | 2.0 | 2.0 | — | 2.0 | 2.0 | — |
| n-DM | 0.1 | 0.1 | — | 0.1 | 0.1 | — |
| t-DM | — | — | 0.3 | — | — | 0.3 |
| Tg of (a2) (° C.) | −10 | −10 | −24 | 5 | −10 | −24 |
| (a2)/(a1) ratio | 50/50 | 50/50 | 50/50 | 100/0 | 100/0 | 100/0 |

TABLE 1-5

Compositions and evaluation results of redispersible polymer powders (1)

| Example | 1 | 2 | 3 | 4 | 5 |
|---|---|---|---|---|---|
| Aqueous emulsion | C-1 | C-2 | C-3 | C-4 | C-5 |
| Powdering | | | | | |
| Method | Flocculation | Flocculation | Flocculation | Flocculation | Flocculation |
| Acid | $H_2SO_4$ | $H_2SO_4$ | $H_2SO_4$ | $H_2SO_4$ | $H_2SO_4$ |
| Yield | B | A | A | A | A |
| Physical properties of resin | | | | | |
| Redispersibility | A | A | A | A | A |
| External appearance of redispersion | Milky white | Milky white | Milky white | Milky white | Milky white |
| Room-temperature film-forming properties | A | A | A | A | A |

TABLE 1-6

Compositions and evaluation results of redispersible polymer powders (1) (Cont'd)

| Example | 1 | 2 | 3 | 4 | 5 |
|---|---|---|---|---|---|
| Aqueous emulsion | C-1 | C-2 | C-3 | C-4 | C-5 |
| Physical properties of mortar | | | | | |
| Mixing time (sec) | 20 | 20 | 20 | 20 | 20 |
| Trowelability | A | A | A | A | A |
| Flexural strength ($kg/cm^2$) | | | | | |
| 7 Days | 73 | 70 | 75 | 75 | 75 |
| 28 Days | 132 | 130 | 120 | 125 | 130 |
| Compression strength ($kg/cm^2$) | | | | | |
| 7 Days | 210 | 210 | 220 | 215 | 195 |
| 28 Days | 350 | 340 | 340 | 335 | 290 |

TABLE 1-7

Compositions and evaluation results of redispersible polymer powders (2)

| Example | 6 | 7 | 8 | 9 |
|---|---|---|---|---|
| Aqueous emulsion | C-6 | C-7 | C-8 | C-9 |
| Powdering | | | | |
| Method | Flocculation | Flocculation | Flocculation | Flocculation |
| Acid | $H_2SO_4$ | $H_2SO_4$ | $H_2SO_4$ | $H_2SO_4$ |
| Yield | A | B | B | B |
| Physical properties of resin | | | | |
| Redispersibility | A | A | A | A |
| External appearance of redispersion | Milky white | Milky white | Milky white | Milky white |
| Room-temperature film-forming properties | A | A | A | A |

TABLE 1-8

Compositions and evaluation results of redispersible polymer powders (2) (Cont'd.)

| Example | 6 | 7 | 8 | 9 |
|---|---|---|---|---|
| Aqueous emulsion | C-6 | C-7 | C-8 | C-9 |
| Physical properties of mortar | | | | |
| Mixing time (sec) | 20 | 20 | 20 | 20 |
| Trowelability | A | B | B | A |
| Flexural strength ($kg/cm^2$) | | | | |
| 7 Days | 80 | 75 | 80 | 73 |
| 28 Days | 140 | 140 | 140 | 125 |
| Compression strength ($kg/cm^2$) | | | | |
| 7 Days | 200 | 195 | 195 | 200 |
| 28 Days | 290 | 300 | 280 | 290 |

TABLE 1-9

Compositions and evaluation results of redispersible polymer powders (3)

| Example | 10 | 11 | 12 |
|---|---|---|---|
| Aqueous emulsion | C-4 | C-4 | C-4 |
| Powdering | | | |
| Method | Flocculation | Flocculation | Flocculatio |
| Acid | HCl | $CH_3COOH$ | $H_2SO_4$ |
| Yield | B | B | B |
| Physical properties of resin | | | |
| Redispersibility | A | A | A |
| External appearance of redispersion | Milky white | Milky white | Milky white |
| Room-temperature film-forming properties | A | A | A |

TABLE 1-10

Compositions and evaluation results of redispersible polymer powders (3) (Cont'd)

| Example | 10 | 11 | 12 |
|---|---|---|---|
| Aqueous emulsion | C-4 | C-4 | C-4 |
| Physical properties of mortar | | | |
| Mixing time (sec) | 20 | 20 | 20 |
| Trowelability | A | A | A |
| Flexural strength ($kg/cm^2$) | | | |
| 7 Days | 72 | 75 | 83 |
| 28 Days | 130 | 125 | 150 |
| Compression strength ($kg/cm^2$) | | | |
| 7 Days | 205 | 210 | 225 |
| 28 Days | 320 | 335 | 350 |

TABLE 1-11

Compositions and evaluation results of redispersible polymer powders (4)

| Example | 13 | 14 | 15 |
|---|---|---|---|
| Aqueous emulsion | C-10 | C-11 | C-12 |
| Powdering | | | |
| Method | Flocculation | Flocculation | Flocculation |
| Acid | $H_2SO_4$ | $H_2SO_4$ | $H_2SO_4$ |
| Yield | B | A | B |
| Physical properties of resin | | | |
| Redispersibility | A | A | A |
| External appearance of redispersion | Milky white | Milky white | Milky white |
| Room-temperature film-forming properties | A | A | A |

TABLE 1-12

Compositions and evaluation results of redispersible polymer powders (4) (Cont'd)

| Example | 13 | 14 | 15 |
|---|---|---|---|
| Aqueous emulsion | C-10 | C-11 | C-12 |
| Physical properties of mortar | | | |
| Mixing time (sec) | 20 | 20 | 20 |
| Trowelability | A | A | B |
| Flexural strength ($kg/cm^2$) 7 Days | 70 | 75 | 80 |
| 28 Days | 125 | 130 | 140 |
| Compression strength ($kg/cm^2$) 7 Days | 215 | 225 | 200 |
| 28 Days | 310 | 325 | 305 |

TABLE 1-13

Compositions and evaluation results of redispersible polymer powders (5)

| Comparative example | 1 | 2 | 3 | 4 |
|---|---|---|---|---|
| Aqueous emulsion | C-13 | C-14 | C-15 | C-1 to C-12 (Tested separately) |
| Protective Colloid | Not used | Not used | Not used | Used |
| Powdering | | | | |
| Method | Flocculation | Flocculation | Flocculation | Spray drying |

TABLE 1-13-continued

Compositions and evaluation results of redispersible polymer powders (5)

| Comparative example | 1 | 2 | 3 | 4 |
|---|---|---|---|---|
| Acid | $H_2SO_4$ | $H_2SO_4$ | $H_2SO_4$ | |
| Yield | D | D | D | D |
| Physical properties of resin | | | | |
| Redispersibility | Does not flocculate | Does not flocculate | Does not flocculate | D |
| External appearance of redispersion | | | | Colorless |
| Room-temperature film-forming properties | | | | C |

TABLE 1-14

Compositions and evaluation results of redispersible polymer powders (5) (Cont'd)

| Comparative example | 1 | 2 | 3 | 4 |
|---|---|---|---|---|
| Aqueous emulsion | C-13 | C-14 | C-15 | C-1 to C-12 (Tested separately) |
| Protective Colloid | Not used | Not used | Not used | Used |
| Physical properties of mortar | | | | |
| Mixing time (sec) | not evaluated due to unavailability of any flocculate | not evaluated due to unavailability of any flocculate | not evaluated due to unavailability of any flocculate | 20 |
| Trowelability | | | | C |
| Flexural strength ($kg/cm^2$) 7 Days | | | | 30~50 |
| 28 Days | | | | 40~60 |
| Compression strength ($kg/cm^2$) 7 Days | | | | 150~190 |
| 28 Days | | | | 190~230 |

TABLE 1-15

Compositions and valuation Results Redispersible polymer powders (6)

| Comparative Example | |
|---|---|
| Aqueous emulsion | Physical Properties of resin-free mortar |
| Protective Colloid | |
| Powdering Method | |
| Acid | |
| Yield | |
| Physical properties of resin | |
| Redispersibility | |
| External appearance of redispersion | |
| Room-temperature film-forming properties | |

TABLE 1-16

Compositions and evaluation results of redispersible polymer powders (6) (Cont'd)

| Comparative example | |
|---|---|
| Aqueous emulsion | Physical Properties of resin-free mortar |
| Protective Colloid | |
| Physical properties of mortar | |
| Mixing time (sec) | 20 |
| Trowelability | C |
| Flexural strength ($kg/cm^2$) 7 Days | 40 |
| 28 Days | 55 |
| Compression strength ($kg/cm^2$) 7 Days | 172 |
| 28 Days | 210 |

TABLE 2-1

Compositions of aqueous emulsion obtained in step 1

| | A-1 | A-2 | A-3 |
|---|---|---|---|
| MMA | — | 50.0 | — |
| ST | 40.0 | — | 28.0 |
| BA | 50.0 | 40.0 | — |
| BD | — | — | 70.0 |
| HEMA | 5.0 | 5.0 | — |
| MAc | 3.0 | 3.0 | — |
| AA | — | — | 2.0 |
| AAm | 2.0 | 2.0 | — |
| n-DM | 0.1 | 0.1 | — |
| t-DM | — | — | 0.3 |
| Tg of Aqueous emulsion (°C.) | 5 | −10 | −24 |

TABLE 2-2

Compositions of aqueous emulsions obtained in step 2

| | C-1 | C-2 | C-3 | C-4 | C-5 | C-6 |
|---|---|---|---|---|---|---|
| Aqueous emulsion of step 1 | A-1 100.0 | A-1 100.0 | A-1 100.0 | A-1 100.0 | A-1 100.0 | A-1 100.0 |
| Monomer(s) of shells | | | | | | |
| MAm | 100.0 | 99.5 | 99.0 | 97.5 | 80.0 | 80.0 |
| AAm | — | — | — | — | — | — |
| HEMA | — | — | — | — | — | 17.5 |
| HEA | — | — | — | — | 17.5 | — |
| MAc | — | 0.5 | 1.0 | 2.5 | 2.5 | 2.5 |
| Tg of shells (°C.) | 256 | 256 | 255 | 254 | 162 | 204 |
| Ratio of aqueous emulsion of step 1 to shells | 50/50 | 50/50 | 50/50 | 50/50 | 50/50 | 50/50 |

TABLE 2-3

Compositions of aqueous emulsions obtained in step 2 (Cont'd)

| | C-7 | C-8 | C-9 | C-10 | C-11 | C-12 |
|---|---|---|---|---|---|---|
| Aqueous emulsion of step 1 | A-1 100.0 | A-1 100.0 | A-1 140.0 | A-2 100.0 | A-2 100.0 | A-3 100.0 |

TABLE 2-3-continued

Compositions of aqueous emulsions obtained in step 2 (Cont'd)

| | C-7 | C-8 | C-9 | C-10 | C-11 | C-12 |
|---|---|---|---|---|---|---|
| Monomer(s) of shells | | | | | | |
| MAm | 30.0 | 50.0 | 60.0 | 100.0 | 97.5 | 100.0 |
| AAm | 20.0 | — | — | — | — | — |
| HEMA | 25.0 | 20.0 | — | — | — | — |
| HEA | 25.0 | 30.0 | — | — | — | — |
| MAc | — | — | — | — | 2.5 | — |
| Tg of shells (°C.) | 80 | 82 | 256 | 256 | 254 | 256 |
| Ratio of aqueous emulsion of step 1 to shells | 50/50 | 50/50 | 70/30 | 50/50 | 50/50 | 50/50 |

TABLE 2-4

Compositions and evaluation results of redispersible polymer powders (1)

| Example | 1 | 2 | 3 | 4 | 5 |
|---|---|---|---|---|---|
| Aqueous emulsion of step 2 | C-1 | C-2 | C-3 | C-4 | C-5 |
| Powdering | | | | | |
| Method | Flocculation | Flocculation | Flocculation | Flocculation | Flocculation |
| Acid | $H_2SO_4$ | $H_2SO_4$ | $H_2SO_4$ | $H_2SO_4$ | $H_2SO_4$ |
| Yield | B | A | A | A | A |
| Physical properties of resin | | | | | |
| Redispersibility | A | A | A | A | A |
| External appearance of redispersion | Milky white | Milky white | Milky white | Milky white | Milky white |
| Room-temperature film-forming properties | A | A | A | A | A |

TABLE 2-5

Compositions and evaluation results of redispersible polymer powders (1) (Cont'd)

| Example | 1 | 2 | 3 | 4 | 5 |
|---|---|---|---|---|---|
| Aqueous emulsion of step 2 | C-1 | C-2 | C-3 | C-4 | C-5 |
| Physical properties of mortar | | | | | |
| Mixing time(sec) | 20 | 20 | 20 | 20 | 20 |
| Trowelability | A | A | A | A | A |
| Flexural strength ($kg/cm^2$) 7 days | 75 | 72 | 76 | 78 | 65 |
| 28 days | 130 | 140 | 125 | 120 | 105 |
| Compression strength ($kg/cm^2$) 7 days | 220 | 215 | 225 | 220 | 200 |
| 28 days | 340 | 350 | 345 | 330 | 290 |

TABLE 2-6

Compositions and evaluation results of redispersible polymer powders (2)

| Example | 6 | 7 | 8 | 9 | 10 |
|---|---|---|---|---|---|
| Aqueous emulsion of step 2 | C-6 | C-7 | C-8 | C-9 | C-10 |
| Powdering | | | | | |
| Method | Flocculation | Flocculation | Flocculation | Flocculation | Flocculation |
| Acid | $H_2SO_4$ | $H_2SO_4$ | $H_2SO_4$ | $H_2SO_4$ | $H_2SO_4$ |
| Yield | A | B | B | B | B |
| Physical properties of resin | | | | | |
| Redispersibility | A | A | A | A | A |
| External appearance of redispersion | Milky white | Milky white | Milky white | Milky white | Milky white |
| Room-temperature film-forming properties | A | A | A | A | A |

TABLE 2-7

Compositions and evaluation results of redispersible polymer powders (2) (Cont'd)

| Example | 6 | 7 | 8 | 9 | 10 |
|---|---|---|---|---|---|
| Aqueous emulsion of step 2 | C-6 | C-7 | C-8 | C-9 | C-10 |
| Physical properties of mortar | | | | | |
| Mixing time(sec) | 20 | 20 | 20 | 20 | 20 |
| Trowelability | A | B | B | A | A |
| Flexural strength ($kg/cm^2$) 7 days | 70 | 70 | 75 | 70 | 72 |
| 28 days | 135 | 130 | 135 | 120 | 130 |
| Compression strength ($kg/cm^2$) 7 days | 195 | 190 | 195 | 210 | 210 |
| 28 days | 295 | 290 | 280 | 295 | 310 |

TABLE 2-8

Compositions and evaluation results of redispersible polymer powders (3)

| Example | 11 | 12 | 13 | 14 | 15 |
|---|---|---|---|---|---|
| Aqueous emulsion of step 2 | C-11 | C-12 | C-4 | C-4 | C-4 |
| Powdering | | | | | |
| Method | Flocculation | Flocculation | Flocculation | Flocculation | Flocculation |
| Acid | $H_2SO_4$ | $H_2SO_4$ | HCl | $CH_3COOH$ | $H_2SO_4$ |
| Yield | A | B | B | B | B |
| Physical properties of resin | | | | | |
| Redispersibility | A | A | A | A | A |
| External appearance of redispersion | Milky white | Milky white | Milky white | Milky white | Milky white |

TABLE 2-8-continued

Compositions and evaluation results of redispersible polymer powders (3)

| Example | 11 | 12 | 13 | 14 | 15 |
|---|---|---|---|---|---|
| Room-temperature film-forming properties | A | A | A | A | A |

TABLE 2-9

Compositions and evaluation results of redispersible polymer powders (3) (Cont'd)

| Example | | 11 | 12 | 13 | 14 | 15 |
|---|---|---|---|---|---|---|
| Aqueous emulsion of step 2 | | C-11 | C-12 | C-4 | C-4 | C-4 |
| Physical properties of mortar | | | | | | |
| Mixing time (sec) | | 20 | 20 | 20 | 20 | 20 |
| Trowelability | | A | B | A | A | A |
| Flexual strength (kg/cm$^2$) | 7 days | 78 | 82 | 70 | 78 | 85 |
| | 28 days | 135 | 140 | 125 | 130 | 145 |
| Compression strength (kg/cm$^2$) | 7 days | 220 | 205 | 210 | 215 | 230 |
| | 28 days | 330 | 300 | 320 | 340 | 355 |

TABLE 2-10

Compositions and evaluation results of Redispersible polymer powders (5)

| Comparative example | 1 | 2 | 3 | 4 |
|---|---|---|---|---|
| Aqueous emulsion | A-1 | A-2 | A-3 | C-1 to C-12 (Tested separately) |
| Shells (S) | Not used | Not used | Not used | Used |
| Powdering | | | | |
| Method | Flocculation | Flocculation | Flocculation | Spray drying |
| Acid | H$_2$SO$_4$ | H$_2$SO$_4$ | H$_2$SO$_4$ | Not used |
| Yield | D | D | D | D |
| Physical properties of resin | | | | |
| Redispersibility | Does not flocculate | Does not flocculate | Does not flocculate | D |
| External appearance of redispersion | | | | Colorless |
| Room-temperature film-forming properties | | | | C |

TABLE 2-11

Compositions and evaluation results of redispersible polymer powders (5) (Cont'd)

| Comparative Example | 1 | 2 | 3 | 4 |
|---|---|---|---|---|
| Aqueous emulsion | A-1 | A-2 | A-3 | C-1 to C-12 (Tested separately) |
| Shells (S) | Not used | Not used | Not used | Used |

TABLE 2-11-continued

Compositions and evaluation results of redispersible polymer powders (5) (Cont'd)

| Comparative Example | 1 | 2 | 3 | 4 |
|---|---|---|---|---|
| Physical properties of mortar | | | | |
| Mixing time (sec) | Not evaluated due to unavailability of any | Not evaluated due to unavailability of any | Not evaluated due to unavailability of any | 20 |
| Trowelability | | | | C |
| Flexural strength (kg/cm$^2$) | | | | |
| 7 Days | | | | 30~50 |
| 28 Days | | | | 40~60 |
| Compression strength (kg/cm$^2$) | | | | |
| 7 Days | flocculate | flocculate | flocculate | 150~190 |
| 28 Days | late | late | late | 190~230 |

TABLE 2-12

Compositions and evaluation results of redispersible polymer powders (6)

| Comparative example | |
|---|---|
| Aqueous emulsion | Physical properties |
| Shells (S) | of resin-free mortar |
| Powdering | |
| Method | |
| Acid | |
| Yield | |
| Physical properties of resin | |
| Redispersibility | |
| External appearance of redispersion | |
| Room-temperature film-forming properties | |

TABLE 2-13

Compositions and evaluation results of redispersible polymer powders (6) (Cont'd)

| Comparative example | |
|---|---|
| Aqueous emulsion | Physical properties |
| Shells (S) | of resin-free mortar |
| Physical properties of mortar | |
| Mixing time (sec) | 20 |
| Trowelability | C |
| Flexural strength (kg/cm$^2$) | |
| 7 days | 40 |
| 28 days | 55 |
| Compression strength (kg/cm$^2$) | |
| 7 days | 172 |
| 28 days | 210 |

TABLE 3-1

Compositions of Aqueous Emulsions (1)

|  | A-1 | A-2 | A-3 |
|---|---|---|---|
| MMA | — | 50.0 | — |
| ST | 40.0 | — | 28.0 |
| BA | 50.0 | 40.0 | — |
| BD | — | — | 70.0 |
| HEMA | 5.0 | 5.0 | — |
| MAc | 3.0 | 3.0 | — |
| AA | — | — | 2.0 |
| AAm | 2.0 | 2.0 | — |
| n-DM | 0.1 | 0.1 | — |
| t-DM | — | — | 0.3 |
| Tg of Aqueous emulsions (° C.) | 5 | −10 | −24 |

TABLE 3-2

Compositions of Protective Colloid (a1)

|  | B-1 | B-2 | B-3 | B-4 |
|---|---|---|---|---|
| MAm | 100.0 | 99.5 | 99.0 | 97.5 |
| AAm | — | — | — | — |
| HEMA | — | — | — | — |
| HEA | — | — | — | — |
| MAc | — | 0.5 | 1.0 | 2.5 |
| Tg (° C.) | 256 | 256 | 255 | 254 |

|  | B-5 | B-6 | B-7 | B-8 |
|---|---|---|---|---|
| MAm | 80.0 | 80.0 | 30.0 | 50.0 |
| AAm | — | — | 20.0 | — |
| HEA | 17.5 | — | 25.0 | 30.0 |
| HEMA | — | 17.5 | 25.0 | 20.0 |
| MAc | 2.5 | 2.5 | — | — |
| Tg (° C.) | 162 | 204 | 80 | 82 |

TABLE 3-3

Compositions and Evaluation Results of Redispersible Polymer Powders (1)

| Example | 1 | 2 | 3 | 4 | 5 |
|---|---|---|---|---|---|
| Aqueous emulsion | A-1 | A-1 | A-1 | A-1 | A-1 |
| Protective colloid (a1) | B-1 | B-2 | B-3 | B-4 | B-5 |
| Mixing ratio of emulsion to protective colloid | 50/50 | 50/50 | 50/50 | 50/50 | 50/50 |
| Powdering |  |  |  |  |  |
| Method | Flocculation | Flocculation | Flocculation | Flocculation | Flocculation |
| Acid | $H_2SO_4$ | $H_2SO_4$ | $H_2SO_4$ | $H_2SO_4$ | $H_2SO_4$ |
| Yield | B | A | A | A | A |
| Physical properties of resin |  |  |  |  |  |
| Redispersibility | A | A | A | A | A |
| External appearance of redispersion | Milky white | Milky white | Milky white | Milky white | Milky white |
| Room-temperature film-forming properties | A | A | A | A | A |

TABLE 3-4

Compositions and evaluation results of redispersible polymer powders (1) (Cont'd)

| Example | 1 | 2 | 3 | 4 | 5 |
|---|---|---|---|---|---|
| Aqueous emulsion | A-1 | A-1 | A-1 | A-1 | A-1 |
| Protective colloid (a1) | B-1 | B-2 | B-3 | B-4 | B-5 |
| Mixing ratio of emulsion to protective colloid | 50/50 | 50/50 | 50/50 | 50/50 | 50/50 |
| Physical properties of mortar |  |  |  |  |  |
| Mixing time (sec) | 20 | 20 | 20 | 20 | 20 |
| Trowelability | A | A | A | A | A |
| Flexural strength (kg/cm$^2$) |  |  |  |  |  |
| 7 Days | 80 | 75 | 76 | 78 | 67 |
| 28 Days | 140 | 135 | 130 | 120 | 100 |
| Compression strength (kg/cm$^2$) |  |  |  |  |  |
| 7 Days | 215 | 205 | 220 | 220 | 200 |
| 28 Days | 350 | 330 | 335 | 325 | 280 |

TABLE 3-5

Compositions and Evaluation Results of Redispersible Polymer Powders (2)

| Example | 6 | 7 | 8 | 9 |
|---|---|---|---|---|
| Aqueous emulsion | A-1 | A-1 | A-1 | A-1 |
| Protective colloid (a1) | B-6 | B-7 | B-8 | B-1 |
| Mixing ratio of emulsion to protective colloid | 50/50 | 50/50 | 50/50 | 70/30 |
| Powdering |  |  |  |  |
| Method | Flocculation | Flocculation | Flocculation | Flocculation |
| Acid | $H_2SO_4$ | $H_2SO_4$ | $H_2SO_4$ | $H_2SO_4$ |
| Yield | A | B | B | B |
| Physical properties of resin |  |  |  |  |
| Redispersibility | A | A | A | A |
| External appearance of redispersion | Milky white | Milky white | Milky white | Milky white |
| Room-temperature film-forming properties | A | A | A | A |

TABLE 3-6

Compositions and evaluation results of redispersible polymer powders (2) (Cont'd.)

| Example | 6 | 7 | 8 | 9 |
|---|---|---|---|---|
| Aqueous emulsion | A-1 | A-1 | A-1 | A-1 |
| Protective colloid (a1) | B-6 | B-7 | B-8 | B-1 |
| Mixing ratio of emulsion to protective colloid | 50/50 | 50/50 | 50/50 | 70/30 |
| Physical properties of mortar |  |  |  |  |
| Mixing time (sec) | 20 | 20 | 20 | 20 |
| Trowelability | A | B | B | A |
| Flexural strength (kg/cm$^2$) |  |  |  |  |
| 7 Days | 70 | 70 | 75 | 73 |
| 28 Days | 110 | 120 | 110 | 125 |
| Compression strength (kg/cm$^2$) |  |  |  |  |
| 7 Days | 190 | 200 | 190 | 205 |
| 28 Days | 280 | 290 | 285 | 300 |

TABLE 3-7

Compositions and evaluation results of redispersible polymer powders (2)

| Example | 10 | 11 | 12 |
|---|---|---|---|
| Aqueous emulsion | A-1 | A-1 | A-1 |
| Protective colloid (a1) | B-4 | B-4 | B-4 |
| Mixing ratio of emulsion to protective colloid | 50/50 | 50/50 | 50/50 |
| Powdering | | | |
| Method | Flocculation | Flocculation | Flocculation |
| Acid | HCl | $CH_3COOH$ | $H_2SO_4$ |
| Yield | B | B | B |
| Physical properties of resin | | | |
| Redispersibility | A | A | A |
| External appearance of redispersion | Milky white | Milky white | Milky white |
| Room-temperature film-forming properties | A | A | A |

TABLE 3-8

Compositions and evaluation results of redispersible polymer powders (3) (Cont'd)

| Example | 10 | 11 | 12 |
|---|---|---|---|
| Aqueous emulsion | A-1 | A-1 | A-1 |
| Protective colloid (a1) | B-4 | B-4 | B-4 |
| Mixing ratio of emulsion to protective colloid | 50/50 | 50/50 | 50/50 |
| Physical properties of mortar | | | |
| Mixing time (sec) | 20 | 20 | 20 |
| Trowelability | A | A | A |
| Flexural strength (kg/cm$^2$) | | | |
| 7 Days | 72 | 75 | 85 |
| 28 Days | 130 | 130 | 145 |
| Compression strength (kg/cm$^2$) | | | |
| 7 Days | 200 | 200 | 225 |
| 28 Days | 330 | 325 | 355 |

TABLE 3-9

Compositions and evaluation results of redispersible polymer powders (4)

| Example | 13 | 14 | 15 |
|---|---|---|---|
| Aqueous emulsion | A-2 | A-2 | A-3 |
| Protective colloid (a1) | B-1 | B-4 | B-1 |
| Mixing ratio of emulsion to protective colloid | 50/50 | 50/50 | 50/50 |
| Powdering | | | |
| Method | Flocculation | Flocculation | Flocculation |
| Acid | $H_2SO_4$ | $H_2SO_4$ | $H_2SO_4$ |
| Yield | B | A | B |
| Physical properties of resin | | | |
| Redispersibility | A | A | A |
| External appearance of redispersion | Milky white | Milky white | Milky white |
| Room-temperature film-forming properties | A | A | A |

TABLE 3-10

Compositions and evaluation results of redispersible polymer powders (4) (Cont'd.)

| Example | 13 | 14 | 15 |
|---|---|---|---|
| Aqueous emulsion | A-2 | A-2 | A-3 |
| Protective colloid (a1) | B-1 | B-4 | B-1 |
| Mixing ratio of emulsion to protective colloid | 50/50 | 50/50 | 50/50 |
| Physical properties of mortar | | | |
| Mixing time (sec) | 20 | 20 | 20 |
| Trowelability | A | A | A |
| Flexural strength (kg/cm$^2$) | | | |
| 7 Days | 68 | 80 | 78 |
| 28 Days | 125 | 130 | 135 |
| Compression strength (kg/cm$^2$) | | | |
| 7 Days | 205 | 225 | 215 |
| 28 Days | 310 | 310 | 310 |

TABLE 3-11

Compositions and evaluation results of redispersible polymer powders (5)

| Comparative example | 1 | 2 | 3 | 4 |
|---|---|---|---|---|
| Aqueous emulsion | A-1 | A-2 | A-3 | Mixtures employed in examples 1 to 9 and examples 13 to 15 (separately tested) |
| Protective colloid (a1) | Not used | Not used | Not used | |
| Mixing ratio of emulsion to protective colloid | 100/100 | 100/100 | 100/100 | |
| Powdering | | | | |
| Method | Flocculation | Flocculation | Flocculation | Spray drying |
| Acid | $H_2SO_4$ | $H_2SO_4$ | $H_2SO_4$ | Not used |
| Yield | D | D | D | D |
| Physical properties of resin | | | | |
| Redispersibility | Not flocculated | Not flocculated | Not flocculated | D |
| External appearance of redispersion | | | | Colorless |
| Room-temperature film-forming properties | | | | C |

TABLE 3-12

Compositions and Evaluation Results of Redispersible Polymer powders (5) (Cont'd)

| Comparative example | 1 | 2 | 3 | 4 |
|---|---|---|---|---|
| Aqueous emulsion | A-1 | A-2 | A-3 | Mixtures employed in Examples 1 to 9 and Examples 13 to 15 (separately rested) |
| Protective colloid (a1) | Not used | Not used | Not used | |
| Mixing ratio of emulsion to protective colloid | 100/0 | 100/0 | 100/0 | |
| Physical properties of mortar | | | | |
| Mixing time (sec) | Not evaluated | Not evaluated | Not evaluated | 20 |
| Trowelability | | | | C |
| Flexural strength | | | | |

TABLE 3-12-continued

Compositions and Evaluation Results of Redispersible polymer powders (5) (Cont'd)

| Comparative example | 1 | 2 | 3 | 4 |
|---|---|---|---|---|
| (kg/cm²) | due to | due to | due to | |
| 7 Days | unavail- | unavail- | unavail- | 30~50 |
| 28 Days | ability | ability | ability | 40~60 |
| Compression strength | of any | of any | of any | |
| (kg/cm²) | floccu- | floccu- | floccu- | |
| 7 Days | late | late | late | 150~190 |
| 28 Days | | | | 190~230 |

TABLE 3-13

Compositions and evaluation results of redispersible polymer powders (6)

Comparative example

| Aqueous emulsion | Physical properties |
| Protective colloid (a 1) | of resin-free mortar |
| Mixing ratio of emulsion to protective colloid | |
| Powdering | |
| Method | |
| Acid | |
| Yield | |
| Physical properties of resin | |
| Redispersibility | |
| External appearance of redispersion | |
| Room-temperature film-forming properties | |

TABLE 3-14

Compositions and evaluation results of redispersible polymer powders (6) (Cont'd)

Comparative example

| Aqueous emulsion | Physical properties |
|---|---|
| Protective colloid (a1) | of resin-free mortar |
| Mixing ratio of emulsion to protective colloid | |
| Physical properties of mortar | |
| Mixing time (sec) | 20 |
| Trowelability | C |
| Flexural strength | |
| (kg/cm²) 7 Days | 40 |
| 28 Days | 55 |
| Compression strength | |
| (kg/cm²) 7 Days | 172 |
| 28 Days | 210 |

TABLE 4-1

Compositions of protective colloids

| | B-1 | B-2 | B-3 | B-4 |
|---|---|---|---|---|
| MAm | 100.0 | 99.5 | 99.0 | 97.5 |
| AAm | — | — | — | — |
| HEMA | — | — | — | — |
| HEA | — | — | — | — |
| MAc | — | 0.5 | 1.0 | 2.5 |
| Tg (°C.) | 256 | 256 | 255 | 254 |

| | B-5 | B-6 | B-7 | B-8 |
|---|---|---|---|---|
| MAm | 80.0 | 80.0 | 30.0 | 50.0 |
| AAm | — | — | 20.0 | — |
| HEMA | 17.5 | — | 25.0 | 30.0 |
| HEA | — | 17.5 | 25.0 | 20.0 |
| MAc | 2.5 | 2.5 | — | — |
| Tg (°C.) | 162 | 204 | 80 | 82 |

TABLE 4-2

Compositions of aqueous emulsions (1)

| | C-1 | C-2 | C-3 | C-4 | C-5 |
|---|---|---|---|---|---|
| Protective colloid (a1) | B-1 | B-2 | B-3 | B-4 | B-5 |
| | 100.0 | 100.0 | 100.0 | 100.0 | 100.0 |
| Monomer (a2) | | | | | |
| ST | 40.0 | 40.0 | 40.0 | 40.0 | 40.0 |
| BA | 50.0 | 50.0 | 50.0 | 50.0 | 50.0 |
| HEMA | 5.0 | 5.0 | 5.0 | 5.0 | 5.0 |
| MAc | 3.0 | 3.0 | 3.0 | 3.0 | 3.0 |
| AAm | 2.0 | 2.0 | 2.0 | 2.0 | 2.0 |
| n-DM | 0.1 | 0.1 | 0.1 | 0.1 | 0.1 |
| Tg of (a2) (°C.) | 3 | 3 | 3 | 3 | 3 |
| (a2)/(a1) ratio | 50/50 | 50/50 | 50/50 | 50/50 | 50/50 |

TABLE 4-3

Compositions of aqueous emulsions (1) (Cont'd)

| | C-6 | C-7 | C-8 | C-9 |
|---|---|---|---|---|
| Protective colloid (a1) | B-6 | B-7 | B-8 | B-1 |
| | 100.0 | 100.0 | 100.0 | 140.0 |
| Monomer (a2) | | | | |
| ST | 40.0 | 40.0 | 40.0 | 40.0 |
| BA | 50.0 | 50.0 | 50.0 | 50.0 |
| HEMA | 5.0 | 5.0 | 5.0 | 5.0 |
| MAc | 3.0 | 3.0 | 3.0 | 3.0 |
| AAm | 2.0 | 2.0 | 2.0 | 2.0 |
| n-DM | 0.1 | 0.1 | 0.1 | 0.1 |
| Tg of (a2) (°C.) | 3 | 3 | 3 | 3 |
| (a2)/(a1) ratio | 50/50 | 50/50 | 50/50 | 70/30 |

TABLE 4-4

Compositions of aqueous emulsions (2)

| | C-10 | C-11 | C-12 | C-13 | C-14 | C-15 |
|---|---|---|---|---|---|---|
| Protective colloid (a1) | B-1 | B-4 | B-1 | Not used | Not used | Not used |
| | 100.0 | 100.0 | 100.0 | | | |
| Monomer (a2) | | | | | | |
| MMA | 50.0 | 50.0 | — | — | 50.0 | — |
| ST | — | — | 28.0 | 40.0 | — | 28.0 |
| BA | 40.0 | 40.0 | — | 50.0 | 40.0 | — |
| BD | — | — | 70.0 | — | — | 70.0 |

TABLE 4-4-continued

Compositions of aqueous emulsions (2)

| | C-10 | C-11 | C-12 | C-13 | C-14 | C-15 |
|---|---|---|---|---|---|---|
| HEMA | 5.0 | 5.0 | — | 5.0 | 5.0 | — |
| MAc | 3.0 | 5.0 | — | 3.0 | 3.0 | — |
| AA | — | — | 2.0 | — | — | 2.0 |
| AAm | 2.0 | 2.0 | — | 2.0 | 2.0 | — |
| n-DM | 0.1 | 0.1 | — | 0.1 | 0.1 | — |
| t-DM | — | — | 0.3 | — | — | 0.3 |
| Tg of (a2) (°C.) | −10 | −10 | −24 | 3 | −10 | −24 |
| (a2)/(a1) ratio | 50/50 | 50/50 | 50/50 | 100/0 | 100/0 | 100/0 |

TABLE 4-5

Compositions and evaluation results of redispersible polymer powders (1)

| Example | 1 | 2 | 3 | 4 | 5 |
|---|---|---|---|---|---|
| Aqueous emulsion | C-1 | C-2 | C-3 | C-4 | C-5 |
| Powdering Method | Flocculation | Flocculation | Flocculation | Flocculation | Flocculation |
| Polyvalent metal salt | $Al_2(SO_4)_3$ | $Al_2(SO_4)_3$ | $Al_2(SO_4)_3$ | $Al_2(SO_4)_3$ | $Al_2(SO_4)_3$ |
| Polyvalent metal salt Physical properties or resin | B | A | A | A | A |
| Redispersibility | A | A | A | A | A |
| External appearance of redispersion | Milky white | Milky white | Milky white | Milky white | Milky white |
| Room-temperature film-forming properties | A | A | A | A | A |

TABLE 4-6

Compositions and evaluation results of redispersible polymer powders (1) (Cont'd.)

| Example | 1 | 2 | 3 | 4 | 5 |
|---|---|---|---|---|---|
| Aqueous emulsion Physical properties of mortar | C-1 | C-2 | C-3 | C-4 | C-5 |
| Mixing time (sec) | 20 | 20 | 20 | 20 | 20 |
| Trowelability | A | A | A | A | B |
| Flexural strength ($kg/cm^2$) 7 Days | 72 | 71 | 75 | 75 | 75 |
| 28 Days | 130 | 129 | 120 | 127 | 130 |
| Compression strength ($kg/cm^2$) 7 Days | 215 | 210 | 215 | 220 | 195 |
| 28 Days | 350 | 345 | 340 | 340 | 290 |

TABLE 4-7

Compositions and evaluation results of redispersible polymer powders (1) (Cont'd)

| Example | 6 | 7 | 8 | 9 | 10 |
|---|---|---|---|---|---|
| Aqueous emulsion | C-6 | C-7 | C-8 | C-9 | C-4 |
| Powdering Method | Flocculation | Flocculation | Flocculation | Flocculation | Flocculation |
| Polyvalent metal salt | $Al_2(SO_4)_3$ | $Al_2(SO_4)_3$ | $Al_2(SO_4)_3$ | $Al_2(SO_4)_3$ | $FeSO_4$ |
| Yield Physical properties or resin | A | B | A | B | A |
| Redispersibility | A | A | A | A | A |
| External appearance of redispersion | Milky white | Milky white | Milky white | Milky white | Milky white |
| Room-temperature film-forming properties | A | A | A | A | A |

TABLE 4-8

Compositions and evaluation results of redispersible polymer powders (1) (Cont'd.)

| Example | 6 | 7 | 8 | 9 | 10 |
|---|---|---|---|---|---|
| Aqueous emulsion Physical properties of mortar | C-6 | C-7 | C-8 | C-9 | C-4 |
| Mixing time (sec) | 20 | 20 | 20 | 20 | 20 |
| Trowelability | B | B | A | A | A |
| Flexural strength ($kg/cm^2$) 7 Days | 80 | 75 | 80 | 73 | 72 |
| 28 Days | 140 | 140 | 140 | 130 | 130 |
| Compression strength ($kg/cm^2$) 7 Days | 200 | 195 | 195 | 195 | 205 |
| 28 Days | 290 | 300 | 280 | 290 | 320 |

TABLE 4-9

Compositions and evaluation results of redispersible polymer powders (2)

| Example | 11 | 12 | 13 | 14 | 15 |
|---|---|---|---|---|---|
| Aqueous emulsion | C-4 | C-4 | C-4 | C-4 | C-4 |
| Powdering Method | Flocculation | Flocculation | Flocculation | Flocculation | Flocculation |
| Polyvalent metal salt | $Al_2(SO_4)_3$ | $CaCl_2$ | $CaCl_2$ | $Al_2(SO_4)_3$ | $FeSO_4$ |
| Yield Physical properties or resin | A | C | B | B | B |
| Redispersibility | A | A | A | A | A |
| External appearance of redispersion | Milky white | Milky white | Milky white | Milky white | Milky white |

TABLE 4-9-continued

Compositions and evaluation results of redispersible polymer powders (2)

| Example | 11 | 12 | 13 | 14 | 15 |
|---|---|---|---|---|---|
| Room-temperature film-forming properties | A | A | A | A | A |

TABLE 4-10

Compositions and evaluation results of redispersible polymer powders (2)

| Example | 11 | 12 | 13 | 14 | 15 |
|---|---|---|---|---|---|
| Aqueous emulsion | C-4 | C-4 | C-4 | C-4 | C-4 |
| Physical properties of mortar | | | | | |
| Mixing time (sec) | 20 | 20 | 20 | 20 | 20 |
| Trowelability | B | B | A | A | A |
| Flexural strength (kg/cm$^2$) 7 Days | 80 | 75 | 80 | 70 | 72 |
| 28 Days | 140 | 140 | 140 | 130 | 130 |
| Compression strength (kg/cm$^2$) 7 Days | 200 | 195 | 195 | 195 | 205 |
| 28 Days | 290 | 300 | 280 | 290 | 320 |

TABLE 4-11

Compositions and evaluation results of redispersible polymer powders (2) (Cont'd.)

| Example | 16 | 17 | 18 |
|---|---|---|---|
| Aqueous emulsion | C-10 | C-11 | C-12 |
| Powdering | | | |
| Method | Flocculation | Flocculation | Flocculation |
| Polyvalent metal salt | Al$_2$(SO$_4$)$_3$ | Al$_2$(SO$_4$)$_3$ | Al$_2$(SO$_4$)$_3$ |
| Yield | B | A | B |
| Physical properties of resin | | | |
| Redispersibility | A | A | A |
| External appearance of redispersion | Milky white | Milky white | Milky white |
| Room-temperature film-forming properties | A | A | A |

TABLE 4-12

Compositions and evaluation results of redispersible polymer powders (2) (Cont'd.)

| Example | 16 | 17 | 18 |
|---|---|---|---|
| Aqueous emulsion | C-10 | C-11 | C-12 |
| Physical properties of mortar | | | |
| Mixing time (sec) | 20 | 20 | 20 |
| Trowelability | A | A | A |
| Flexural strength | | | |

TABLE 4-12-continued

Compositions and evaluation results of redispersible polymer powders (2) (Cont'd.)

| Example | 16 | 17 | 18 |
|---|---|---|---|
| (kg/cm$^2$) 7 Days | 70 | 75 | 85 |
| 28 Days | 125 | 135 | 145 |
| Compression strength (kg/cm$^2$) 7 Days | 210 | 225 | 205 |
| 28 Days | 310 | 330 | 305 |

TABLE 4-13

Compositions and evaluation results of redispersible polymer powders (3)

| Comparative example | 1 | 2 | 3 | 4 |
|---|---|---|---|---|
| Aqueous emulsion | C-13 | C-14 | C-15 | C-1 to C-12 (tested separately) |
| Protective colloid | Not used | Not used | Not used | Used |
| Powdering | | | | |
| Method | Flocculation | Flocculation | Flocculation | Spray drying |
| Polyvalent metal salt | Al$_2$(SO$_4$)$_3$ | Al$_2$(SO$_4$)$_3$ | Al$_2$(SO$_4$)$_3$ | Not used |
| Yield | A | A | A | D |
| Physical properties of resin | | | | |
| Redispersibility | D | D | D | D |
| External appearance of redispersion | Colorless | Colorless | Colorless | Colorless |
| Room-temperature film-forming properties | C | C | C | C |

TABLE 4-14

Compositions and evaluation results redispersible polymer powders (3) (Cont'd.)

| Comparative example | 1 | 2 | 3 | 4 |
|---|---|---|---|---|
| Aqueous emulsion | C-13 | C-14 | C-15 | C-1 to C-12 (tested separately) |
| Protective colloid | Not used | Not used | Not used | Used |
| Physical properties of mortar | | | | |
| Mixing time (sec) | uncrushable | uncrushable | uncrushable | 20 |
| Trowelability | | | | C |
| Flexural strength (kg/cm$^2$) 7 Days | | | | 30~50 |
| 28 Days | | | | 40~60 |
| Compression strength (kg/cm$^2$) 7 Days | | | | 150~190 |
| 28 Days | | | | 190~230 |

TABLE 4-15

Compositions and evaluation results redispersible polymer powders (3) (Cont'd.)

Comparative example 5

| Aqueous emulsion | C-4 | Physical properties of resin- free mortar |
|---|---|---|
| Protective colloid | Used | |
| Powdering | | |
| Method | Flocculation | |
| Polyvalent metal salt | $Al_2(SO_4)_3$ | |
| Yield | D | |
| Physical properties of resin | | |
| Redispersibility | Not flocculated | |
| External appearance of Room-temperature film-forming properties | | |

TABLE 4-16

Compositions and revaluation results redispersible polymer powders (3) (Cont'd.)

Comparative example 5

| Aqueous emulsion | C-4 | Physical of resin- free mortar |
|---|---|---|
| Protective colloid | Used | |
| Physical properties of mortar | | |
| Mixing time (sec) | 20 | |
| Trowelability | C | |
| Flexural strength ($kg/cm^2$) 7 Days | 40 | |
| 28 Days | 55 | |
| Compression strength ($kg/cm^2$) 7 Days | 172 | |
| 28 Days | 210 | |

TABLE 5-1

Compositions of aqueous emulsions obtained in step 1

| | A-1 | A-2 | A-3 |
|---|---|---|---|
| MMA | — | 50.0 | — |
| ST | 40.0 | — | 28.0 |
| BA | 50.0 | 40.0 | — |
| BD | — | — | 70.0 |
| HEMA | 5.0 | 5.0 | — |
| MAc | 3.0 | 3.0 | — |
| AA | — | — | 2.0 |
| AAm | 2.0 | 2.0 | — |
| n-DM | 0.1 | 0.1 | — |
| t-DM | — | — | 0.3 |
| Tg of Aqueous emulsion (°C.) | 3 | −10 | −24 |

TABLE 5-2

Compositions of Aqueous Emulsions Obtained in Step 2

| | C-1 | C-2 | C-3 | C-4 | C-5 | C-6 |
|---|---|---|---|---|---|---|
| Aqueous emulsion of step 1 | A-1 100.0 | A-1 100.0 | A-1 100.0 | A-1 100.0 | A-1 100.0 | A-1 100.0 |
| Monomer(s) of shells | | | | | | |
| MAm | 100.0 | 99.5 | 99.0 | 97.5 | 80.0 | 80.0 |
| AAm | — | — | — | — | — | — |
| HEMA | — | — | — | — | — | 17.5 |
| HEA | — | — | — | — | 17.5 | — |
| MAc | — | 0.5 | 1.0 | 2.5 | 2.5 | 2.5 |
| Tg of shells (°C.) | 256 | 256 | 255 | 254 | 162 | 204 |
| Ratio of aqueous emulsion of step 1 to shells | 50/50 | 50/50 | 50/50 | 50/50 | 50/50 | 50/50 |

TABLE 5-3

Compositions of aqueous emulsions obtained in step 2 (Cont'd)

| | C-7 | C-8 | C-9 | C-10 | C-11 | C-12 |
|---|---|---|---|---|---|---|
| Aqueous emulsion of step 1 | A-1 100.0 | A-1 100.0 | A-1 140.0 | A-2 100.0 | A-2 100.0 | A-3 100.0 |
| Monomer(s) of shells | | | | | | |
| MAm | 30.0 | 50.0 | 60.0 | 100.0 | 97.5 | 100.0 |
| AAm | 20.0 | — | — | — | — | — |
| HEMA | 25.0 | 20.0 | — | — | — | — |
| HEA | 25.0 | 30.0 | — | — | — | — |
| MAc | — | — | — | — | 2.5 | — |
| Tg of shells (°C.) | 80 | 82 | 256 | 256 | 254 | 256 |
| Ratio of aqueous emulsion of step 1 to shells | 50/50 | 50/50 | 70/30 | 50/50 | 50/50 | 50/50 |

TABLE 5-4

Compositions and evaluation results of redispersible polymer powders (1)

| Example | 1 | 2 | 3 | 4 | 5 |
|---|---|---|---|---|---|
| Aqueous emulsion of step 2 | C-1 | C-2 | C-3 | C-4 | C-5 |
| Powdering | | | | | |
| Method | Flocculation | Flocculation | Flocculation | Flocculation | Flocculation |
| Polyvalent metal | $Al_2(SO_4)_3$ | $Al_2(SO_4)_3$ | $Al_2(SO_4)_3$ | $Al_2(SO_4)_3$ | $Al_2(SO_4)_3$ |
| Yield | B | A | A | A | A |
| Physical properties of resin | | | | | |
| Redispersibility | A | A | A | A | A |
| External apperance of redispersion | Milky white | Milky white | Milky white | Milky white | Milky white |
| Room-temperature film-forming properties | A | A | A | A | A |

TABLE 5-5

Compositions and evaluation results of redispersible polymer powders (1) (Cont'd)

| Example | 1 | 2 | 3 | 4 | 5 |
|---|---|---|---|---|---|
| Aqueous emulsion of step 2 | C-1 | C-2 | C-3 | C-4 | C-5 |
| Physical properties of mortar | | | | | |
| Mixing time(sec) | 20 | 20 | 20 | 20 | 20 |
| Trowelability | A | A | A | A | B |
| Flexural Strength | | | | | |
| (kg/cm$^2$) 7 days | 73 | 75 | 76 | 72 | 80 |
| 28 days | 130 | 140 | 135 | 125 | 135 |
| Compression Strength | | | | | |
| (kg/cm$^2$) 7 days | 210 | 220 | 220 | 220 | 200 |
| 28 days | 335 | 350 | 350 | 350 | 290 |

TABLE 5-6

Compositions and evaluation results of redispersible polymer powders (2)

| Example | 6 | 7 | 8 | 9 | 10 |
|---|---|---|---|---|---|
| Aqueous emulsion of step 2 | C-6 | C-7 | C-8 | C-9 | C-10 |
| Powdering | | | | | |
| Method | Flocculation | Flocculation | Flocculation | Flocculation | Flocculation |
| Polyvalent metal salt | Al$_2$(SO$_4$)$_3$ | Al$_2$(SO$_4$)$_3$ | Al$_2$(SO$_4$)$_3$ | Al$_2$(SO$_4$)$_3$ | Al$_2$(SO$_4$)$_3$ |
| Yield | A | B | A | B | B |
| Physical properties of resin | | | | | |
| Redispersibility | A | A | A | A | A |
| External apperance of redispersion | Milky white | Milky white | Milky white | Milky white | Milky white |
| Room-temperature film-forming properties | A | A | A | A | A |

TABLE 5-7

Compositions and evaluation results of redispersible polymer powders (1) (Cont'd)

| Example | 6 | 7 | 8 | 9 | 10 |
|---|---|---|---|---|---|
| Aqueous emulsion of step 2 | C-6 | C-7 | C-8 | C-9 | C-10 |
| Physical properties of mortar | | | | | |
| Mixing time(sec) | 20 | 20 | 20 | 20 | 20 |
| Trowelability | B | B | A | A | A |
| Flexural strength | | | | | |
| (kg/cm$^2$) 7 days | 80 | 78 | 82 | 75 | 70 |
| 28 days | 145 | 150 | 145 | 125 | 125 |
| Compression strength | | | | | |
| (kg/cm$^2$) 7 days | 200 | 210 | 195 | 205 | 205 |
| 28 days | 300 | 310 | 280 | 295 | 320 |

TABLE 5-8

Compositions and evaluation results of redispersible polymer powders (3)

| Example | 11 | 12 | 13 | 14 | 15 |
|---|---|---|---|---|---|
| Aqueous emulsion of step 2 | C-11 | C-12 | C-4 | C-4 | C-4 |
| Powdering | | | | | |
| Method | Flocculation | Flocculation | Flocculation | Flocculation | Flocculation |
| Polyvalent metal salt | Al$_2$(SO$_4$)$_3$ | Al$_2$(SO$_4$)$_3$ | FeSO$_4$ | Al$_2$(SO$_4$)$_3$ | CaCl$_2$ |
| Yield | A | B | A | A | C |
| Physical properties of resin | | | | | |
| Redispersibility | A | A | A | A | A |
| External Apperance of redispersion | Milky white | Milky white | Milky white | Milky white | Milky white |
| Room-temperature film-forming properties | A | A | A | A | A |

TABLE 5-9

Compositions and evaluation results of redispersible polymer powders (3) (Cont'd)

| Example | 11 | 12 | 13 | 14 | 15 |
|---|---|---|---|---|---|
| Aqueous emulsion of step 2 | C-11 | C-12 | C-4 | C-4 | C-4 |
| Physical properties of mortar | | | | | |
| Mixing time(sec) | 20 | 20 | 20 | 20 | 20 |
| Trowelability | A | A | A | A | A |
| Flexural strength | | | | | |
| (kg/cm$^2$) 7 days | 75 | 85 | 70 | 72 | 73 |
| 28 days | 135 | 145 | 130 | 120 | 130 |
| Compression strength | | | | | |
| (kg/cm$^2$) 7 days | 210 | 210 | 200 | 205 | 210 |
| 28 days | 335 | 310 | 340 | 350 | 325 |

TABLE 5-10

Compositions and evaluation results of redispersible polymer powders (4)

| Example | 16 | 17 | 18 |
|---|---|---|---|
| Aqueous emulsion | C-4 | C-4 | C-4 |
| Powdering | | | |
| Method | Flocculation | Flocculation | Flocculation |
| Polyvalent metal salt | CaCl$_2$ | Al$_2$(SO$_4$)$_3$ | Al$_2$(SO$_4$)$_3$ |
| Yield | B | B | B |

TABLE 5-10-continued

Compositions and evaluation results of redispersible polymer powders (4)

| Example | 16 | 17 | 18 |
|---|---|---|---|
| Physical properties of resin | | | |
| Redispersibility | A | A | A |
| External appearance of redispersion | Milky white | Milky white | Milky white |
| Room-temperature film-forming properties | A | A | A |

TABLE 5-11

Compositions and evaluation results of redispersible polymer powders (4) (Cont'd)

| Example | 16 | 17 | 18 |
|---|---|---|---|
| Aqueous emulsion of step 2 | C-4 | C-4 | C-4 |
| Physical properties of mortar | | | |
| Mixing time(sec) | 20 | 20 | 20 |
| Trowelability | A | A | A |
| Flexural Strength (kg/cm$^2$) 7 days | 73 | 75 | 85 |
| 28 days | 130 | 130 | 145 |
| Compression Strength (kg/cm$^2$) 7 days | 200 | 200 | 215 |
| 28 days | 350 | 335 | 340 |

TABLE 5-12

Compositions and evaluation results of redispersible polymer powders (5)

| Comparative example | 1 | 2 | 3 | 4 |
|---|---|---|---|---|
| Aqueous emulsion | A-1 | A-2 | A-3 | C-1 to C-12 (tested separately) |
| Shells (S) | Not used | Not used | Not used | Used |
| Powdering | | | | |
| Method | Flocculation | Flocculation | Flocculation | Spray drying |
| Polyvalent metal salt | Al$_2$(SO$_4$)$_3$ | Al$_2$(SO$_4$)$_3$ | Al$_2$(SO$_4$)$_3$ | Not used |
| Yield | A | A | A | D |
| Physical properties of resin | | | | |
| Redispersibility | D | D | D | D |
| External appearance of redispersion | Colorless | Colorless | Colorless | Colorless |
| Room-temperature film-forming properties | C | C | C | C |

TABLE 5-13

Compositions and evaluation results redispersible polymer powders (5) (Cont'd.)

| Comparative example | 1 | 2 | 3 | 4 |
|---|---|---|---|---|
| Aqueous emulsion | C-13 | C-14 | C-15 | C-1 to C-12 (tested separately) |
| Shells (S) | Not used | Not used | Not used | Used |
| Physical properties of mortar | | | | |
| Mixing time (sec) | Uncrushable | Uncrushable | Uncrushable | 20 |
| Trowelability | | | | C |
| Flexural strength (kg/cm$^2$) 7 Days | | | | 30~50 |
| 28 Days | | | | 40~60 |
| Compression strength (kg/cm$^2$) 7 Days | | | | 150~190 |
| 28 Days | | | | 190~230 |

TABLE 5-14

Compositions and evaluation results redispersible polymer powders (6)

| Comparative exmaple | 5 | |
|---|---|---|
| Aqueous emulsion | C-4 | Physical properties of resin-free mortar |
| Shells (S) | Used | |
| Powdering | | |
| Method | Flocculation | |
| Polyvalent metal salt | Al$_2$(SO$_4$)$_3$ | |
| Yield | D | |
| Physical properties of resin | | |
| Redispersibility | Not flocculated | |
| External appearance of Room-temperature film-forming properties | | |

TABLE 5-15

Compositions and evaluation results redispersible polymer powders (6) (Cont'd.)

| Comparative example | 5 | |
|---|---|---|
| Aqueous emulsion | C-4 | Physical properties of resin-free mortar |
| Shells (S) | Used | |
| Physical properties of mortar | | |
| Mixing time (sec) | 20 | |
| Trowelability | C | |
| Flexural strength (kg/cm$^2$) 7 Days | 40 | |
| 28 Days | 55 | |
| Compression strength (kg/cm$^2$) 7 Days | 172 | |
| 28 Days | 210 | |

TABLE 6-1

Compositions of aqueous emulsions

|  | A-1 | A-2 | A-3 |
|---|---|---|---|
| MMA | — | 50.0 | — |
| ST | 40.0 | — | 28.0 |
| BA | 50.0 | 40.0 | — |
| BD | — | — | 70.0 |
| HEMA | 5.0 | 5.0 | — |
| MAc | 3.0 | 3.0 | — |
| AA | — | — | 2.0 |
| AAm | 2.0 | 2.0 | — |
| n-DM | 0.1 | 0.1 | — |
| t-DN | — | — | 0.3 |
| Tg of Aqueous emulsions (°C.) | 3 | −10 | −24 |

TABLE 6-2

Compositions of protective colloid (a1)

|  | B-1 | B-2 | B-3 | B-4 |
|---|---|---|---|---|
| MAm | 100.0 | 99.5 | 99.0 | 97.5 |
| AAm | — | — | — | — |
| HEMA | — | — | — | — |
| HEA | — | — | — | — |
| MAc | — | 0.5 | 1.0 | 2.5 |
| Tg (°C.) | 256 | 256 | 255 | 254 |

|  | B-5 | B-6 | B-7 | B-8 |
|---|---|---|---|---|
| MAm | 80.0 | 80.0 | 30.0 | 50.0 |
| AAm | — | — | 20.0 | — |
| HEA | 17.5 | — | 25.0 | 30.0 |
| HEMA | — | 17.5 | 25.0 | 20.0 |
| MAc | 2.5 | 2.5 | — | — |
| Tg (°C.) | 162 | 204 | 80 | 82 |

TABLE 6-3

Compositions and evaluation results of redispersible polymer powders (1)

| Example | 1 | 2 | 3 | 4 | 5 |
|---|---|---|---|---|---|
| Aqueous emulsion | A-1 | A-1 | A-1 | A-1 | A-1 |
| Protective colloid (a1) | B-1 | B-2 | B-3 | B-4 | B-5 |
| Mixing ratio of emulsion to protective colloid | 50/50 | 50/50 | 50/50 | 50/50 | 50/50 |
| Powdering Method | Flocculation | Flocculation | Flocculation | Flocculation | Flocculation |
| Polyvalent metal salt | Al$_2$(SO$_4$)$_3$ | Al$_2$(SO$_4$)$_3$ | Al$_2$(SO$_4$)$_3$ | Al$_2$(SO$_4$)$_3$ | Al$_2$(SO$_4$)$_3$ |
| Yield | B | A | A | A | A |
| Physical proeprties of resin |  |  |  |  |  |
| Redispersibility | A | A | A | A | A |
| External appearance of redispersion | Milky white | Milky white | Milky white | Milky white | Milky white |

TABLE 6-3-continued

Compositions and evaluation results of redispersible polymer powders (1)

| Example | 1 | 2 | 3 | 4 | 5 |
|---|---|---|---|---|---|
| Room-temperature film-forming properties | A | A | A | A | A |

TABLE 6-4

Compositions and evaluation results of redispersible polymer powders (1) (Cont'd)

| Example | 1 | 2 | 3 | 4 | 5 |
|---|---|---|---|---|---|
| Aqueous emulsion | A-1 | A-1 | A-1 | A-1 | A-1 |
| Protective colloid (a1) | B-1 | B-2 | B-3 | B-4 | B-5 |
| Mixing ratio of emulsion to protective colloid | 50/50 | 50/50 | 50/50 | 50/50 | 50/50 |
| Physical properties of mortar |  |  |  |  |  |
| Mixing time(sec) | 20 | 20 | 20 | 20 | 20 |
| Trowelability | A | A | A | A | B |
| Flexural strength (kg/cm$^2$) 7 Days | 80 | 75 | 76 | 78 | 75 |
| 28 Days | 140 | 135 | 130 | 120 | 100 |
| Compression strength (kg/cm$^2$) 7 Days | 215 | 200 | 210 | 220 | 200 |
| 28 Days | 350 | 345 | 350 | 345 | 290 |

TABLE 6-5

Compositions and evaluation results of redispersible polymer powders (2)

| Example | 6 | 7 | 8 | 9 | 10 |
|---|---|---|---|---|---|
| Aqueous emulsion | A-1 | A-1 | A-1 | A-1 | A-1 |
| Protective colloid (a1) | B-6 | B-7 | B-8 | B-1 | B-4 |
| Mixing ratio of emulsion to protective colloid | 50/50 | 50/50 | 50/50 | 70/30 | 50/50 |
| Powdering Method | Flocculation | Flocculation | Flocculation | Flocculation | Flocculation |
| Polyvalent metal salt | Al$_2$(SO$_4$)$_3$ | Al$_2$(SO$_4$)$_3$ | Al$_2$(SO$_4$)$_3$ | Al$_2$(SO$_4$)$_3$ | FeSO$_4$ |
| Yield | A | B | A | B | A |
| Physical proeprties of resin |  |  |  |  |  |
| Redispersibility | A | A | A | A | A |
| External appearance of redispersion | Milky white | Milky white | Milky white | Milky white | Milky white |
| Room-temperature film-forming properties | A | A | A | A | A |

TABLE 6-6

Compositions and evaluation results of redispersible polymer powders (2) (Cont'd)

| Example | 6 | 7 | 8 | 9 | 10 |
|---|---|---|---|---|---|
| Aqueous emulsion | A-1 | A-1 | A-1 | A-1 | A-1 |
| Protective colloid (a1) | B-6 | B-7 | B-8 | B-1 | B-4 |
| Mixing ratio of emulsion to protective colloid | 50/50 | 50/50 | 50/50 | 70/30 | 50/50 |
| Physical properties of mortar | | | | | |
| Mixing time(sec) | 20 | 20 | 20 | 20 | 20 |
| Trowelability | B | B | A | A | A |
| Flexural strength (kg/cm$^2$) 7 Days | 73 | 74 | 73 | 73 | 72 |
| 28 Days | 100 | 120 | 110 | 115 | 120 |
| Compression strength (kg/cm$^2$) 7 Days | 195 | 215 | 195 | 205 | 200 |
| 28 Days | 290 | 315 | 290 | 320 | 330 |

TABLE 6-7

Compositions and evaluation results of redispersible polymer powders (3)

| Example | 11 | 12 | 13 | 14 | 15 |
|---|---|---|---|---|---|
| Aqueous emulsion | A-1 | A-1 | A-1 | A-1 | A-1 |
| Protective colloid (a1) | B-4 | B-4 | B-4 | B-4 | B-4 |
| Mixing ratio of emulsion to protective colloid | 50/50 | 50/50 | 50/50 | 50/50 | 50/50 |
| Powdering | | | | | |
| Method | Flocculation | Flocculation | Flocculation | Flocculation | Flocculation |
| Polyvalent metal salt | Al$_2$(SO$_4$)$_3$ | CaCl$_2$ | CaCl$_2$ | Al$_2$(SO$_4$)$_3$ | FeSO$_4$ |
| Yield | A | C | B | B | B |
| Physical proeprties of resin | | | | | |
| Redispersibility | A | A | A | A | A |
| External appearance of redispersion | Milky white | Milky white | Milky white | Milky white | Milky white |
| Room-temperature film-forming properties | A | A | A | A | A |

TABLE 6-8

Compositions and evaluation results of redispersible polymer powders (3) (Cont'd)

| Example | 11 | 12 | 13 | 14 | 15 |
|---|---|---|---|---|---|
| Aqueous emulsion | A-1 | A-1 | A-1 | A-1 | A-1 |
| Protective colloid (a1) | B-4 | B-4 | B-4 | B-4 | B-4 |
| Mixing ratio of emulsion to protective colloid | 50/50 | 50/50 | 50/50 | 50/50 | 50/50 |
| Physical properties of mortar | | | | | |
| Mixing time(sec) | 20 | 20 | 20 | 20 | 20 |
| Trowelability | A | A | A | A | A |
| Flexural strength (kg/cm$^2$) 7 Days | 75 | 72 | 75 | 80 | 78 |
| 28 Days | 125 | 115 | 125 | 130 | 130 |
| Compression strength (kg/cm$^2$) 7 Days | 200 | 210 | 205 | 225 | 215 |
| 28 Days | 350 | 320 | 340 | 330 | 340 |

TABLE 6-9

Compositions and evaluation results of redispersible polymer powders (4)

| Example | 16 | 17 | 18 |
|---|---|---|---|
| Aqueous emulsion | A-2 | A-2 | A-2 |
| Protective colloid (a1) | B-1 | B-4 | B-1 |
| Mixing ratio of emulsion to protective colloid | 50/50 | 50/50 | 50/50 |
| Powdering | | | |
| Method | Flocculation | Flocculation | Flocculation |
| Polyvalent metal salt | Al$_2$(SO$_4$)$_3$ | Al$_2$(SO$_4$)$_3$ | Al$_2$(SO$_4$)$_3$ |
| Yield | B | A | B |
| Physical properties of resin | | | |
| Redispersibility | A | A | A |
| External appearance of redispersion | Milky white | Milky white | Milky white |
| Room-temperature film-forming properties | A | A | A |

TABLE 6-10

Compositions and evaluation results of redispersible polymer powders (4) (Cont'd.)

| Example | 16 | 17 | 18 |
|---|---|---|---|
| Aqueous emulsion | A-2 | A-2 | A-3 |
| Protective colloid (a1) | B-1 | B-4 | B-1 |
| Mixing ratio of emulsion to protective colloid | 50/50 | 50/50 | 50/50 |
| Physical properties of mortar | | | |
| Mixing time(sec) | 20 | 20 | 20 |
| Trowelability | A | A | A |
| Flexural strength (kg/cm$^2$) 7 Days | 70 | 75 | 85 |
| 28 Days | 125 | 130 | 125 |

TABLE 6-10-continued

Compositions and evaluation results of redispersible polymer powders (4) (Cont'd.)

| Example | 16 | 17 | 18 |
|---|---|---|---|
| Compression strength (kg/cm$^2$) 7 Days | 210 | 225 | 205 |
| 28 Days | 330 | 340 | 340 |

TABLE 6-11

Compositions and evaluation results of redispersible polymer powders (5)

| Comparative Example | 1 | 2 | 3 | 4 |
|---|---|---|---|---|
| Aqueous emulsion | A-1 | A-2 | A-3 | Mixtures employed in Examples 1 to 9 and Examples 16 to 18 (separately tested) |
| Protective colloid (a1) | Not used | Not used | Not used | Used |
| Mixing ratio of emulsion to protective colloid | 100/0 | 100/0 | 100/0 | |
| Powdering | | | | |
| Method | Flocculation | Flocculation | Flocculation | Spray drying |
| Polyvalent metal salt | Al$_2$(SO$_4$)$_3$ | Al$_2$(SO$_4$)$_3$ | Al$_2$(SO$_4$)$_3$ | Not used |
| Yield | A | A | A | D |
| Physical properties of resin | | | | |
| Redispersibility | D | D | D | D |
| External appearance of redispersion | Colorless | Colorless | Colorless | Colorless |
| Room-temperature film-forming properties | C | C | C | C |

TABLE 6-12

Compositions and evaluation results of redispersible polymer powders (5) (Cont'd)

| Comparative example | 1 | 2 | 3 | 4 |
|---|---|---|---|---|
| Aqueous emulsion | A-1 | A-2 | A-3 | Mixtures employed in Examples 1 to 9 and Examples (separately tested) |
| Protective colloid (a1) | Not used | Not used | Not used | |
| Mixing ratio of emulsion to protective colloid | 100/0 | 100/0 | 100/0 | |
| Physical properties of mortar | | | | |
| Mixing time (sec) | uncrushable | uncrushable | uncrushable | 20 |
| Trowelability | | | | C |
| Flexural strength (kg/cm$^2$) 7 Days | | | | 30~50 |
| 28 Days | | | | 40~60 |
| Compression strength (kg/cm$^2$) 7 Days | | | | 150~190 |
| 28 Days | | | | 190~230 |

TABLE 6-13

Compositions and evaluation results of redispersible polymer powders (6)

| Comparative exmaple | 5 | |
|---|---|---|
| Aqueous emulsion | A-1 | Physical properties of resin-free mortar |
| Protective colloid (a1) | B-4 | |
| Mixing ratio of emulsion to protective colloid | 50/50 | |
| Powdering | | |
| Method | Flocculation | |
| Polyvalent metal salt | Al$_2$(SO$_4$)$_3$ | |
| Yield | D | |
| Physical properties of resin | | |
| Redispersibility | Not flocculate | |
| External appearance of redispersion | | |
| Room-temperature | | |

TABLE 6-13-continued

Compositions and evaluation results of redispersible polymer powders (6)

Comparative example 5 film-forming
properties

TABLE 6-14

Compositions and evaluation results of redispersible polymer powders (6) (Cont'd)

Comparative example 5

| | | |
|---|---|---|
| Aqueous emulsion | A-1 | Physical properties of resin-free mortar |
| Protective colloid (a1) | B-4 | |
| Mixing ratio of emulsion to protective colloid | 50/50 | |
| Physical properties of mortar | | |

| | |
|---|---|
| Mixing time(sec) | 20 |
| Trowelability | C |
| Flexural strength (kg/cm$^2$) | |
| 7 Days | 40 |
| 28 Days | 55 |
| Compression strength (kg/cm$^2$) | |
| 7 Days | 172 |
| 28 Days | 210 |

TABLE 7-1

Compositions of protective colloids

| | B-1 | B-2 | B-3 | B-4 | B-5 | B-6 | B-7 |
|---|---|---|---|---|---|---|---|
| HEMA | 90.0 | 80.0 | 70.0 | 50.0 | 30.0 | 80.0 | 50.0 |
| HEA | — | — | — | — | — | — | — |
| MAc | 10.0 | 20.0 | 30.0 | 50.0 | 70.0 | — | 45.0 |
| AA | — | — | — | — | — | 20.0 | — |
| AN | — | — | — | — | — | — | 5.0 |
| Tg (° C.) | 66 | 79 | 93 | 123 | 159 | 63 | 118 |

TABLE 7-2

Compositions of aqueous emulsions (1)

| | C-1 | C-2 | C-3 | C-4 | C-5 |
|---|---|---|---|---|---|
| Protective colloid (a1) | B-1 | B-2 | B-3 | B-4 | B-5 |
| | 100.0 | 100.0 | 100.0 | 100.0 | 100.0 |
| Monomer (a2) | | | | | |
| ST | 50.0 | 50.0 | 50.0 | 50.0 | 50.0 |
| BA | 40.0 | 40.0 | 40.0 | 40.0 | 40.0 |
| HEMA | 5.0 | 5.0 | 5.0 | 5.0 | 5.0 |
| MAc | 3.0 | 3.0 | 3.0 | 3.0 | 3.0 |
| AAm | 2.0 | 2.0 | 2.0 | 2.0 | 2.0 |
| n-DM | 0.1 | 0.1 | 0.1 | 0.1 | 0.1 |
| Tg of (a2) (° C.) | 5 | 5 | 5 | 5 | 5 |
| (a2)/(a1) ratio | 50/50 | 50/50 | 50/50 | 50/50 | 50/50 |

TABLE 7-2-continued

Compositions of aqueous emulsions (1)

| | C-6 | C-7 | C-8 |
|---|---|---|---|
| Protective colloid (a1) | B-6 | B-7 | B-2 |
| | 100.0 | 100.0 | 140.0 |
| Monomer (a2) | | | |
| ST | 50.0 | 50.0 | 50.0 |
| BA | 40.0 | 40.0 | 40.0 |
| HEMA | 5.0 | 5.0 | 5.0 |
| MAc | 3.0 | 3.0 | 3.0 |
| AAm | 2.0 | 2.0 | 2.0 |
| n-DM | 0.1 | 0.1 | 0.1 |
| Tg of (a2) (° C.) | 5 | 5 | 5 |
| (a2)/(a1) ratio | 50/50 | 50/50 | 70/30 |

TABLE 7-3

Compositions of aqueous emulsions (2)

| | C-9 | C-10 | C-11 | C-12 | C-13 | C-14 |
|---|---|---|---|---|---|---|
| Protective colloid (a1) | B-1 | B-2 | B-2 | Not used | Not used | Not used |
| | 100.0 | 100.0 | 100.0 | | | |
| Monomer (a2) | | | | | | |
| MMA | 30.0 | 30.0 | — | — | 30.0 | — |
| ST | — | — | 28.0 | 50.0 | — | 28.0 |
| BA | 60.0 | 60.0 | — | 40.0 | 60.0 | — |
| BD | — | — | 70.0 | — | — | 70.0 |
| HEMA | 5.0 | 5.0 | — | 5.0 | 5.0 | — |
| MAc | 3.0 | 3.0 | — | 3.0 | 3.0 | — |
| AA | — | — | 2.0 | — | — | 2.0 |
| AAm | 2.0 | 2.0 | — | 2.0 | 2.0 | — |
| n-DM | 0.1 | 0.1 | — | 0.1 | 0.1 | — |
| t-DM | — | — | 0.3 | — | — | 0.3 |
| Tg of (a2) (° C.) | −10 | −10 | −24 | 3 | −10 | −24 |
| (a2)/(a1) ratio | 50/50 | 50/50 | 50/50 | 100/0 | 100/0 | 100/0 |

TABLE 7-4

Compositions and Evaluation Results of Redispersible polymer powders (1)

| Example | 1 | 2 | 3 | 4 | 5 |
|---|---|---|---|---|---|
| Aqueous emulsion | C-1 | C-2 | C-3 | C-4 | C-5 |
| Powdering Method | Floccu-lation | Floccu-lation | Floccu-lation | Floccu-lation | Floccu-lation |
| Polyvalent metal salt | Al$_2$(SO$_4$)$_3$ | Al$_2$(SO$_4$)$_3$ | Al$_2$(SO$_4$)$_3$ | Al$_2$(SO$_4$)$_3$ | Al$_2$(SO$_4$)$_3$ |
| Yield | B | A | A | A | A |
| Physical properties of resin | | | | | |
| Redispersibility | A | A | A | A | A |
| External appearance of redispersion | Milky white | Milky white | Milky white | Milky white | Milky white |
| Room-temperature film-forming | A | A | A | A | A |

TABLE 7-4-continued

Compositions and Evaluation Results of Redispersible polymer powders (1)

| properties | | | | | |
|---|---|---|---|---|---|
| Example | 1 | 2 | 3 | 4 | 5 |
| Aqueous emulsion | C-1 | C-2 | C-3 | C-4 | C-5 |
| Physical properties of mortar | | | | | |
| Mixing time(sec) | 20 | 20 | 20 | 20 | 20 |
| Trowelability | A | A | A | A | B |
| Flexural strength (kg/cm$^2$) | | | | | |
| 7 Days | 72 | 75 | 75 | 71 | 75 |
| 28 Days | 125 | 130 | 125 | 130 | 130 |
| Compression strength (kg/cm$^2$) | | | | | |
| 7 Days | 210 | 215 | 220 | 215 | 195 |
| 28 Days | 345 | 350 | 340 | 340 | 290 |

| Example | 6 | 7 | 8 |
|---|---|---|---|
| Aqueous emulsion | C-6 | C-7 | C-8 |
| Powdering | | | |
| Method | Flocculation | Flocculation | Flocculation |
| Polyvalent metal salt | Al$_2$(SO$_4$)$_3$ | Al$_2$(SO$_4$)$_3$ | Al$_2$(SO$_4$)$_3$ |
| Yield | A | B | B |
| Physical properties of resin | | | |
| Redispersibility | A | A | B |
| External appearance of redispersion | Milky white | Milky white | Milky white |
| Room-temperature film-forming properties | A | A | A |

| Example | 6 | 7 | 8 |
|---|---|---|---|
| Aqueous emulsion | C-6 | C-7 | C-8 |
| Physical properties of mortar | | | |
| Mixing time (sec) | 20 | 20 | 20 |
| Trowelability | A | A | A |
| Flexural strength (kg/cm$^2$) | | | |
| 7 Days | 75 | 72 | 70 |
| 28 Days | 135 | 130 | 130 |
| Compression strength (kg/cm$^2$) | | | |
| 7 Days | 200 | 205 | 190 |
| 28 Days | 285 | 290 | 280 |

TABLE 7-5

Compositions and evaluation results of redispersible polymer powders (2)

| Example | 9 | 10 | 11 | 12 | 13 |
|---|---|---|---|---|---|
| Aqueous emulsion | C-2 | C-2 | C-2 | C-2 | C-2 |
| Powdering | | | | | |
| Method | Flocculation | Flocculation | Flocculation | Flocculation | Flocculation |
| Polyvalent metal salt | FeSO$_4$ | Al$_2$(SO$_4$)$_3$ | CaCl$_2$ | CaCl$_2$ | Al$_2$(SO$_4$)$_3$ |
| Yield | A | A | C | B | B |
| Physical properties of resin | | | | | |
| Redispersibility | A | A | A | A | A |
| External appearance of redispersion | Milky white | Milky white | Milky white | Milky white | Milky white |
| Room-temperature film-forming properties | A | A | A | A | A |

| Example | 9 | 10 | 11 | 12 | 13 |
|---|---|---|---|---|---|
| Aqueous emulsion | C-2 | C-2 | C-2 | C-2 | C-2 |
| Physical properties of mortar | | | | | |
| Mixing time (sec) | 20 | 20 | 20 | 20 | 20 |
| Trowelability | B | B | A | A | A |
| Flexural strength (kg/cm$^2$) | | | | | |
| 7 Days | 80 | 80 | 80 | 72 | 70 |
| 28 Days | 140 | 140 | 140 | 140 | 130 |
| Compression strength (kg/cm$^2$) | | | | | |
| 7 Days | 205 | 200 | 200 | 195 | 205 |
| 28 Days | 285 | 300 | 280 | 300 | 310 |

| Example | 14 | 15 | 16 | 17 |
|---|---|---|---|---|
| Aqueous emulsion | C-2 | C-9 | C-10 | C-11 |
| Powdering | | | | |
| Method | Flocculation | Flocculation | Flocculation | Flocculation |
| Polyvalent metal salt | Al$_2$(SO$_4$)$_3$ | Al$_2$(SO$_4$)$_3$ | Al$_2$(SO$_4$)$_3$ | Al$_2$(SO$_4$)$_3$ |
| Yield | B | A | B | A |
| Physical properties of resin | | | | |
| Redispersibility | A | A | A | A |
| External appearance of | Milky white | Milky white | Milky white | Milky white |

TABLE 7-5-continued

Compositions and evaluation results of redispersible polymer powders (2)

| redispersion Room-temperature film-forming properties | A | A | A | A |
|---|---|---|---|---|
| Example | 14 | 15 | 16 | 17 |
| Aqueous emulsion | C-2 | C-9 | C-10 | C-11 |
| Physical properties of mortar | | | | |
| Mixing time (sec) | 20 | 20 | 20 | 20 |
| Trowelability | A | A | A | A |
| Flexural strength (kg/cm$^2$) | | | | |
| 7 Days | 75 | 70 | 80 | 75 |
| 28 Days | 125 | 130 | 140 | 135 |
| Compression strength (kg/cm$^2$) | | | | |
| 7 Days | 205 | 225 | 200 | 200 |
| 28 Days | 310 | 330 | 305 | 305 |

TABLE 7-6

Compositions and evaluation results of redispersible polymer powders (3)

| Comparative example | 1 | 2 | 3 | 4 |
|---|---|---|---|---|
| Aqueous emulsion | C-12 | C-13 | C-14 | C-1 to C-11 (tested separately) |
| Protective colloid | Not used | Not used | Not used | Used |
| Powdering | | | | |
| Method | Flocculation | Flocculation | Flocculation | Spray drying |
| Polyvalent metal salt | Al$_2$(SO$_4$)$_3$ | Al$_2$(SO$_4$)$_3$ | Al$_2$(SO$_4$)$_3$ | Not used |
| Yield | A | A | A | D |
| Physical properties of resin | | | | |
| Redispersibility | D | D | D | D |
| External appearance of redispersion | Colorless | Colorless | Colorless | Colorless |
| Room-temperature film-forming properties | C | C | C | C |

| Comparative example | 1 | 2 | 3 | 4 |
|---|---|---|---|---|
| Aqueous emulsion | C-12 | C-13 | C-14 | C-1 to C-11 (tested separately) |
| Protective colloid | Not used | Not used | Not used | Used |
| Physical properties of mortar | | | | |
| Mixing time (sec) | | | | 20 |

TABLE 7-6-continued

Compositions and evaluation results of redispersible polymer powders (3)

| Trowelability | uncrushable | uncrushable | uncrushable | C |
|---|---|---|---|---|
| Flexural strength (kg/cm$^2$) | | | | |
| 7 Days | | | | 30~50 |
| 28 Days | | | | 40~60 |
| Compression strength (kg/cm$^2$) | | | | |
| 7 Days | | | | 150~190 |
| 28 Days | | | | 190~230 |

Comparative example 5

| Aqueous emulsion | C-2 | Physical properties of resin-free mortar |
|---|---|---|
| Protective colloid | Used | |
| Powdering | | |
| Method | Flocculation | |
| Polyvalent metal salt | Al$_2$(SO$_4$)$_3$ | |
| Yield | D | |
| Physical properties of resin | | |
| Redispersibility | Not flocculated | |
| External appearance of Room-temperature film-forming properties | | |

Comparative example 5

| Aqueous emulsion | C-2 | Physical properties of resin-free mortar |
|---|---|---|
| Protective colloid | Used | |
| Physical properties of mortar | | |
| Mixing time (sec) | 20 | |
| Trowelability | C | |
| Flexural strength (kg/cm$^2$) | | |
| 7 Days | 40 | |
| 28 Days | 55 | |
| Compression strength (kg/cm$^2$) | | |
| 7 Days | 172 | |
| 28 Days | 210 | |

TABLE 8-1

Compositions of aqueous emulsions obtained in step 1

| | A-1 | A-2 | A-3 |
|---|---|---|---|
| MMA | — | 30.0 | — |
| ST | 50.0 | — | 28.0 |
| BA | 40.0 | 60.0 | — |
| BD | — | — | 70.0 |
| HEMA | 5.0 | 5.0 | — |

TABLE 8-1-continued

Compositions of aqueous emulsions obtained in step 1

|  | A-1 | A-2 | A-3 |
|---|---|---|---|
| MAc | 3.0 | 3.0 | — |
| AA | — | — | 2.0 |
| AAm | 2.0 | 2.0 | — |
| n-DM | 0.1 | 0.1 | — |
| t-DM | — | — | 0.3 |
| Tg of Aqueous emulsion (° C.) | 5 | −10 | −24 |

TABLE 8-2

Compositions of aqueous emulsions obtained in step 2

|  | C-1 | C-2 | C-3 | C-4 | C-5 |
|---|---|---|---|---|---|
| Aqueous emulsion of step 1 | A-1 100.0 | A-1 100.0 | A-1 100.0 | A-1 100.0 | A-1 100.0 |
| Mononer(s) of shells |  |  |  |  |  |
| MEMA | 90.0 | 80.0 | 70.0 | 50.0 | 30.0 |
| HEA | — | — | — | — | — |
| MAc | 10.0 | 20.0 | 30.0 | 50.0 | 70.0 |
| AA | — | — | — | — | — |
| AN | — | — | — | — | — |
| Tg of shells (° C.) | 66 | 79 | 93 | 123 | 159 |
| Ratio of aqueous emulsion of step 1 to shells | 50/50 | 50/50 | 50/50 | 50/50 | 50/50 |

TABLE 8-3

Compositions of aqueous emulsions obtained in step 2 (Cont'd)

|  | C-6 | C-7 | C-8 | C-9 | C-10 | C-11 |
|---|---|---|---|---|---|---|
| Aqueous emulsion of step 1 | A-1 100.0 | A-1 100.0 | A-1 140.0 | A-2 100.0 | A-2 100.0 | A-3 100.0 |
| Mononer(s) of shells |  |  |  |  |  |  |
| HEMA | 80.0 | 50.0 | 54.0 | 90.0 | 80.0 | 90.0 |
| HEA | — | — | — | — | — | — |
| MAc | — | 45.0 | 6.0 | 10.0 | 20.0 | 10.0 |
| AA | 20.0 | — | — | — | — | — |
| AN | — | 5.0 | — | — | — | — |
| Tg of shells (° C.) | 63 | 118 | 66 | 66 | 79 | 66 |
| Ratio of aqueous emulsion of step 1 to shells | 50/50 | 50/50 | 70/30 | 50/50 | 50/50 | 50/50 |

TABLE 8-4

Compositions and Evaluation Results of Redispersible Polymer Powders (1)

| Example | 1 | 2 | 3 | 4 | 5 |
|---|---|---|---|---|---|
| Aqueous emulsion of step 2 | C-1 | C-2 | C-3 | C-4 | C-5 |
| Powdering |  |  |  |  |  |
| Method | Flocculation | Flocculation | Flocculation | Flocculation | Flocculation |
| Polyvalent metal | $Al_2(SO_4)_3$ | $Al_2(SO_4)_3$ | $Al_2(SO_4)_3$ | $Al_2(SO_4)_3$ | $Al_2(SO_4)_3$ |
| Yield | B | A | A | A | A |
| Physical properties of resin |  |  |  |  |  |
| Redispersibility | A | A | A | A | A |
| External Apperance of re-dispersion | Milky white | Milky white | Milky white | Milky white | Milky white |
| Room-temperature film-forming properties | A | A | A | A | A |

TABLE 8-5

Compositions and evaluation results of redispersible polymer powders (1) (Cont'd)

| Example | 1 | 2 | 3 | 4 | 5 |
|---|---|---|---|---|---|
| Aqueous emulsion of step 2 | C-1 | C-2 | C-3 | C-4 | C-5 |
| Physical properties of mortar |  |  |  |  |  |
| Mixing time(sec) | 20 | 20 | 20 | 20 | 20 |
| Trowelability | A | A | A | A | B |
| Flexural Strength (kg/cm$^2$) |  |  |  |  |  |
| 7 days | 73 | 76 | 74 | 72 | 70 |
| 28 days | 130 | 140 | 135 | 135 | 125 |
| Compression Strength (kg/cm$^2$) |  |  |  |  |  |
| 7 days | 210 | 225 | 220 | 220 | 200 |
| 28 days | 330 | 350 | 350 | 350 | 290 |

TABLE 8-6

Compositions and evaluation-results of redispersible polymer powders (2)

| Example | 6 | 7 | 8 |
|---|---|---|---|
| Aqueous emulsion of step 2 | C-6 | C-7 | C-8 |
| Powdering |  |  |  |
| Method | Flocculation | Flocculation | Flocculation |
| Polyvalent metal salt | $Al_2(SO_4)_3$ | $Al_2(SO_4)_3$ | $Al_2(SO_4)_3$ |
| Yield | A | A | A |
| Physical properties |  |  |  |

TABLE 8-6-continued

Compositions and evaluation-results of redispersible polymer powders (2)

| Example | 6 | 7 | 8 |
|---|---|---|---|
| of resin | | | |
| Redispersibility | A | A | A |
| External Apperance of redispersion | Milky white | Milky white | Milky white |
| Room-temperature film-forming properties | A | A | A |

TABLE 8-7

Compositions and evaluation results of redispersible polymer powders (2) (Cont'd)

| Example | 6 | 7 | 8 |
|---|---|---|---|
| Aqueous emulsion of step 2 | C-6 | C-7 | C-8 |
| Physical properties of mortar | | | |
| Mixing time (sec) | 20 | 20 | 20 |
| Trowelability | A | A | A |
| Flexural Strength (kg/cm$^2$) | | | |
| 7 days | 80 | 70 | 75 |
| 28 days | 130 | 125 | 125 |
| Compression Strength (kg/cm$^2$) | | | |
| 7 days | 195 | 200 | 200 |
| 28 days | 280 | 295 | 320 |

TABLE 8-8

Compositions and Evaluation Results of Redispersible Polymer Powders (3)

| Example | 9 | 10 | 11 | 12 |
|---|---|---|---|---|
| Aqueous emulsion of step 2 | C-9 | C-10 | C-11 | C-2 |
| Powdering | | | | |
| Method | Flocculation | Flocculation | Flocculation | Flocculation |
| Polyvalent metal salt | Al$_2$(SO$_4$)$_3$ | Al$_2$(SO$_4$)$_3$ | Al$_2$(SO$_4$)$_3$ | FeSO$_4$ |
| Yield | B | A | A | A |
| Physical properties of resin | | | | |
| Redispersibility | A | A | A | A |
| External Apperance of redispersion | Milky white | Milky white | Milky white | Milky white |
| Room-temperature film-forming properties | A | A | A | A |

TABLE 8-9

Compositions and evaluation results of redispersible polymer powders (3) (Cont'd)

| Example | 9 | 10 | 11 | 12 |
|---|---|---|---|---|
| Aqueous emulsion of step 2 | C-9 | C-10 | C-11 | C-2 |
| Physical properties of mortar | | | | |
| Mixing time (sec) | 20 | 20 | 20 | 20 |
| Trowelability | A | A | A | A |
| Flexural strength (kg/cm$^2$) | | | | |
| 7 days | 85 | 70 | 72 | 73 |
| 28 days | 145 | 130 | 120 | 130 |
| Compression strength (kg/cm$^2$) | | | | |
| 7 days | 200 | 200 | 205 | 210 |
| 28 days | 310 | 335 | 330 | 325 |

TABLE 8-10

Compositions and evaluation results of redispersible polymer powders (4)

| Example | 13 | 14 | 15 | 16 | 17 |
|---|---|---|---|---|---|
| Aqueous emulsion | C-2 | C-2 | C-2 | C-2 | C-2 |
| Powdering | | | | | |
| Method | Flocculation | Flocculation | Flocculation | Flocculation | Flocculation |
| Polyvalent metal salt | Al$_2$(SO$_4$)$_3$ | CaCl$_2$ | CaCl$_2$ | Al$_2$(SO$_4$)$_3$ | Al$_2$(SO$_4$)$_3$ |
| Yield | B | C | B | C | A |
| Physical properties of resin | | | | | |
| Redispersibility | A | A | A | A | A |
| External of redispersion | Milky white | Milky white | Milky white | Milky white | Milky white |
| Room-temperature film-forming properties | A | A | A | A | A |

TABLE 8-11

Compositions and evaluation results of redispersible polymer powders (4) (Cont'd)

| Example | 13 | 14 | 15 | 16 | 17 |
|---|---|---|---|---|---|
| Aqueous emulsion of step 2 | C-2 | C-2 | C-2 | C-2 | C-2 |
| Physical properties of mortar | | | | | |
| Mixing time (sec) | 20 | 20 | 20 | 20 | 20 |
| Trowelability | A | A | A | A | A |
| Flexural strength (kg/cm$^2$) | | | | | |
| 7 days | 73 | 72 | 80 | 70 | 73 |
| 28 days | 130 | 130 | 135 | 130 | 135 |

TABLE 8-11-continued

Compositions and evaluation results of redispersible polymer powders (4) (Cont'd)

| Example | 13 | 14 | 15 | 16 | 17 |
|---|---|---|---|---|---|
| Compression strength (kg/cm$^2$) | | | | | |
| 7 days | 200 | 200 | 215 | 200 | 210 |
| 28 days | 340 | 330 | 335 | 300 | 305 |

TABLE 8-12

Compositions and evaluation results of redispersible polymer powders (5)

| Comparative example | 1 | 2 | 3 | 4 |
|---|---|---|---|---|
| Aqueous emulsion | A-1 | A-2 | A-3 | C-1 to C-11 (tested separately) |
| Shells (S) | Not used | Not used | Not used | Used |
| Powdering Method | Flocculation | Flocculation | Flocculation | Spray drying |
| Polyvalent metal salt | Al$_2$(SO$_4$)$_3$ | Al$_2$(SO$_4$)$_3$ | Al$_2$(SO$_4$)$_3$ | Not used |
| Yield | A | A | A | D |
| Physical properties of resin | | | | |
| Redispersibility | D | D | D | D |
| External appearance of redispersion | Colorless | Colorless | Colorless | Colorless |
| Room-temperature film-forming properties | C | C | C | C |

TABLE 8-13

Compositions and evaluation results redispersible polymer powders (5) (Cont'd.)

| Comparative example | 1 | 2 | 3 | 4 |
|---|---|---|---|---|
| Aqueous emulsion | C-1 | C-2 | C-3 | C-1 to C-11 (tested separately) |
| Shells (S) | Not used | Not used | Not Used | Used |
| Physical properties of mortar | | | | |
| Mixing time (sec) | uncrushable | uncrushable | uncrushable | 20 |
| Trowelability | | | | C |
| Flexural strength (kg/cm$^2$) | | | | |
| 7 Days | | | | 30~50 |
| 28 Days | | | | 40~60 |
| Compression strength (kg/cm$^2$) | | | | |
| 7 Days | | | | 150~190 |
| 28 Days | | | | 190~230 |

TABLE 8-14

Compositions and evaluation results redispersible polymer powders (6)

| Example | 5 | |
|---|---|---|
| Aqueous emulsion | C-2 | Physical properties of resin-free mortar |
| Shells (S) | Used | |
| Powdering Method | Flocculation | |
| Polyvalent metal salt | Al$_2$(SO$_4$)$_3$ | |
| Yield | D | |
| Physical properties of resin | | |
| Redispersibility | Not flocculated | |
| External appearance of Room-temperature film-forming properties | | |

TABLE 8-15

Compositions and evaluation results redispersible polymer powders (6) (Cont'd.)

| Comparative example | 5 | |
|---|---|---|
| Aqueous emulsion | C-2 | Physical properties of resin-free mortar |
| Shells (S) | Used | |
| Physical properties of mortar | | |
| Mixing time (sec) | 20 | |
| Trowelability | C | |
| Flexural strength (kg/cm$^2$) | | |
| 7 Days | 40 | |
| 28 Days | 55 | |
| Compression strength (kg/cm$^2$) | | |
| 7 Days | 172 | |
| 28 Days | 210 | |

TABLE 9-1

Compositions of aqueous emulsions

| | A-1 | A-2 | A-3 |
|---|---|---|---|
| MMA | — | 50.0 | — |
| ST | 50.0 | — | 28.0 |
| BA | 40.0 | 40.0 | — |
| BD | — | — | 70.0 |
| HEMA | 5.0 | 5.0 | — |
| MAc | 3.0 | 3.0 | — |
| AA | — | — | 2.0 |
| AAm | 2.0 | 2.0 | — |
| n-DM | 0.1 | 0.1 | — |
| t-DM | — | — | 0.3 |
| Tg of Aqueous emulsions (° C.) | 5 | −10 | −24 |

TABLE 9-2

Compositions of protective colloid (a1)

| | B-1 | B-2 | B-3 | B-4 | B-5 | B-6 | B-7 |
|---|---|---|---|---|---|---|---|
| HEMA | 90.0 | 80.0 | 70.0 | 50.0 | 30.0 | 70.0 | 50.0 |
| HEA | — | — | — | — | — | — | — |
| MAc | 10.0 | 20.0 | 30.0 | 50.0 | 70.0 | 20.0 | 45.0 |

TABLE 9-2-continued

Compositions of protective colloid (a1)

|      | B-1 | B-2 | B-3 | B-4 | B-5 | B-6  | B-7 |
|------|-----|-----|-----|-----|-----|------|-----|
| AA   | —   | —   | —   | —   | —   | 10.0 | —   |
| AN   | —   | —   | —   | —   | —   | —    | 5.0 |
| Tg (° C.) | 66 | 79 | 93 | 123 | 159 | 84 | 118 |

TABLE 9-3

Compositions and evaluation results of redispersible polymer powders (1)

| Example | 1 | 2 | 3 | 4 | 5 |
|---|---|---|---|---|---|
| Aqueous emulsion | A-1 | A-1 | A-1 | A-1 | A-1 |
| Protective colloid (a1) | B-1 | B-2 | B-3 | B-4 | B-5 |
| Mixing ratio of emulsion to protective colloid | 50/50 | 50/50 | 50/50 | 50/50 | 50/50 |
| Powdering | | | | | |
| Method | Flocculation | Flocculation | Flocculation | Flocculation | Flocculation |
| Polyvalent metal salt | $Al_2(SO_4)_3$ | $Al_2(SO_4)_3$ | $Al_2(SO_4)_3$ | $Al_2(SO_4)_3$ | $Al_2(SO_4)_3$ |
| Yield | A | A | A | A | A |
| Physical properties of resin | | | | | |
| Redispersibility | A | A | A | A | A |
| External appearance of redispersion | Milky white | Milky white | Milky white | Milky white | Milky white |
| Room-temperature film-forming properties | A | A | A | A | A |

TABLE 9-4

Compositions and evaluation results of redispersible polymer powders (1) (Cont'd)

| Example | 1 | 2 | 3 | 4 | 5 |
|---|---|---|---|---|---|
| Aqueous emulsion | A-1 | A-1 | A-1 | A-1 | A-1 |
| Protective colloid (a1) | B-1 | B-2 | B-3 | B-4 | B-5 |
| Mixing ratio of emulsion to protective colloid | 50/50 | 50/50 | 50/50 | 50/50 | 50/50 |
| Physical properties of mortar | | | | | |
| Mixing time (sec) | 20 | 20 | 20 | 20 | 20 |
| Trowelability | A | A | A | A | B |
| Flexural strength (kg/cm$^2$) | | | | | |
| 7 Days | 75 | 80 | 76 | 78 | 75 |
| 28 Days | 135 | 140 | 130 | 120 | 100 |
| Compression strength (kg/cm$^2$) | | | | | |
| 7 Days | 205 | 215 | 210 | 220 | 200 |
| 28 Days | 345 | 350 | 350 | 345 | 290 |

TABLE 9-5

Compositions and evaluation results of redispersible polymer powders (2)

| Example | 6 | 7 | 8 |
|---|---|---|---|
| Aqueous emulsion | A-1 | A-1 | A-1 |
| Protective colloid (a1) | B-6 | B-7 | B-2 |

TABLE 9-5-continued

Compositions and evaluation results of redispersible polymer powders (2)

| Example | 6 | 7 | 8 |
|---|---|---|---|
| Mixing ratio of emulsion to protective colloid | 50/50 | 50/50 | 70/30 |
| Powdering | | | |
| Method | Flocculation | Flocculation | Flocculation |
| Polyvalent metal salt | $Al_2(SO_4)_3$ | $Al_2(SO_4)_3$ | $Al_2(SO_4)_3$ |
| Yield | A | A | A |
| Physical properties of resin | | | |
| Redispersibility | A | A | A |
| External appearance of redispersion | Milky white | Milky white | Milky white |
| Room-temperature film-forming properties | A | A | A |

TABLE 9-6

Compositions and evaluation results of redispersible polymer powders (2) (Cont'd.)

| Example | 6 | 7 | 8 |
|---|---|---|---|
| Aqueous emulsion | A-1 | A-1 | A-1 |
| Protective colloid (a1) | B-6 | B-7 | B-2 |
| Mixing ratio of emulsion to protective colloid | 50/50 | 50/50 | 70/30 |

TABLE 9-6-continued

Compositions and evaluation results of redispersible polymer powders (2) (Cont'd.)

| Example | 6 | 7 | 8 |
|---|---|---|---|
| Physical properties of mortar | | | |
| Mixing time (sec) | 20 | 20 | 20 |
| Trowelability | A | A | A |
| Flexural strength (kg/cm$^2$) | | | |
| 7 Days | 73 | 73 | 72 |
| 28 Days | 120 | 120 | 115 |
| Compression strength (kg/cm$^2$) | | | |
| 7 Days | 195 | 205 | 200 |
| 28 Days | 300 | 320 | 330 |

TABLE 9-7

Compositions and evaluation results of redispersible polymer powders (3)

| Example | 9 | 10 | 11 | 12 |
|---|---|---|---|---|
| Aqueous emulsion | A-1 | A-1 | A-1 | A-1 |
| Protective colloid (a1) | B-2 | B-2 | B-2 | B-2 |
| Mixing ratio of emulsion to protective colloid | 50/50 | 50/50 | 50/50 | 50/50 |
| Powdering | | | | |
| Method | Flocculation | Flocculation | Flocculation | Flocculation |

TABLE 9-7-continued

Compositions and evaluation results of redispersible polymer powders (3)

| Example | 9 | 10 | 11 | 12 |
|---|---|---|---|---|
| Polyvalent metal salt | FeSO$_4$ | Al$_2$(SO$_4$)$_3$ | CaCl$_2$ | CaCl$_2$ |
| Yield | A | A | C | B |
| Physical properties of resin | | | | |
| Redispersibility | A | A | A | A |
| External appearance of redispersion | Milky white | Milky white | Milky white | Milky white |
| Room-temperature film-forming properties | A | A | A | A |

TABLE 9-8

Compositions and evaluation results of redispersible polymer powders (3) (Cont'd)

| Example | 9 | 10 | 11 | 12 |
|---|---|---|---|---|
| Aqueous emulsion | A-1 | A-1 | A-1 | A-1 |
| Protective colloid (a1) | B-2 | B-2 | B-2 | B-2 |
| Mixing ratio of emulsion to protective colloid | 50/50 | 50/50 | 50/50 | 50/50 |
| Physical properties of mortar | | | | |
| Mixing time (sec) | 20 | 20 | 20 | 20 |
| Trowelability | A | A | A | A |
| Flexural strength (kg/cm$^2$) | | | | |
| 7 Days | 75 | 72 | 78 | 75 |
| 28 Days | 120 | 125 | 130 | 130 |
| Compression strength (kg/cm$^2$) | | | | |
| 7 Days | 210 | 205 | 215 | 215 |
| 28 Days | 330 | 325 | 330 | 335 |

TABLE 9-9

Compositions and evaluation results of redispersible polymer powders (4)

| Example | 13 | 14 | 15 | 16 | 17 |
|---|---|---|---|---|---|
| Aqueous emulsion | A-1 | A-1 | A-2 | A-2 | A-3 |
| Protective colloid (a1) | B-2 | B-2 | B-1 | B-2 | B-2 |
| Mixing ratio of emulsion to protective colloid | 50/50 | 50/50 | 50/50 | 50/50 | 50/50 |
| Powdering | | | | | |
| Method | Flocculation | Flocculation | Flocculation | Flocculation | Flocculation |
| Polyvalent metal | Al$_2$(SO$_4$)$_3$ | Al$_2$(SO$_4$)$_3$ | Al$_2$(SO$_4$)$_3$ | Al$_2$(SO$_4$)$_3$ | Al$_2$(SO$_4$)$_3$ |
| Yield | B | A | B | A | A |
| Physical properties of resin | | | | | |
| Redispersibility | A | A | A | A | A |
| External appearance of redispersion | Milky white | milky white | milky white | milky white | milky white |
| Room-temperature film-forming properties | A | A | A | A | A |

TABLE 9-10

Compositions and evaluation results of redispersible polymer powders (4) (Cont'd.)

| Example | 13 | 14 | 15 | 16 | 17 |
|---|---|---|---|---|---|
| Aqueous emulsion | A-1 | A-1 | A-2 | A-2 | A-3 |
| Protective colloid (a1) | B-2 | B-2 | B-1 | B-2 | B-2 |
| Mixing ratio of emulsion to protective colloid | 50/50 | 50/50 | 50/50 | 50/50 | 50/50 |
| Physical properties of mortar | | | | | |
| Mixing time (sec) | 20 | 20 | 20 | 20 | 20 |
| Trowelability | A | A | A | A | A |
| Flexural strength (kg/cm$^2$) | | | | | |
| 7 Days | 70 | 75 | 85 | 80 | 85 |
| 28 Days | 125 | 130 | 125 | 130 | 135 |
| Compression strength (kg/cm$^2$) | | | | | |
| 7 Days | 215 | 220 | 205 | 210 | 215 |
| 28 Days | 335 | 335 | 330 | 315 | 320 |

TABLE 9-11

Compositions and evaluation results of redispersible polymer powders (5)

| Comparative Example | 1 | 2 | 3 | 4 |
|---|---|---|---|---|
| Aqueous emulsion | A-1 | A-2 | A-3 | Mixtures employed in Examples 1 to 8 and Examples 15 to 17 (separately rested) |
| Protective Colloid (a1) | Not used | Not used | Not used | |
| Mixing ratio of emulsion to protective colloid | 100/0 | 100/0 | 100/0 | |
| Powdering | | | | |
| Method | Flocculation | Flocculation | Flocculation | Spray drying |
| Polyvalent metal salt | Al$_2$(SO$_4$)$_3$ | Al$_2$(SO$_4$)$_3$ | Al$_2$(SO$_4$)$_3$ | Not used |
| Yield | A | A | A | D |
| Physical properties of resin | | | | |
| Redispersibility | D | D | D | D |
| External appearance of redispersion | Colorless | Colorless | Colorless | Colorless |
| Room-temperature film-forming properties | C | C | C | C |

TABLE 9-12

Compositions and evaluation results of redispersible polymer powders (5) (Cont'd)

| Comparative example | 1 | 2 | 3 | 4 |
|---|---|---|---|---|
| Aqueous emulsion | A-1 | A-2 | A-3 | Mixtures employed in Examples 1 to 9 and Examples 15 to 17 (separately rested) |
| Protective colloid (a1) | Not used | Not used | Not used | |
| Mixing ratio of emulsion to protective colloid | 100/0 | 100/0 | 100/0 | |

TABLE 9-12-continued

Compositions and evaluation results of redispersible polymer powders (5) (Cont'd)

| Comparative example | 1 | 2 | 3 | 4 |
|---|---|---|---|---|
| Physical properties of mortar | | | | |
| Mixing time (sec) | un- | un- | un- | 20 |
| Trowelability | crush- | crush- | crush- | C |
| Flexural strength | able | able | able | |

TABLE 9-12-continued

Compositions and evaluation results of redispersible polymer powders (5) (Cont'd)

| Comparative example | 1 | 2 | 3 | 4 |
|---|---|---|---|---|
| (kg/cm$^2$) | | | | |
| 7 Days | | | | 30~50 |
| 28 Days | | | | 40~60 |
| Compression strength (kg/cm$^2$) | | | | |
| 7 Days | | | | 150~190 |
| 28 Days | | | | 190~230 |

TABLE 9-13

Compositions and evaluation results of redispersible polymer powders (6)

| Comparative example | 5 | |
|---|---|---|
| Aqueous emulsion | A-1 | Physical properties of resin-free mortar |
| Protective colloid (a1) | B-2 | |
| Mixing ratio of emulsion to protective colloid | 50/50 | |
| Powdering | | |
| Method | Flocculation | |
| Polyvalent metal salt | $Al_2(SO_4)_3$ | |
| Yield | D | |
| Physical properties of resin | | |
| Redispersibility | Not flocculate | |
| External appearance of redispersion | | |
| Room-temperature film-forming properties | | |

TABLE 9-14

Compositions and evaluation results of redispersible polymer powders (6) (Cont'd)

| Comparative example | 5 | |
|---|---|---|
| Aqueous emulsion | A-1 | Physical properties of resin-free mortar |
| Protective colloid (a1) | B-2 | |
| Mixing ratio of emulsion to protective colloid | 50/50 | |
| Physical properties of mortar | | |
| Mixing time (sec) | 20 | |
| Trowelability | C | |
| Flexural strength (kg/cm²) | | |
| 7 Days | 40 | |
| 28 Days | 55 | |
| Compression strength (kg/cm²) | | |
| 7 Days | 172 | |
| 28 Days | 210 | |

What is claimed is:

1. A (co)polymer having a function to be substantially redispersible in water of pH 5 or higher, wherein:

said (co)polymer is a mixture of particles (A) and a protective colloid;

said particles (A) are made of a (co)polymer (α2) composed of a recurring unit and 0 wt. % or more but less than 40 wt. % of at least one recurring unit selected from the group consisting of recurring units having pendant groups represented by the following formula (1) and the group consisting of recurring units having pendant groups represented by the following formula (2):

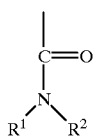
(1)

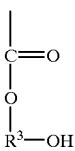
(2)

wherein in the formula (1), $R^1$ and $R^2$ are either the same or different and individually represent a hydrogen atom, an alkyl group having 1–12 carbon atoms and in the formula (2), $R^3$, together with the hydroxyl group bonded thereto, represents —$(R^{22}$—$O)_n$—H in which n stands for an integer of 2 to 33 and $R^{22}$s may be the same or different and individually represents an alkylene group having 2–5 carbon atoms;

said protective colloid is made of a (co)polymer (α1) composed of a recurring unit and 20 wt. % of at least one recurring unit selected from the group consisting of said recurring units having said pendant grous represented by the formula (1) and the group consisting of said recurring units having said pendant groups represented by the formula (2);

based on the total weight of (α1) and (α2), (α1) ranges from 15 to 85 wt. % while (α2) ranges from 85 to 15 wt. %; and said at least one recurring unit having said pendent group represented by the formula (1) and/or (2) in (α1) is contained at a higher content than said at least one recurring unit in (α2) and wherein of said recurring units making up each of (α1) and (α2), the recurring unit other than said at least one recurring unit having said pendant group represented by the formula (1) and/or (2) is composed of at least one of the following structural units (v) to (z):

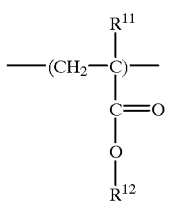
(v)

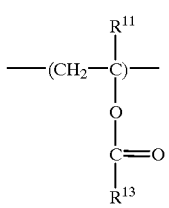
(w)

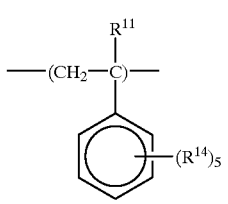
(x)

—$(R^{15})$—
(y)

(z)

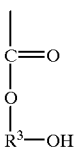
(2)

wherein $R^{11}$ represents a hydrogen atom or a methyl group, $R^{12}$ represents a hydrogen atom or an alkyl group having 1–12 carbon atoms, $R^{13}$ represents a hydrogen atom, an alkyl group having 1–20 carbon atoms or a phenyl group, $R^{14}$s are the same or different and individually represent a hydrogen atom, an alkyl group having 1–12 carbon atoms, a sulfonic group or a metal sulfonate group, and $R^{15}$ represents a divalent hydrocarbon group having 1–6 carbon atoms.

2. A (co)polymer according to claim 1, wherein (α1) comprises 20 wt. % or more but not greater than 100 wt. % of at least one recurring unit selected from the group consisting of said recurring units having said pendant groups represented by the following formula (2):

wherein $R^3$ represents an alkylene group having 1–30 carbon atoms or $R^3$, together with the hydroxyl group bonded thereto, represents —$(R^{22}$—O$)_n$—H in which n stands for an integer of 2 to 33 and $R^{22}$s may be the same or different and individually represents an alkylene group having 2–5 carbon atoms.

3. A (co)polymer according to claim 2, wherein said at least one recurring unit having said pendant group represented by the formula (2) has been derived from 2-hydroxyethyl methacrylate.

* * * * *